(12) United States Patent
Ferren et al.

(10) Patent No.: US 7,907,486 B2
(45) Date of Patent: Mar. 15, 2011

(54) ROTATION RESPONSIVE DISK ACTIVATION AND DEACTIVATION MECHANISMS

(75) Inventors: Bran Ferren, Beverly Hills, CA (US); Edward K. Y. Jung, Bellevue, WA (US); Clarence T. Tegreene, Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 206 days.

(21) Appl. No.: 12/229,502

(22) Filed: Aug. 22, 2008

(65) Prior Publication Data

US 2009/0022023 A1 Jan. 22, 2009

Related U.S. Application Data

(62) Division of application No. 11/471,970, filed on Jun. 20, 2006, now Pat. No. 7,512,959.

(51) Int. Cl.
*G11B 7/00* (2006.01)

(52) U.S. Cl. ............ 369/47.39; 369/47.1; 720/719

(58) Field of Classification Search .......... None
See application file for complete search history.

(56) References Cited

U.S. PATENT DOCUMENTS

| | | |
|---|---|---|
| 4,237,211 A | 12/1980 | Fanselow |
| 4,490,767 A | 12/1984 | Neuman et al. |
| 4,625,359 A | 12/1986 | Egner-Walter et al. |
| 4,743,989 A | 5/1988 | Bauck et al. |
| 5,014,311 A | 5/1991 | Schrenk |
| 5,162,989 A | 11/1992 | Matsuda |
| 5,182,742 A | 1/1993 | Ohmori et al. |
| 5,302,898 A | 4/1994 | Pethig et al. |
| 5,309,301 A | 5/1994 | Gregory et al. |
| 5,319,481 A | 6/1994 | Fergason |
| 5,337,180 A | 8/1994 | Woods et al. |
| 5,394,367 A | 2/1995 | Downs et al. |
| 5,450,489 A | 9/1995 | Ostrover et al. |
| 5,465,381 A | 11/1995 | Schmidt et al. |
| 5,483,596 A | 1/1996 | Rosenow et al. |
| 5,507,545 A | 4/1996 | Krysiak |
| 5,521,140 A | 5/1996 | Matsuda et al. |
| 5,567,512 A | 10/1996 | Chen et al. |
| 5,652,838 A | 7/1997 | Lovett et al. |
| 5,734,823 A | 3/1998 | Saigh et al. |
| 5,736,777 A | 4/1998 | Shield et al. |
| 5,755,942 A | 5/1998 | Zanzucchi et al. |
| 5,796,706 A | 8/1998 | Shintani et al. |
| 5,815,434 A | 9/1998 | Hasbun et al. |
| 5,815,484 A | 9/1998 | Smith et al. |
| 5,880,523 A | 3/1999 | Candelore |
| 5,960,398 A | 9/1999 | Fuchigami et al. |
| 6,000,030 A | 12/1999 | Steinberg et al. |
| 6,006,328 A | 12/1999 | Drake |

(Continued)

FOREIGN PATENT DOCUMENTS

GB 2 443 998 A 5/2008

(Continued)

OTHER PUBLICATIONS

U.S. Appl. No. 11/124,924, Ferren et al.

(Continued)

*Primary Examiner* — Muhammad N Edun

(57) ABSTRACT

Embodiments of methods and systems for controlling access to information stored on memory or data storage devices are disclosed. In various embodiments, fluid-mediated modification of information or access to information is utilized. According to various embodiments, data storage devices designed for rotating access are described which include rotation-activated fluid control mechanisms.

15 Claims, 41 Drawing Sheets

U.S. PATENT DOCUMENTS

| | | | |
|---|---|---|---|
| 6,011,772 A | 1/2000 | Rollhaus et al. |
| 6,030,581 A | 2/2000 | Virtanen |
| 6,041,412 A | 3/2000 | Timson et al. |
| 6,044,046 A | 3/2000 | Diezmann et al. |
| 6,103,454 A | 8/2000 | Dhar et al. |
| 6,131,165 A | 10/2000 | Lipkin et al. |
| 6,151,262 A | 11/2000 | Haroun et al. |
| 6,157,559 A | 12/2000 | Yoo |
| 6,160,734 A | 12/2000 | Henderson et al. |
| 6,226,747 B1 | 5/2001 | Larsson et al. |
| 6,228,440 B1 | 5/2001 | Dailey et al. |
| 6,230,244 B1 | 5/2001 | Kai |
| 6,278,679 B1 | 8/2001 | Weiss et al. |
| 6,296,020 B1 | 10/2001 | McNeely et al. |
| 6,314,518 B1 | 11/2001 | Linnartz |
| 6,320,830 B1 | 11/2001 | Tsukamoto et al. |
| 6,322,682 B1 | 11/2001 | Arvidsson et al. |
| 6,338,933 B1 | 1/2002 | Lawandy et al. |
| 6,389,701 B1 | 5/2002 | Friedland |
| 6,410,103 B1 | 6/2002 | Kasamatsu et al. |
| 6,427,140 B1 | 7/2002 | Ginter et al. |
| 6,434,109 B2 | 8/2002 | Rollhaus et al. |
| 6,454,173 B2 | 9/2002 | Graves |
| 6,454,970 B1 | 9/2002 | Öhman et al. |
| 6,511,728 B1 | 1/2003 | Bakos et al. |
| 6,512,600 B1 | 1/2003 | Kawai et al. |
| 6,513,060 B1 | 1/2003 | Nixon et al. |
| 6,535,858 B1 | 3/2003 | Blaukovitsch et al. |
| 6,537,635 B1 | 3/2003 | Bakos et al. |
| 6,587,429 B1 | 7/2003 | Conturie et al. |
| 6,589,626 B2 | 7/2003 | Selinfreund et al. |
| 6,591,852 B1 | 7/2003 | McNeely et al. |
| 6,601,613 B2 | 8/2003 | McNeely et al. |
| 6,620,478 B1 | 9/2003 | Öhman |
| 6,632,656 B1 | 10/2003 | Thomas et al. |
| 6,633,877 B1 | 10/2003 | Saigh et al. |
| 6,640,305 B2 | 10/2003 | Kocher et al. |
| 6,641,886 B1 | 11/2003 | Bakos et al. |
| 6,651,149 B1 | 11/2003 | Iwasaki |
| 6,653,625 B2 | 11/2003 | Andersson et al. |
| 6,654,797 B1 | 11/2003 | Kamper |
| 6,662,262 B1 | 12/2003 | Kasa et al. |
| 6,663,003 B2 | 12/2003 | Johnson et al. |
| 6,678,239 B2 | 1/2004 | Clemens |
| 6,684,199 B1 | 1/2004 | Stebbings |
| 6,684,310 B2 | 1/2004 | Anzai et al. |
| 6,709,802 B2 | 3/2004 | Lawandy et al. |
| 6,715,116 B2 | 3/2004 | Lester et al. |
| 6,717,136 B2 | 4/2004 | Andersson et al. |
| 6,721,889 B1 | 4/2004 | Jaegtnes et al. |
| 6,728,644 B2 | 4/2004 | Bielik et al. |
| 6,744,551 B1 | 6/2004 | Chao |
| 6,747,930 B1 | 6/2004 | Weldon et al. |
| 6,748,485 B1 | 6/2004 | Yokota et al. |
| 6,748,537 B2 | 6/2004 | Hughes |
| 6,751,716 B2 | 6/2004 | Sumitani et al. |
| 6,756,103 B2 | 6/2004 | Thompson et al. |
| 6,764,758 B1 | 7/2004 | Grunze et al. |
| 6,766,817 B2 | 7/2004 | Dias da Silva |
| 6,772,340 B1 | 8/2004 | Peinado et al. |
| 6,775,655 B1 | 8/2004 | Peinado et al. |
| 6,780,564 B2 | 8/2004 | Lawandy et al. |
| 6,782,190 B1 | 8/2004 | Morito |
| 6,788,443 B2 | 9/2004 | Ayres et al. |
| 6,793,753 B2 | 9/2004 | Unger et al. |
| 6,802,489 B2 | 10/2004 | Marr et al. |
| 6,811,736 B1 | 11/2004 | Ohman et al. |
| 6,812,456 B2 | 11/2004 | Andersson et al. |
| 6,812,457 B2 | 11/2004 | Andersson et al. |
| 6,837,476 B2 | 1/2005 | Cabuz et al. |
| 6,838,144 B2 | 1/2005 | Bakos et al. |
| 6,839,316 B2 | 1/2005 | Bakos et al. |
| 6,852,851 B1 | 2/2005 | Tooke et al. |
| 6,854,005 B2 | 2/2005 | Thiele |
| 6,878,555 B2 | 4/2005 | Andersson et al. |
| 6,918,404 B2 | 7/2005 | Dias da Silva |
| 6,948,071 B2 | 9/2005 | Schneider et al. |
| 7,027,384 B2 | 4/2006 | Ohbi et al. |
| 7,066,586 B2 | 6/2006 | Dias da Silva |
| 7,177,261 B2 | 2/2007 | Thompson et al. |
| 7,505,264 B2 | 3/2009 | Hall et al. |
| 2001/0055702 A1 | 12/2001 | Wang et al. |
| 2002/0076647 A1 | 6/2002 | Lawandy et al. |
| 2002/0137218 A1 | 9/2002 | Mian et al. |
| 2002/0142099 A1 | 10/2002 | Dubs |
| 2002/0166061 A1 | 11/2002 | Falik et al. |
| 2003/0018905 A1 | 1/2003 | Schneider et al. |
| 2003/0031115 A1 | 2/2003 | Constantinou et al. |
| 2003/0043710 A1 | 3/2003 | Shelton et al. |
| 2003/0044322 A1 | 3/2003 | Andersson et al. |
| 2003/0051148 A1 | 3/2003 | Garney |
| 2003/0053934 A1 | 3/2003 | Andersson et al. |
| 2003/0054563 A1 | 3/2003 | Ljungstrom et al. |
| 2003/0156763 A1 | 8/2003 | Soderman |
| 2003/0174616 A1 | 9/2003 | Constantinou et al. |
| 2003/0223100 A1 | 12/2003 | Anderson |
| 2004/0016879 A1 | 1/2004 | Andersson et al. |
| 2004/0037994 A1 | 2/2004 | Bakos et al. |
| 2004/0058408 A1 | 3/2004 | Thomas et al. |
| 2004/0088479 A1 | 5/2004 | Hall |
| 2004/0152015 A1 | 8/2004 | Lawandy et al. |
| 2004/0191125 A1 | 9/2004 | Kellogg et al. |
| 2004/0209204 A1 | 10/2004 | Tompson et al. |
| 2004/0215909 A1 | 10/2004 | Imai et al. |
| 2005/0015609 A1 | 1/2005 | Delorme |
| 2005/0031777 A1 | 2/2005 | Hayashi et al. |
| 2005/0042770 A1 | 2/2005 | Derand et al. |
| 2005/0069913 A1 | 3/2005 | Mian et al. |
| 2005/0105885 A1 | 5/2005 | Lee |
| 2005/0195728 A1 | 9/2005 | Larroche |
| 2006/0071795 A1 | 4/2006 | Benedikt |
| 2006/0104172 A1 | 5/2006 | Grampel et al. |
| 2006/0224611 A1 | 10/2006 | Dunn et al. |
| 2006/0262928 A1 | 11/2006 | Bar-El et al. |
| 2006/0268661 A1 | 11/2006 | Ferren et al. |
| 2006/0280088 A1 | 12/2006 | Ferren et al. |
| 2007/0074126 A1 | 3/2007 | Fisher et al. |
| 2007/0162978 A1 | 7/2007 | Watanabe et al. |
| 2008/0159109 A1 | 7/2008 | Ferren et al. |
| 2008/0252463 A1 | 10/2008 | Andrechak et al. |
| 2009/0122666 A1 | 5/2009 | Ferren et al. |

FOREIGN PATENT DOCUMENTS

| | | |
|---|---|---|
| WO | WO 98/07019 | 2/1998 |
| WO | WO 98/11539 | 3/1998 |
| WO | WO 98/41979 | 9/1998 |
| WO | WO 98/53311 | 11/1998 |
| WO | WO 99/67085 | 12/1999 |
| WO | WO 2007/019473 A2 | 2/2007 |
| WO | WO 2007/030808 A2 | 3/2007 |

OTHER PUBLICATIONS

UK Intellectual Property Office Examination Report Under Section 18(3); App. No. GB0806367.9; Jun. 11, 2010 (received by our Agent on Jun. 14, 2010); pp. 1-3.

UK Intellectual Property Office Examination Report Under Section 18(3); App. No. GB0806366.1; Jun. 11, 2010 (received by our Agent on Jun. 14, 2010); pp. 1-3.

U.S. Appl. No. 12/583,859, Ferren et al.

U.S. Appl. No. 12/583,399, Ferren et al.

U.S. Appl. No. 11/504,547, Ferren et al.

U.S. Appl. No. 11/499,395, Ferren et al.

U.S. Appl. No. 11/471,284, Ferren et al.

U.S. Appl. No. 11/223,899, Ferren et al.

U.S. Appl. No. 11/223,898, Ferren et al.

U.S. Appl. No. 11/223,888, Ferren et al.

U.S. Appl. No. 11/223,829, Ferren et al.

U.S. Appl. No. 11/198,939, Ferren et al.

U.S. Appl. No. 11/198,938, Ferren et al.

Adelstein, Peter Z.; "Permanence of Digital Information"; International Conference of the Round Table on Archives: XXIV—CITRA Budapest 1999, Access to Information and Preservation Issues; bearing a date of 1999; pp. 1-7.

"An Overview of the Field of Optical Disk Data Storage"; WTEC Hyper-Librarian; bearing a date of Jun. 1999; pp. 1-13; located at: http://www.wtec.org/loyola/hdmem/05_02.htm; printed on Apr. 20, 2005.

Bertram, Neal H.; Cuddihy, Edward F.; "Kinetics of the Humid Aging of Magnetic Recording Tape"; IEEE Transactions on Magnetics; pp. 993-999; vol. Mag-18, No. 5, Sep. 1982.

Bogart, John W.C. Van; "Magnetic Tape Storage and Handling: A Guide for Libraries and Archives—4. Life Expectancy: How Long Will Magnetic Media Last?"; National Media Laboratory; bearing a date of Jun. 1995; pp. 1-2; located at: http://www.clir.org/pubs/reports/pub54/4life_expectancy.html; printed on Apr. 22, 2005.

Bogart, John W.C. Van; "Magnetic Tape Storage and Handling: A Guide for Libraries and Archives—5. How Can You Prevent Magnetic Tape from Degrading Prematurely?"; National Media Laboratory; bearing a date of Jun. 1995; pp. 1-8; located at: http://www.clir.org/pubs54/5premature_degrade.html; printed on Apr. 22, 2005.

Bogart, John W.C. Van; "Mag Tape Life Expectancy 10-30 years: A Letter to the Editor of the Scientific American"; National Media Lab; bearing dates of Mar. 13, 1995, Jan. 1995, Aug. 3, 2004; pp. 1-2; located at: http://palimpsest.stanford.edu/bytopic/electronic-records/electronic-storage-media/bogart.html; printed on Apr. 22, 2005.

Bogart, John Van; "Storage Media Life Expectancies"; Digital Archive Directions (DADs) Workshop; Jun. 22, 1998; pp. 1-17; National Media Laboratory located at : http://ssdoo.gsfc.nasa.gov/nost/isoas/dads/presentations/VanBogart/VanBogart.ppt; printed on Apr. 22, 2005.

"Flexplay: How Flexplay® Works"; Howstuffworks.com; bearing dates of Dec. 2, 2004, 2000, 2005; pp. 1-2; Convex Group; located at: http://www.flexplay.com/how-flexplay-works.htm; printed on Feb. 11, 2005.

Fuentes-Hernandez, Canek; Thomas, Jayan; Termine, Roberto; Meredith, Gerald; Peyghambarian, Nasser; Kippelen, Bernard; Barlow, Steve; Walker, Gregory; Marder, Seth R.; Yamamoto, Michiharu; Cammack, Kevin; Matsumoto, Kenji; "Video-rate compatible photorefractive polymers with stable dynamic properties under continuous operation"; Applied Physics Letters; bearing dates of 2004, and Feb. 24, 2005; pp. 1877-1879; vol. 85, No. 11, Sep. 13, 2004; American Institute of Physics.

Garfinkel, Simson; "The Myth of Doomed Data"; TechnologyReview.com; bearing a date of Dec. 3, 2003; pp. 1-2; located at: http://www.technologyreview.com/articles/03/12/wo_garfinkel120303.asp?p=0; printed on Apr. 25, 2005.

Hadenius, Patric; "Holostorage for the Desktop"; Technology Review: Innovation News—Hardware; bearing a date of May 2004; p. 22; Courtesy of Inphase Technologies.

"Hard disk drive design and technology: Magnetic Hard Disk Drive"; USByte.com; bearing dates of 1999-2002; pp. 1-2; located at: http://www.usbyte.com/common/HDD.htm; printed on Apr. 20, 2005.

Hunt, Jim; "Fend Off Data Degradation"; Quality Online, Quality Computing; bearing a date of May 1999; pp. 1-5; located at: http://www.qualitymag.com/articles/1999/may99/0599qc.html; printed on Nov. 12, 2001.

Jonietz, Erika; "Magnetic Future: Isolating bits on a disk drive could shatter storage limits"; Technology Review; p. 23; Jul./Aug. 2002; Courtesy of IBM Research; located at: www.technologyreview.com.

Judge, J.S.; Schmidt, R.G.; Weiss, R.D.; Miller, G; "Media Stability and Life Expectancies of Magnetic Tape for Use with IBM 3590 and Digital Linear Tape Systems"; pp. 1-4.

Kuhn, Kelin J.; "CD/ROM—An extension of the CD audio standard"; pp. 1-8; located at: http://www.ee.washington.edu/conselec/CE/kuhn/cdrom/95x8.htm; printed on Sep. 22, 2004.

Kuhn, Kelin J.; "Other disk formats of interest"; pp. 1-6; located at: http://www.ee.washington.edu/conselec/CE/kuhn/otherformats/95x9.htm; printed on Apr. 22, 2005.

Latorre, Laurent; Kim, Joonwon; Lee, Junghoon; De Guzman, Peter-Patrick; Lee, Hyesog J.; Nouet, Pascal; Kim, Chang-Jin; Electrostatic Actuation of Microscale Liquid-Metal Droplets; Journal of Microelectromechanical Systems; vol. 11; No. 4; Aug. 2002; pp. 302-308; IEEE.

Madou, Marc J.; Lee, L. James; Koelling, Kurt W; Daunert, Sylvia; Lai, Siyi; Koh, Chee Guan; Juang, Yi-Je; Yu, Liyong; Lu, Yumin; "Design and Fabrication of Polymer Microfluidic Platforms for Biomedical Applications"; Antec; bearing a date of 2001; pp. 2534-2538.

"6. Magnetic Materials"; pp. 1-9; located at: http://www.unesco.org/webworld/mdm/administ/en/guide/guide008.htm; printed on Apr. 22, 2005.

Microsoft Computer Dictionary, Fifth Edition; bearing a date of 2002; pp. 142 and 150; Microsoft Corporation.

Novack, Wesley; "ASUS DRW-1604P DVD±RW drive—Reading Performance"; CD Freaks.com; bearing a date of Feb. 12, 2005; pp. 1-9; located at: http://www.cdfreaks.com/article/179/3; printed on Apr. 22, 2005.

Peiker, E.J.; "Flash Memory—A Primer"; NatureScapes.Net; pp. 1-3; located at: http://www.naturescapes.net/112003/ej1103.htm; printed on Apr. 22, 2005.

Sadashige, Koichi; "Data Storage Technology Assessment—2002 Projections through 2010"; National Media Laboratory and National Technology Alliance; bearing a date of Mar. 2003; pp. 1-80.

"STMicroelectronics Advances in Development of Future Non-Volatile Memory Technology"; STMicroelectronics; bearing dates of Jun. 16, 2004, 2005; pp. 1-2; located at: http://www.st.com/stonline/press/news/year2004/t1480h.htm; printed on Apr. 22, 2005.

Thompson, D.A.; Best, J.S.; "The future of magnetic data storage technology"; IBM Journal of Research and Development; bearing dates of Jul. 9, 1999, Nov. 9, 1999; pp. 1-9;vol. 44, No. 3, 2000; located at: http://www.research.ibm.com/journal/rd/443/thompson.html; printed on Apr. 20, 2005.

Trock, Jacob; "18. Litteraturliste"; pp. 1-23; located at: http://home3.inet.tele.dk/jtrock/2del/kap18.htm; printed on Apr. 22, 2005.

Tyson, Jeff; "How Flash Memory Works"; howstuffworks; bearing dates of 1998-2005; pp. 1-6; HowStuffWorks, Inc.; located at: http://computer.howstuffworks.com/flash-memory.htm/printable; printed on Apr. 28, 2005.

Vos, Martin; Ashton, Gary; Bogart, John Van; Ensminger, Ron; "Heat and Moisture Diffusion in Magnetic Tape Packs"; National Media Laboratory; bearing a date of Mar. 1994; pp. 1-15; vol. 30, No. 2; IEEE Transactions on Magnetics.

Zeng, Jun; Banerjee, Deb; Deshpande, Manish; Gilbert, John R.; "Design Analyses of Capillary Burst Valves in Centrifugal Microfluidics"; UTAS; pp. 1-4; 2000; located at: www.coventor.com/media/papers/uTAS2000_burst.pdf.

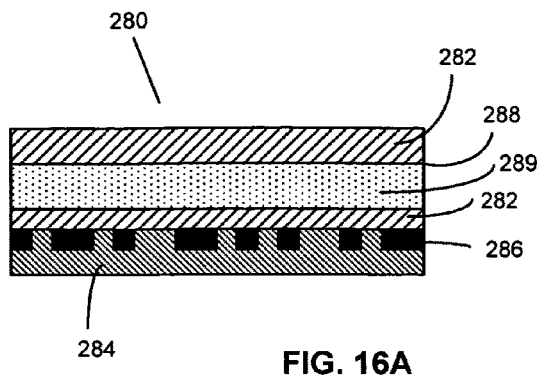
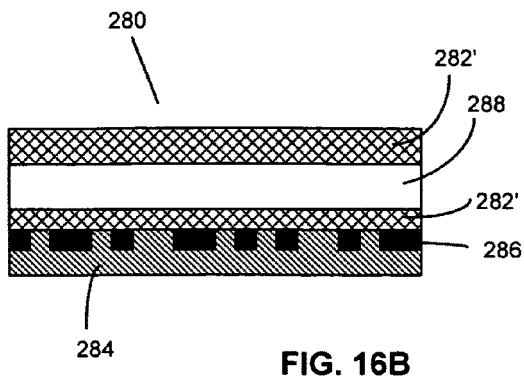
FIG. 16A     FIG. 16B
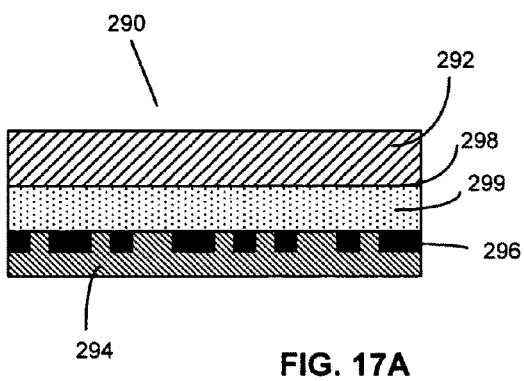
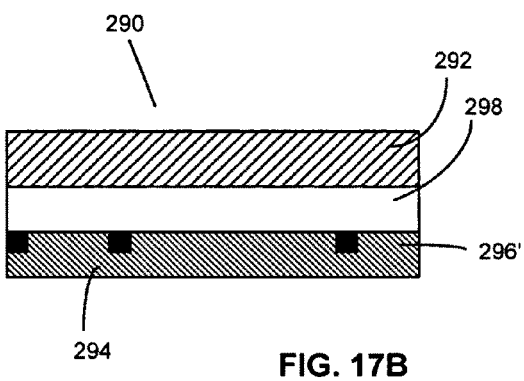
FIG. 17A     FIG. 17B
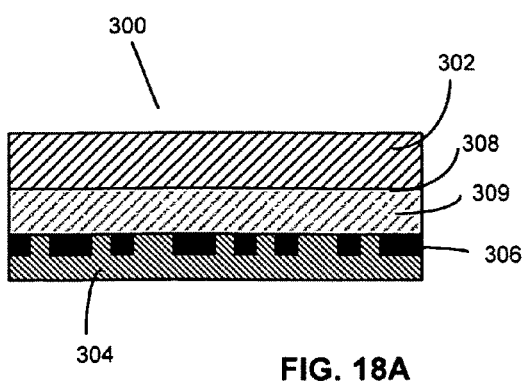
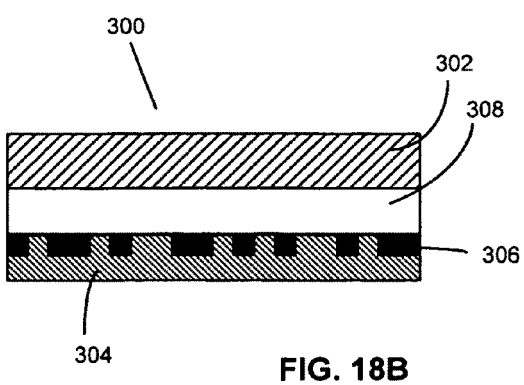
FIG. 18A     FIG. 18B

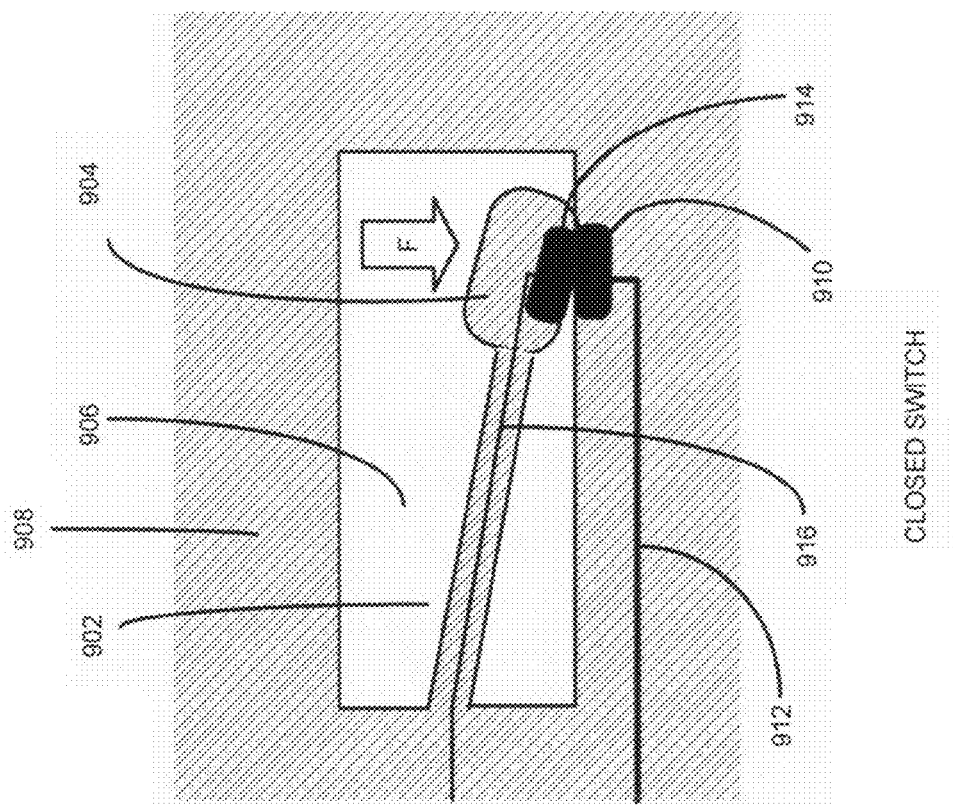
FIG. 32B CLOSED SWITCH
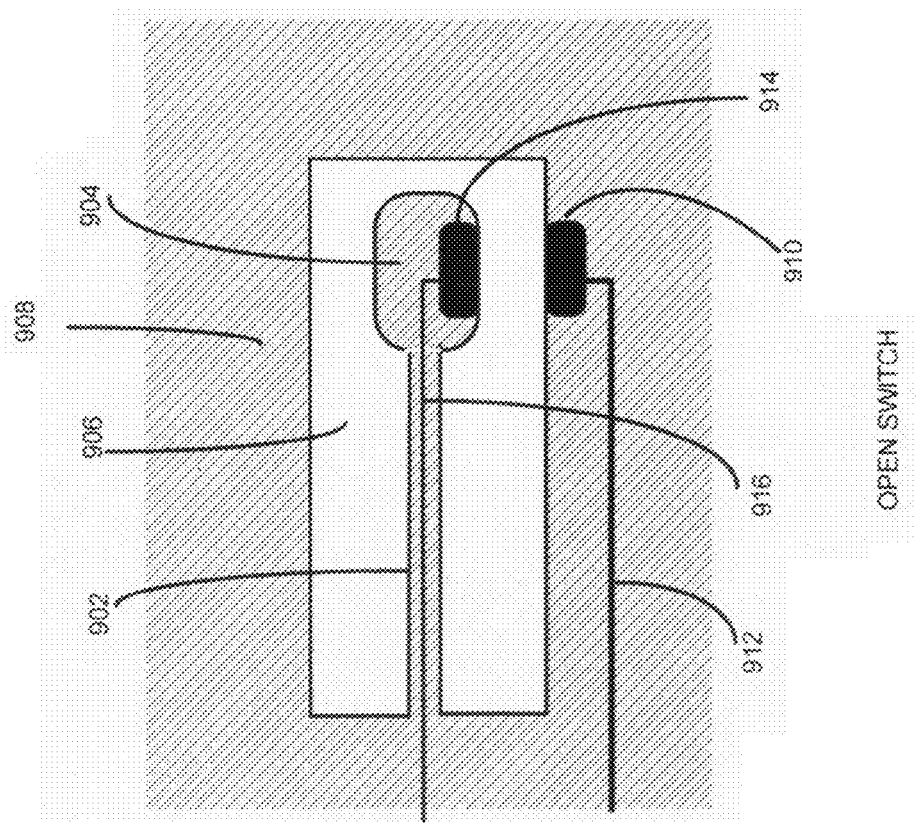
FIG. 32A OPEN SWITCH

US 7,907,486 B2

ROTATION RESPONSIVE DISK ACTIVATION AND DEACTIVATION MECHANISMS

CROSS-REFERENCE TO RELATED APPLICATIONS

For purposes of the United States Patent Office (USPTO) extra-statutory requirements, the present application is a DIVISION application of U.S. patent application Ser. No. 11/471,970 titled ROTATION RESPONSIVE DISK ACTIVATION AND DEACTIVATION MECHANISMS, naming BRAN FERREN; EDWARD K.Y. JUNG; AND CLARENCE T. TEGREENE as inventors, filed 20 Jun. 2006, now U.S. Pat. No. 7,512,959 which is co-pending, or is an application of which a co-pending application is entitled to the benefit of the filing date. The present application claims the benefit of the earliest available effective filing date(s) (i.e., claims earliest available priority dates for other than provisional patent applications or claims benefits under 35 USC §119(e) for provisional patent applications) for any and all applications to which patent application Ser. No. 11/471,970 claims the benefit of priority, including but not limited to U.S. patent application Ser. No. 11/150,837, titled METHOD AND SYSTEM FOR ROTATIONAL CONTROL OF DATA STORAGE DEVICES, naming BRAN FERREN; EDWARD K.Y. JUNG; AND CLARENCE T. TEGREENE as inventors, filed 9 Jun. 2005. All subject matter of U.S. patent application Ser. No. 11/471,970 and of any and all applications from which it claims the benefit of the earliest available effective filing date(s) is incorporated herein by reference to the extent such subject matter is not inconsistent herewith. The applicant entity has provided above a specific reference to the application(s)from which priority is being claimed—as required by statute. Applicant entity understands that the statute is unambiguous in its specific reference language and does not require either a serial number or any characterization, such as "continuation" or "continuation-in-part" or "divisional," for claiming priority to U.S. patent applications. Notwithstanding the foregoing, the applicant entity has provided above a specific reference to the application(s) from which priority is being claimed, but expressly points out that such designations are not to be construed in any way as any type of commentary and/or admission as to whether or not the present application contains any new matter in addition to the matter of its parent application(s). Any designation that the present application is a "division" should not be construed as an admission that the present application claims subject matter that is patentably distinct from claimed subject matter of its parent application.

TECHNICAL FIELD

The present application relates, in general, to the control of access to information stored on memory or data storage devices. In particular, it relates to control of access to information through modification of data storage media.

BACKGROUND

Various methods have been used to control access to information stored on data storage devices such as CDs, DVDs, floppy disks, and so forth. Methods of controlling access to information are utilized for various reasons including, for example, to limit unauthorized access to copyrighted information. Such methods may involve requiring the use of access codes provided, e.g., on data storage device packaging in order to read information from a data storage device, or erasing data or preventing reading of data from a data storage device following reading of the device.

SUMMARY

Embodiments of methods and systems for fluid mediated regulation of access to information on data storage devices are disclosed. Features of various embodiments will be apparent from the following detailed description and associated drawings.

BRIEF DESCRIPTION OF THE FIGURES

Features of the invention are set forth in the appended claims. The exemplary embodiments may best be understood by making reference to the following description taken in conjunction with the accompanying drawings. In the figures, like referenced numerals identify like elements.

FIGS. 16A and 16B illustrate degradation of a portion of a data storage medium produced by release of a fluid;
FIGS. 17A and 17B illustrate degradation of data produced by release of a fluid;
FIGS. 18A and 18B illustrate optical interference with data reading produced by release of a fluid.

FIGS. 32A and 32B depict a rotation activatable switch;

DETAILED DESCRIPTION

Figure 1:
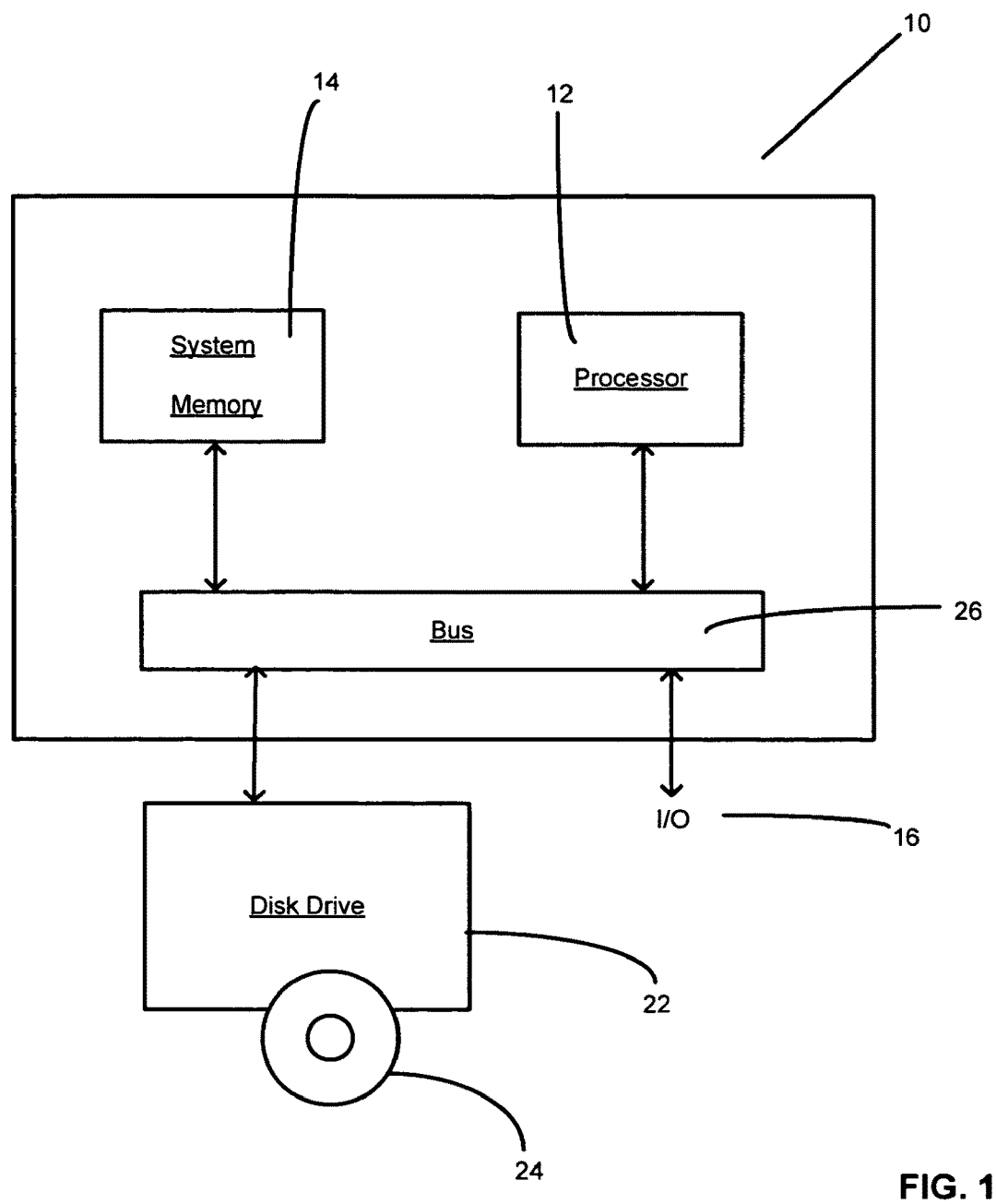
FIG. 1 illustrates a system including a disk drive.

FIG. 1 illustrates a system 10, which may be a computer system or other system that includes a data storage device 24 configured for rotating access. System 10 includes a processor 12, system memory 14, one or more I/O devices 16, and disk drive 22, which is configured to receive a disk shaped data storage device 24. The system may also include a power supply, not shown. Data, power and control signals may be transferred between system components via data bus 26. Processor 12 may be a microprocessor. In this example, and in general, data storage device 24 may be a CD, DVT, floppy disk, or any of various other data storage devices configured for rotating access. Such data storage devices are frequently disk shaped, but the invention is not limited to use with disk shaped data storage devices.

Figure 2:
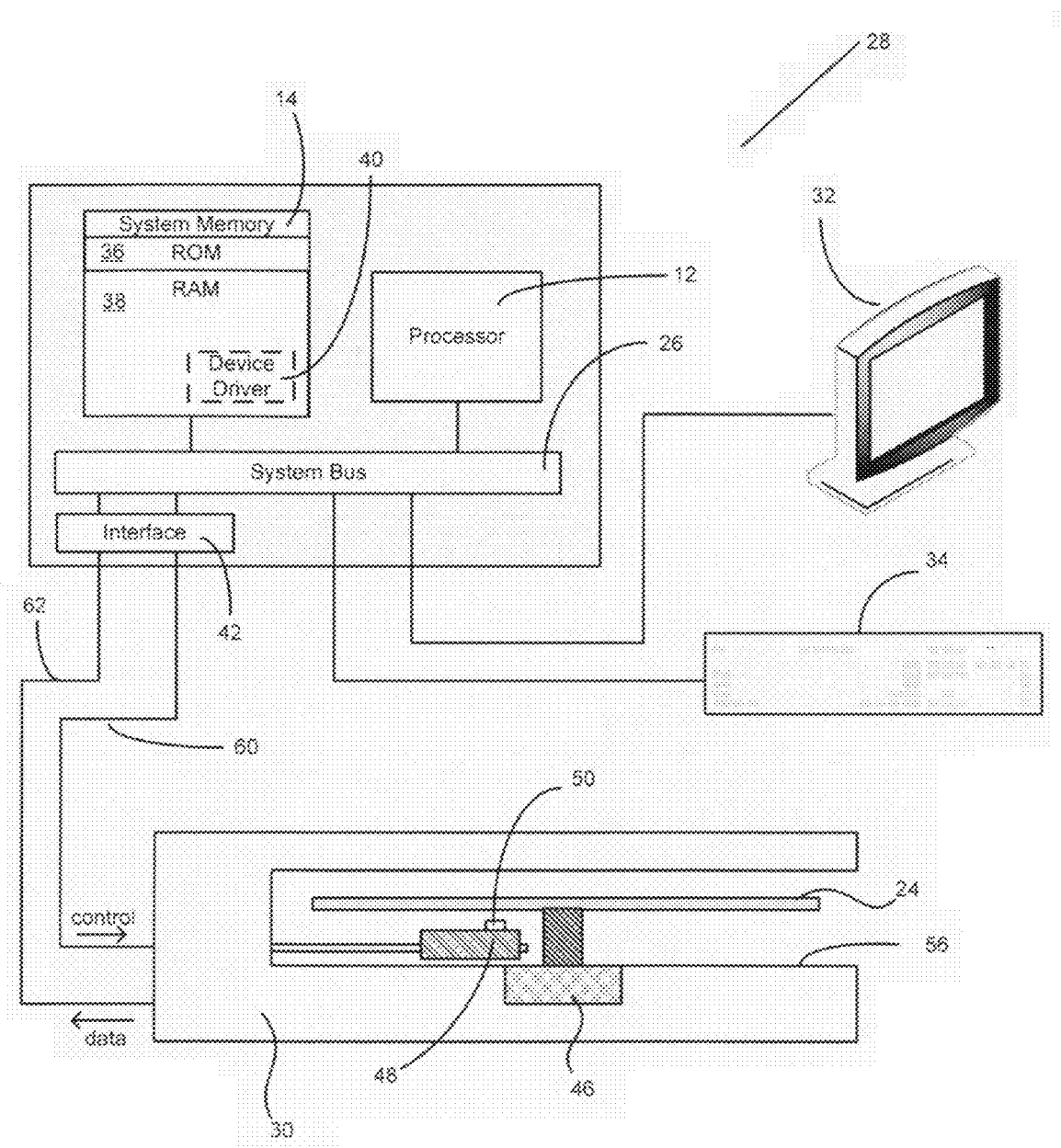
FIG. 2 illustrates a computer system.

As a specific example of the system depicted in FIG. 1, FIG. 2 illustrates a computer system 28. Computer system 28 includes a processor 12, system memory 14, system bus 26, output device 32, which in this example is a monitor, and input device 34, which in this example is a keyboard. System memory 14 includes read-only memory 36 and random-access memory 38. Device driver 40 is stored in random-access memory 38. Device driver 40 is used to control disc drive 30. Interface 42 provides an interface between the computer system 28 and disk drive 30. Control line 60 and data line 62 provide for the transfer of control and data signals between system 28 and disk drive 30. Disk drive 30 includes receptacle 56, which is adapted to receive disk 24. Disc 24 is rotated by motor 46. Positioner 48 adjusts the position of the read head 50 with respect to disk 24.

Figure 3:
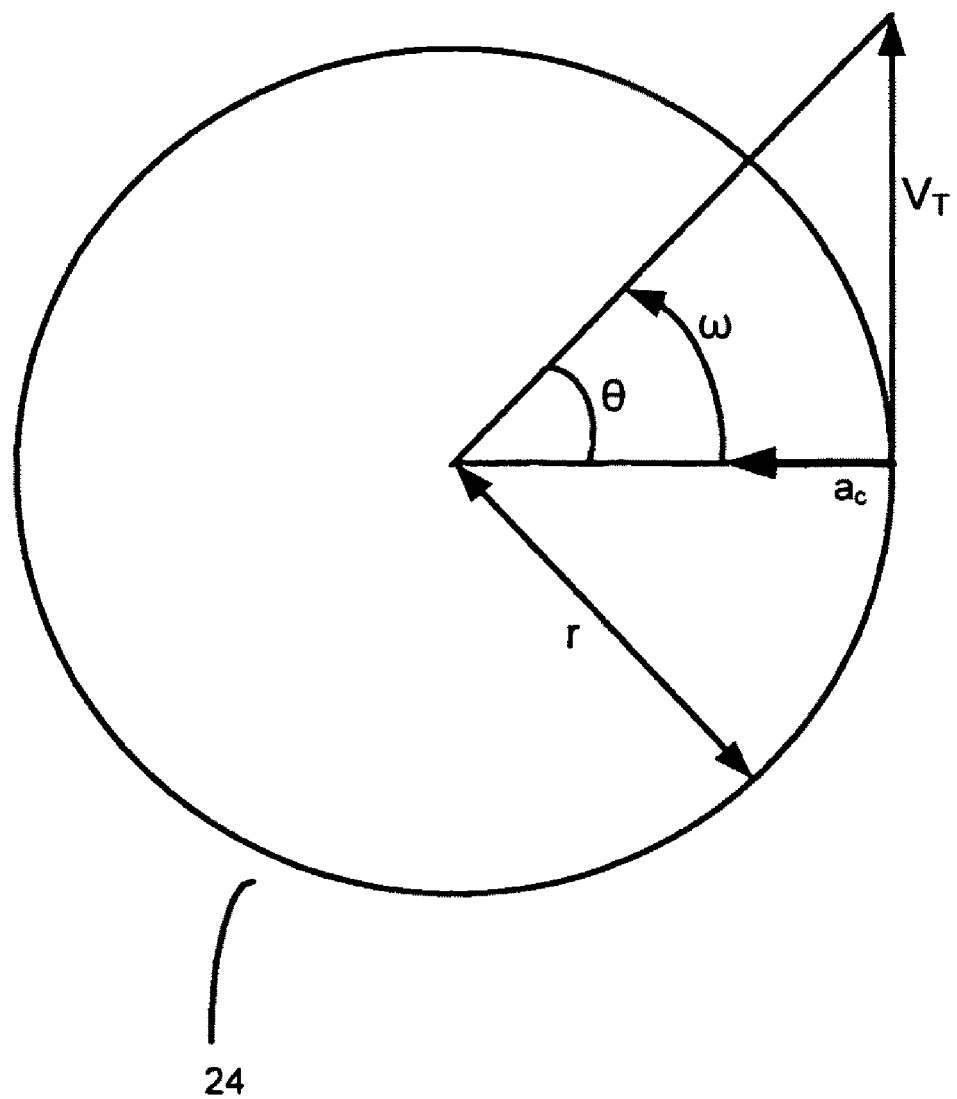
FIG. 3 illustrates parameters relating to rotation of a disk.
Figure 4A:
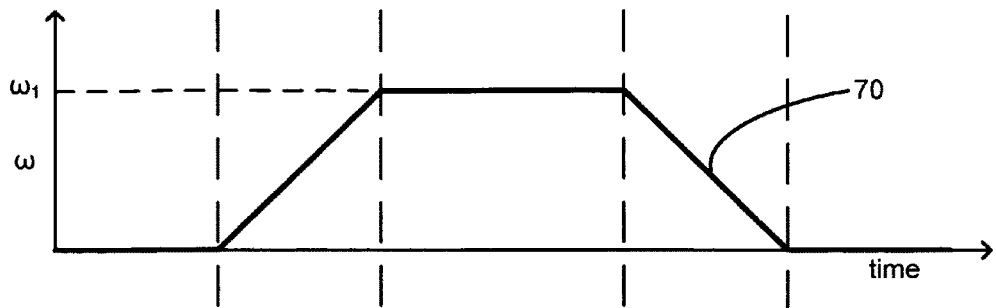
FIGS. 4A-4C illustrate angular velocity, its derivative, and its square, respectively.
Figure 4B:
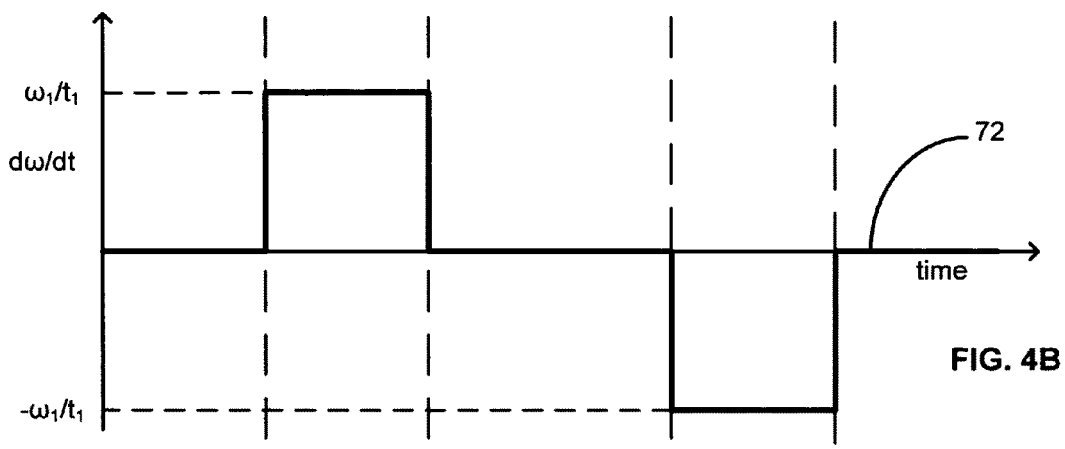
Figure 4C:
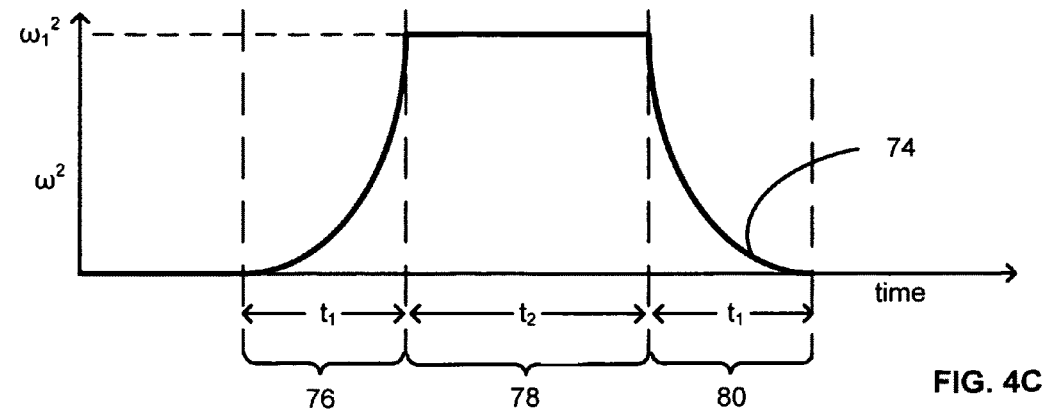

FIG. 3 illustrates parameters associated with rotation of disk 24, which may be a disk shaped data storage device 24. Disk 24 may have a radius r. If disk 24 is rotated with angular velocity $\omega$, for example in a counterclockwise direction as depicted in FIG. 3, a particle at the periphery of the disc will move with a tangential velocity $V_T$. The centripetal acceleration $a_c$ indicated by the grey arrow, will be $\omega^2 r$. FIGS. 4A-4C depict the relationship between angular velocity, $\omega$, and $d\omega/dt$ and $\omega^2$, which are proportional to angular acceleration, and centripetal acceleration, respectively. Values of $\omega$, $d\omega/dt$ and $\omega^2$ depicted in FIGS. 4A-4C are obtained when a disk that is initially at rest is rotated, increasing the rate of rotation over a first time period 76 until a constant angular velocity is reached, then held at a constant angular velocity for a second time period 78, and then gradually brought to rest again over a third time period 80. This is only one example of many possible disk rotation patterns. In FIG. 4A, the angular velocity $\omega$, represented by trace 70, is increased from zero over first time period 76 of duration $t_1$ until a velocity $\omega_1$ is reached, held constant at velocity $\omega_1$ over second time period 78 having a duration $t_2$, and then decelerated back to zero angular velocity over third time period 80, also of duration $t_1$. The corresponding angular acceleration, $d\omega/dt$, represented by trace 72 in FIG. 4B, has a value of $\omega_1/t_1$ during first time period 76 and a value of $-\omega_1/t_1$ during third time period 80, and is otherwise zero. The centripetal acceleration experienced by a particle at a given location on the disk will be equal to square of the angular velocity multiplied by the distance of the location from the center of rotation. Thus, for a particle at the periphery (at a distance r from the center of rotation), the centripetal acceleration will be $\omega^2 r$. Trace 74 in FIG. 4C represents $\omega^2$, which is proportional to the centripetal acceleration. As can be seen in FIG. 4C, $\omega^2$ increases non-linearly over first time period 76, is constant during second time period 78, and decreases non-linearly over third time period 80. As a disk rotates, a particle (which may be fluid or liquid) in or on the disk will experience an apparent "centrifugal force", proportional to the centripetal acceleration and operating in the opposite direction, driving the particle toward the periphery of the disk. During periods of angular acceleration and deceleration (e.g., time periods 76 and 78 in FIGS. 4A-4C), a particle in or on the disk will experience an angular force proportional to the angular acceleration $d\omega/dt$ and of the same sign, with the direction of the angular force depending on whether the disk is accelerating or decelerating.

Figure 5:
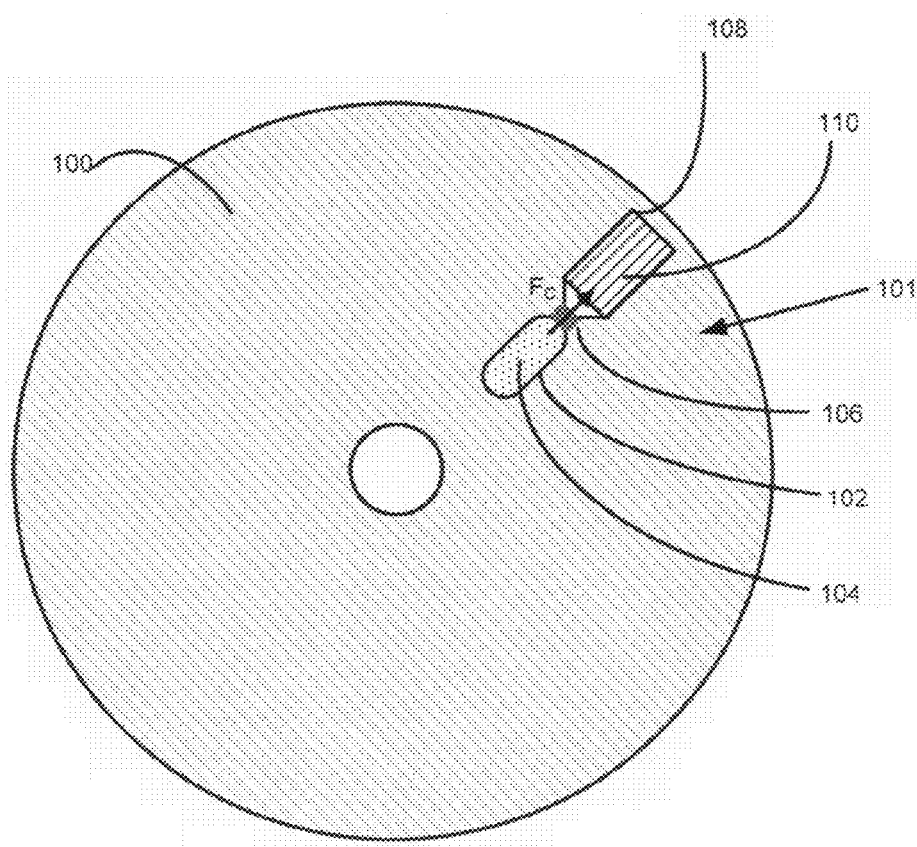
FIG. 5 depicts a disk having a rotation activated fluid release mechanism.

FIG. 5 depicts an embodiment of a disk 100 having a rotation activated fluid release mechanism 101. Fluid release mechanism 101 may include fluid chamber 102. Fluid chamber 102 may contain a degradation inducing fluid 104, which is retained in chamber 102 by pressure sensitive fluid barrier 106. A degradation sensitive region 110 located within a chamber 108 may be located radially outward of fluid chamber 102. When disk 100 is rotated, centrifugal force $F_C$, indicated by a black arrow, moves fluid 104 toward fluid barrier 106. The fluid release mechanism in FIG. 5 is sensitive to centripetal acceleration ('centrifugal force').

Figure 6:
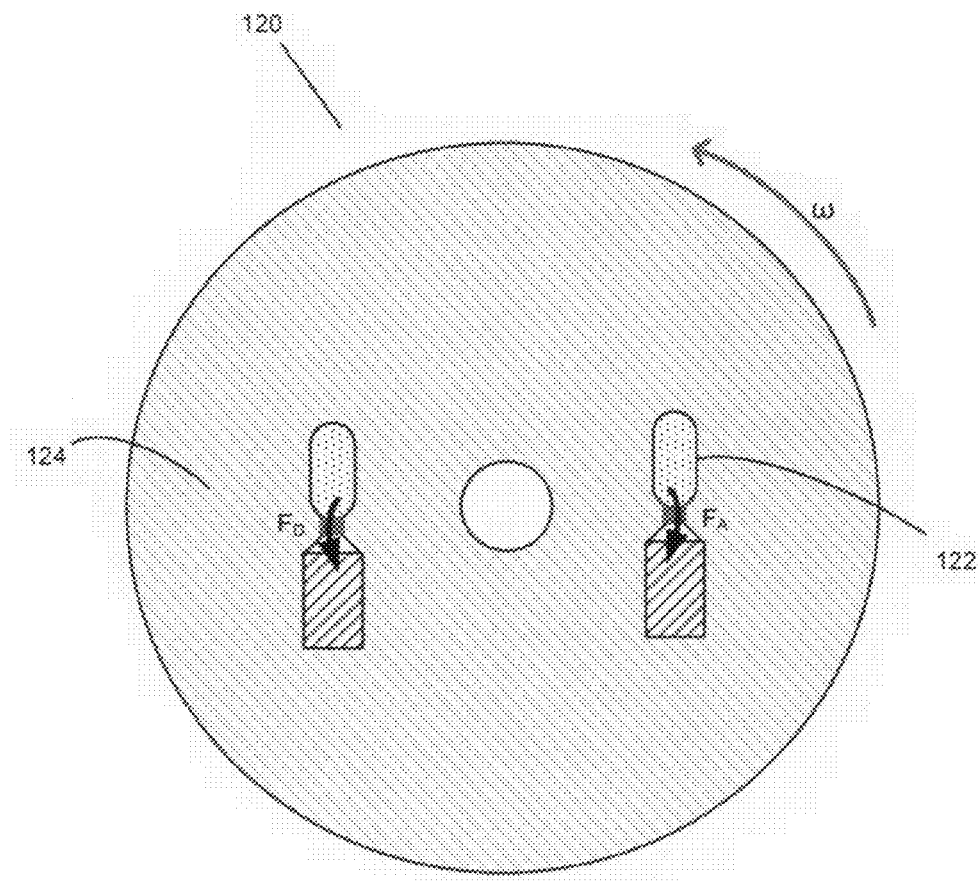
FIG. 6 depicts fluid release devices configured to release fluid in response to angular acceleration or deceleration.

Changing the orientation of the fluid release mechanism, can make the mechanism sensitive to forces associated with angular acceleration, or deceleration. Such a device may be obtained, for example, by orienting a fluid release mechanisms 122 and 124 on disk 120 as depicted in FIG. 6. A positive angular velocity ω, is obtained when the direction of rotation of disk 120 is as indicated by the gray arrow. Angular acceleration will produce inertial force $F_A$ in fluid in fluid release mechanism 122, in the direction indicated by the black arrow. Angular deceleration will produce inertial force $F_D$ in fluid release mechanism 122, in the direction indicated by the black arrow. Thus, fluid will be released from fluid release mechanism 122 during angular acceleration of sufficient magnitude, and fluid will be released from fluid release mechanism 124 during angular deceleration of sufficient magnitude.

Figure 7A:
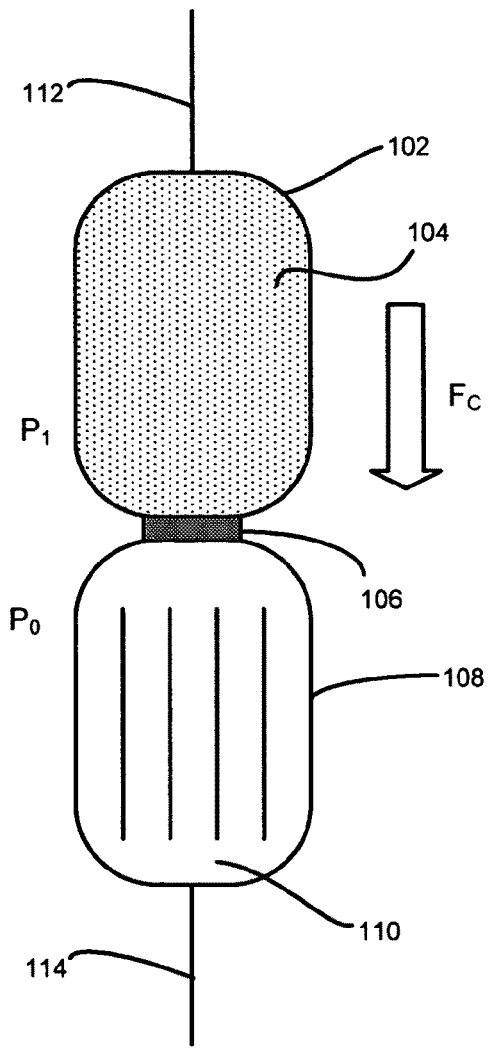
FIGS. 7A and 7B depict a fluid release mechanism.
Figure 7B:
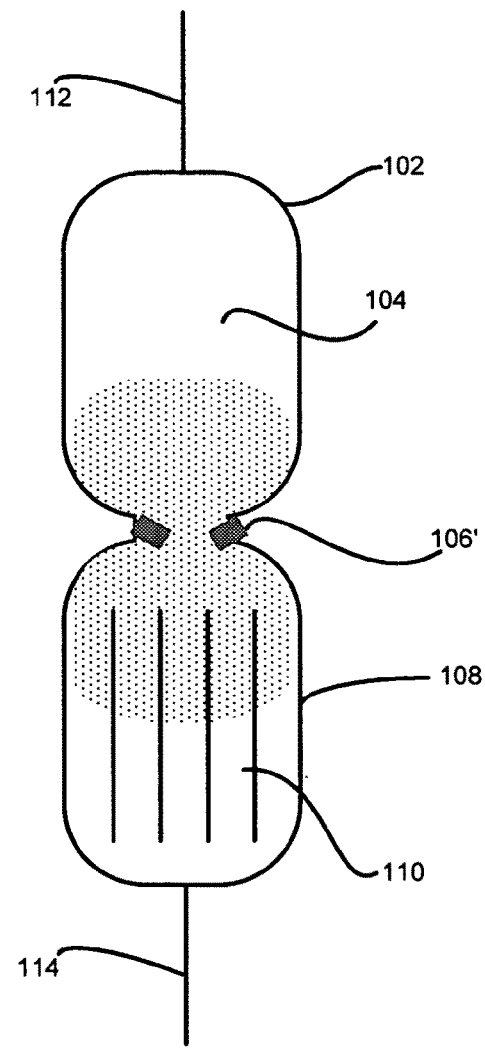

As depicted in FIG. 7A, $F_C$, drives fluid 104 against fluid barrier 106 to produce a pressure differential across fluid barrier 106, such that the pressure $P_1$ on the radially inward side of fluid barrier 106 (i.e., the side toward fluid chamber 102) is higher than the pressure $P_0$ on the radially outward side of fluid barrier 106 (i.e., the side toward degradation sensitive region 110). Air vents 112 and 114 may be included to permit the movement of fluid within chamber 102 and 108. When the pressure differential becomes large enough, fluid barrier 106 may rupture, break down, or otherwise release fluid 104 so that it moves into chamber 108, where it may cause degradation of degradation sensitive region 110. FIG. 7B depicts the fluid barrier in ruptured form 106'. In this example, fluid barrier 106 is a frangible fluid barrier. Pressure sufficient to permit movement of fluid from the reservoir may be obtained by spinning the substrate. If an optical disk is used, in some embodiments pressure sufficient to permit movement of fluid may be obtained by spinning the substrate in an optical disk drive at normal read speeds, while in other embodiments, pressure across the pressure sensitive barrier sufficient to permit movement of fluid from the reservoir may be obtainable by spinning the substrate in an optical disk drive at speeds above normal read speeds. Similarly, if the data storage device is a magnetically readable disk, pressure across the pressure sensitive barrier sufficient to permit movement of fluid from the reservoir is obtainable by spinning the substrate in a magnetic disk drive at normal read speeds in some embodiments, while in other embodiments pressure across the pressure sensitive barrier sufficient to permit movement of fluid from the reservoir is obtainable by spinning the substrate in a magnetic disk drive at speeds above normal read speeds.

Machine readable data is commonly stored in a binary code, which may be stored in various materials that can exist in two different states. For example, data may be stored in a pattern of electrical potentials, magnetized regions, optically transmissive regions, or optically reflective regions, among others, as known or as may be devised by those of skill in the relevant arts. A degradation sensitive region of a data storage device may include any portion of the data storage device that may be modified in some way to render information stored in the region inaccessible or unusable in some way. 'Degradation' may include modification of data stored in a data storage medium. A first state in the data storage medium may represent a '1', while a second state may represent a '0'. Various other coding schemes may be used, which may include more than two different states. Modification of data values may include setting all data values to a '1', setting all data values to a '0', resetting data values to a random value or to some pattern (e.g., alternating '1's and '0's), or reducing the signal-to-noise ratio of the stored data. Degradation may include destruction of the data storage medium so that no data may be stored therein. Degradation of a degradation sensitive region may include destruction or modification of a substrate or coating located adjacent or near a data storage medium. If data is read optically, with the use of light transmitted through a transparent substrate, reading of data may be blocked, for example, by modifying or degrading the substrate to block or hinder transmission of light through the substrate.

Figure 8:
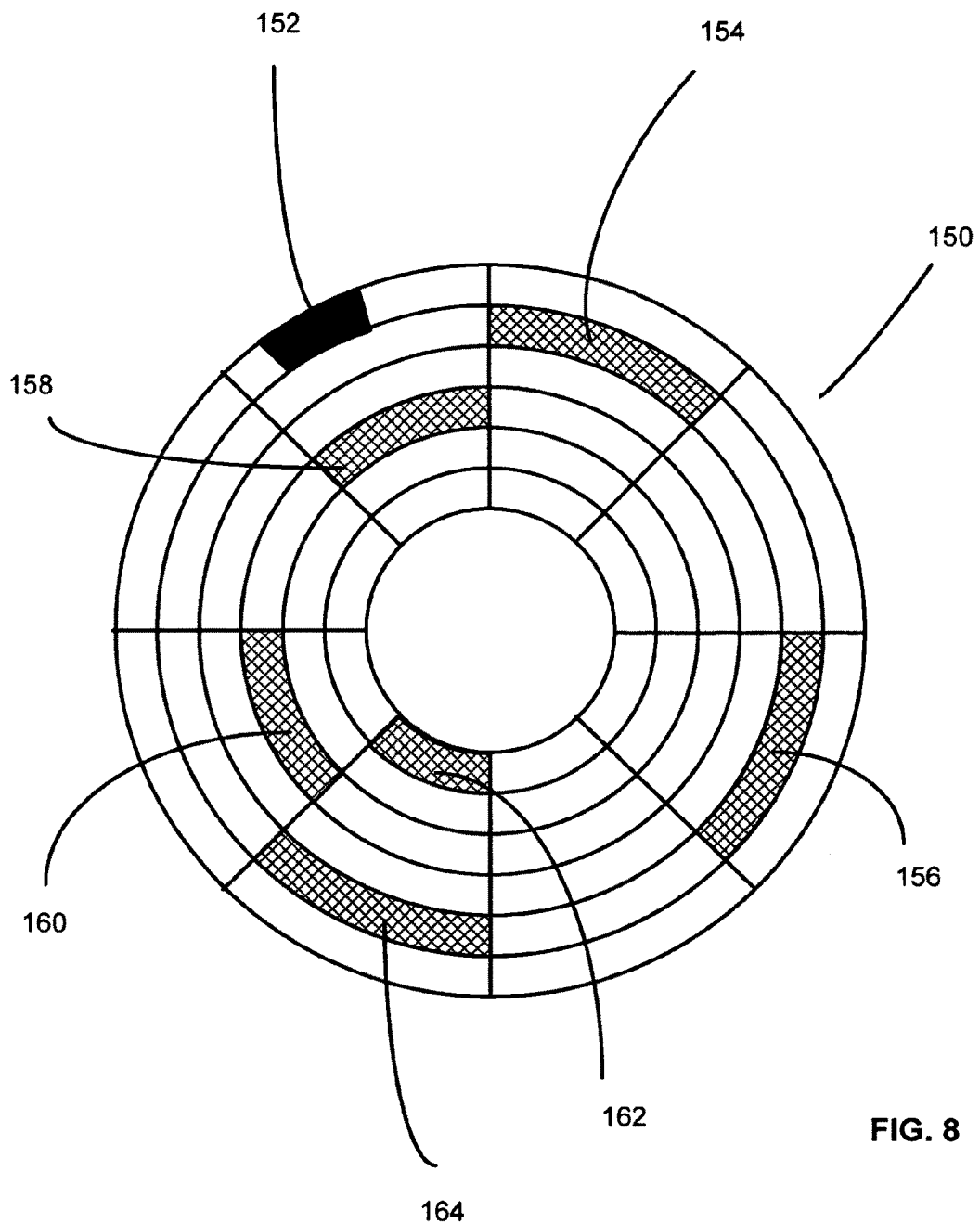
FIG. 8 illustrates a disk having machine readable data stored thereon.

In some embodiments, degradation may affect all or most of the data stored on a disk, with degradation considered to include destruction or modification of data, destruction or modification of a data storage medium, or destruction or modification of a substrate or coating layer adjacent or near a data storage medium. In other embodiments, all or portions of data on a data storage device may be rendered inaccessible by degrading a subset of data on the data storage device that contains information necessary for reading data stored on other parts of the data storage device. For example, as depicted in FIG. 8, data of interest (which might be, for example, a computer program or an audio or video digital recording) may be distributed to multiple locations on data storage device 150. In order to retrieve the data of interest in usable form, it may be read from the appropriate location in the appropriate order, as specified by index information stored in disk region 152. In the present exemplary embodiment, disk region 152 may specify that data may be read from first data region 154, second data region 156, third data region 158, fourth data region 160, fifth data region 162 and sixth data region 164, in that sequence. Thus, in order to render the data stored in first through sixth data regions 154 through 164 unusable, it may be sufficient to render data stored in disk region 152 inaccessible, for example by degradation of data, data storage medium, and/or substrate, as described above.

Figure 9:
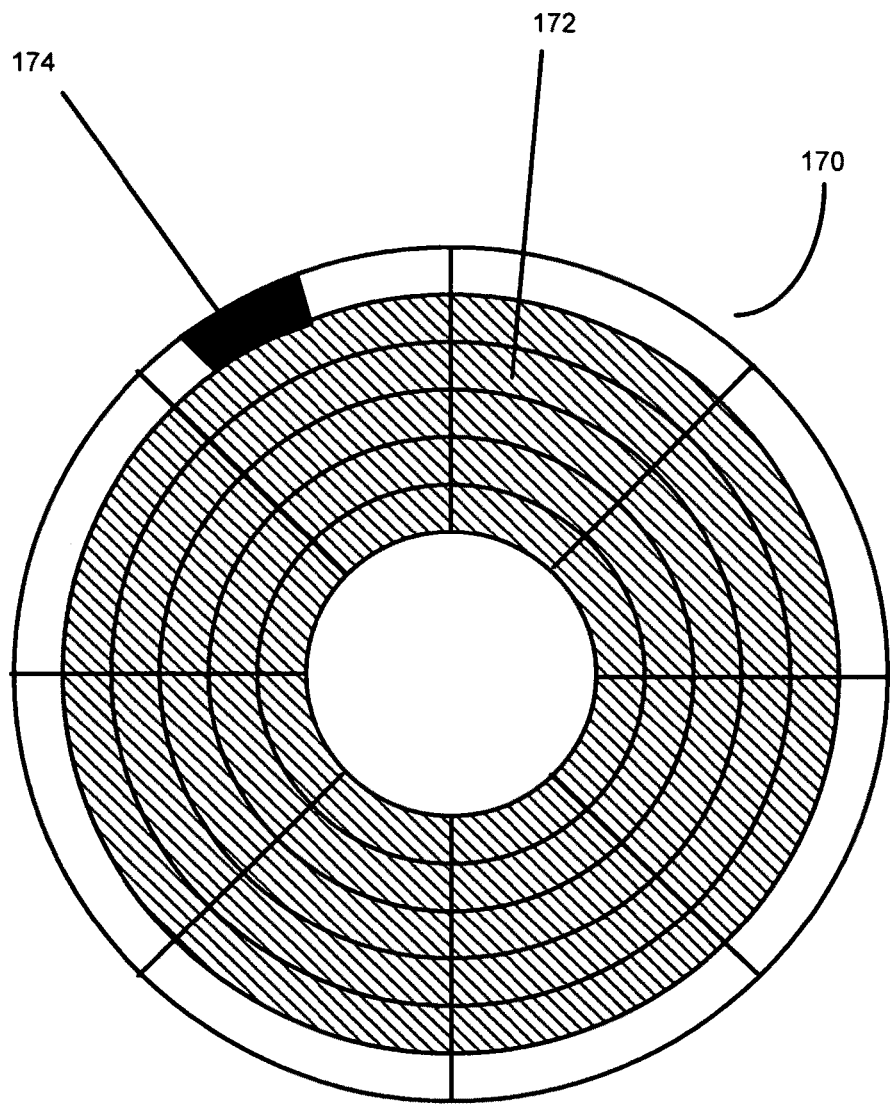
FIG. 9 illustrates a disk having machine readable data stored thereon.

Various other methods of controlling access to data on a disk by causing degradation of a limited portion of the disk may also be used. Another example is depicted in FIG. 9. In FIG. 9, disk 170 includes data region 172 containing data of interest in encrypted form. Key region 174 contains a decryption key that may be used to decrypt data stored in data region 172. Degradation of key region 174 may thus be sufficient to block access to data stored in data region 172.

In some embodiments, an index or key portion of data may contain information necessary for reading data from other regions of the data storage device. Degradation of index or key data thus causes "deactivation" of the data storage device. In other embodiments, an index or key region may contain a code that blocks reading of data from the disk, e.g., because after the information has been read from the disk, reading is discontinued by the disk drive or program controlling reading of data from the disk. Degradation of such key or index information then "activates" or enables reading of data from the data storage device. As a further alternative, the key or index information may activate or deactivate selected portions of the data storage device, so that (for example) different data may be read from the data storage device on the first reading than on the subsequent readings.

Figure 11:
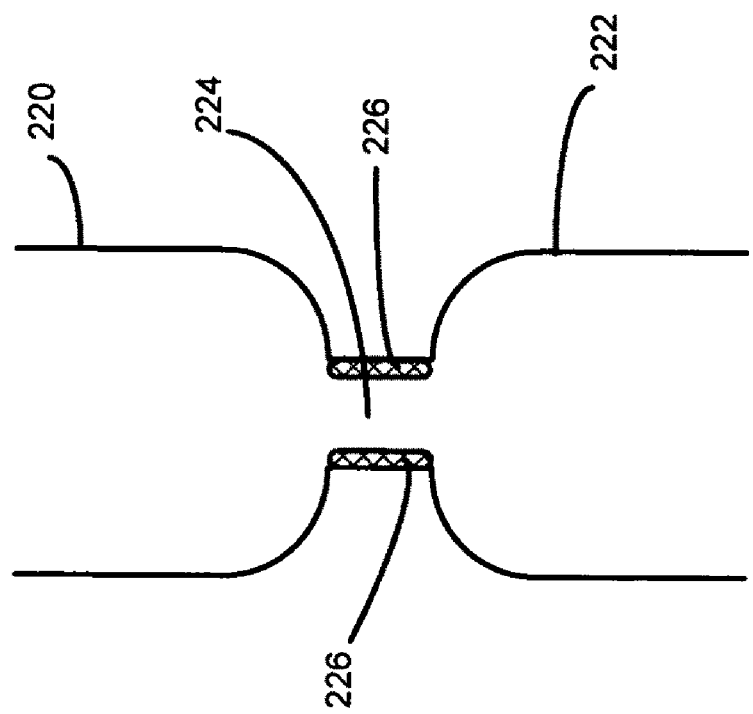
FIG. 11 illustrates a further valve mechanism.
Figure 10:
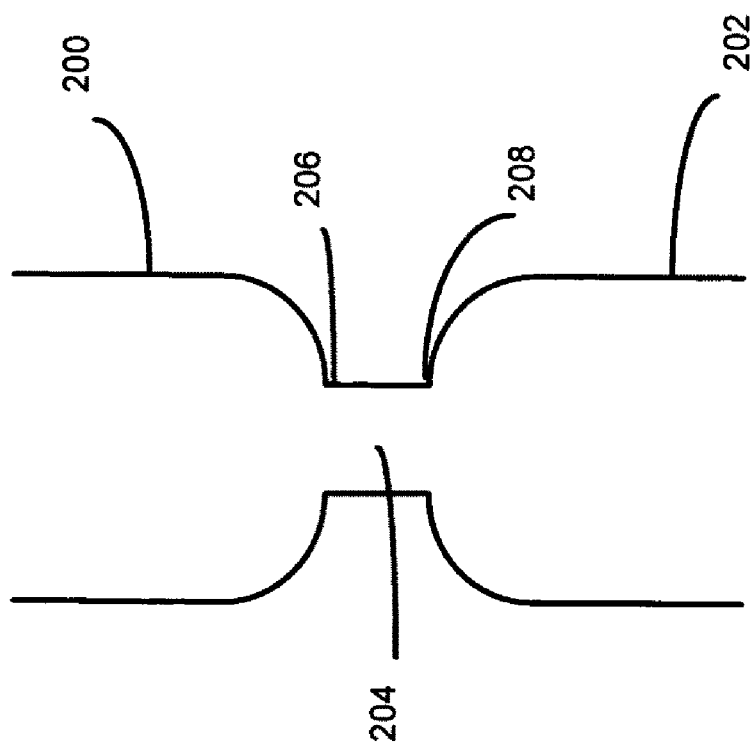
FIG. 10 illustrates a capillary valve mechanism.

FIGS. 5, 7A and 7B depict exemplary embodiments in which a pressure sensitive fluid barrier 106 is a frangible barrier. Various other barrier or valve structures that open in response to fluid pressure, including but not limited to capillary breaks, hydrophobic breaks, or hydrophobic valves, may also be used. FIGS. 10 and 11 depict additional exemplary fluid barriers. In FIG. 10, a first chamber 200 and second chamber 202 are separated by a restricted diameter valve region 204. Valve region 204 may be any of various types of passive or capillary valves, for example, as described in "Design and Fabrication of Polymer Microfluidic Platforms for Biomedical Applications," Madou et al., ANTEC 2001, pp. 2534-2538; "Design Analysis of Capillary Burst Valves in Centrifugal Microfluidics," Zeng et al., Tech. Proc. of μTAS, May 2000, Enschede, The Netherlands, pp. 493-496; U.S. Pat. Nos. 6,591,852 and 6,296,020, all of which are incorporated herein by reference in their entirety. Such valves may block the movement of fluid unless a sufficiently high pressure differential is applied across the restriction. In some embodiments, if an aqueous fluid is used, and chambers 200 and 202 and valve regions 204 may be formed in a hydrophobic material, an abrupt reduction in channel diameter, as occurs at entrance 206 of valve region 204, may obstruct the flow of fluid. Alternatively, a capillary break, or channel widening, as at exit 208 of valve region 204 may function as a passive or capillary valve. As depicted in FIG. 11, a valve region 224 between chambers 220 and 222 may also be formed by the application of a surface treatment 226 to the interior of valve region 224. For example, a hydrophobic surface treatment 226 may be used to obstruct the flow of an aqueous fluid through valve region 224, while a hydrophilic surface treatment may obstruct the flow of a non-polar fluid through valve region 224. Alternatively, surface treatment 226 may include a dried material that, when dissolved in the fluid, modifies the surface tension of the fluid.

Figure 12:
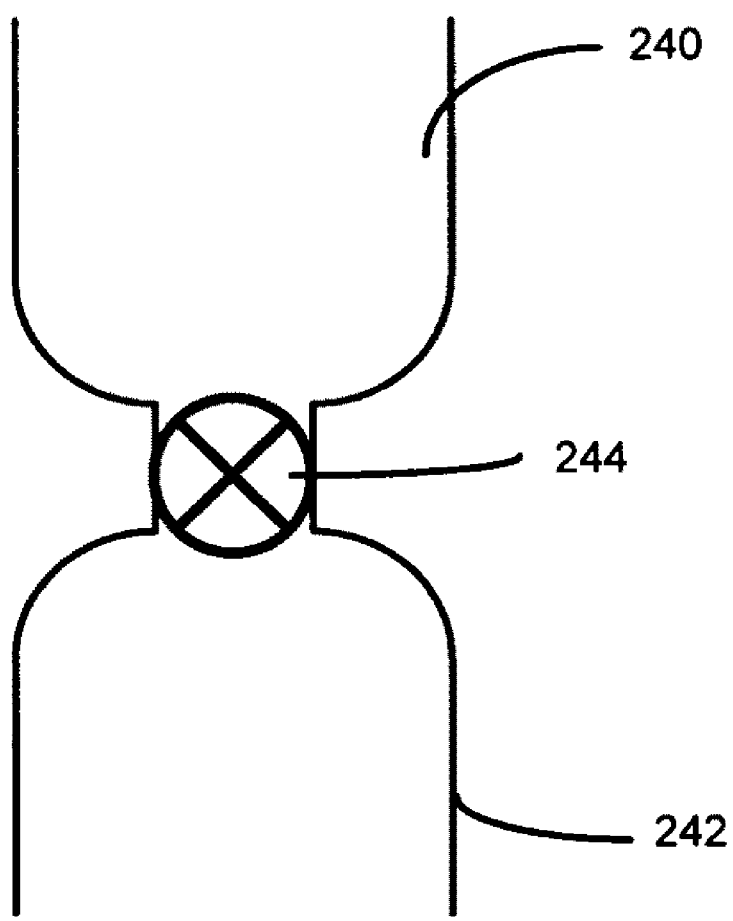
FIG. 12 illustrates a microvalve.

Different types of microvalves may be used in various embodiments. In some embodiments, micromechanical valves may include elements that physically block a fluid channel, and are controllable by various means. Such micromechanical valves may include, for example colloidal or polymeric valve elements that can be moved or changed in size or configuration to open the valve. A few examples are described, for example in U.S. Pat. Nos. 6,837,476, 6,802, 489, and 6,793,753, all of which are incorporated herein by reference in their entirety FIG. 12 depicts in schematic form a fluid chamber 240 separated from a degradation sensitive region 242 by a microvalve 244.

Degradation of data may take place by various mechanisms, and may include degradation or modification of data, data storage medium, and/or substrate. Degradation of the data storage medium may include one or more of destruction of the data storage medium, modification of the data storage medium, modification of data stored in the data storage medium, and modification of signal-to-noise ratio of data stored in the data storage medium. Degradation may take place directly in response to a degradation inducing influence, or it may be initiated by a degradation inducing influence but continue to completion after removal of the degradation inducing influence. This may be the case, for example, if the degradation inducing influence provides input of an activation energy sufficient to overcome an energetic barrier and set off a chemical process that proceeds without further input of energy once initiated. A degradation inducing influence may produce degradation directly, or may function as an intermediary to enable or initiate action by a direct degradation inducing influence. Degradation may include various combinations of two or more degradation mechanisms, and in some embodiments may be produced by synergistic or cooperative effects of two or more degradation inducing or producing factors or influences. In general, release of fluid may produce (directly or indirectly) a modification of a modifiable feature on a data storage device. Examples of modifiable features include, but are not limited to, mechanical properties, optical properties, electrical properties, magnetic properties, or chemical properties. FIGS. 12-20 provide examples of a number of fluid-induced degradation mechanisms, caused by introduction of fluid into a region of a data storage device or removal of fluid from a region of a data storage device. In some embodiments, degradation may occur substantially simultaneously with introduction of fluid, e.g., substantially instant destruction of data may be obtained.

Figure 13A:
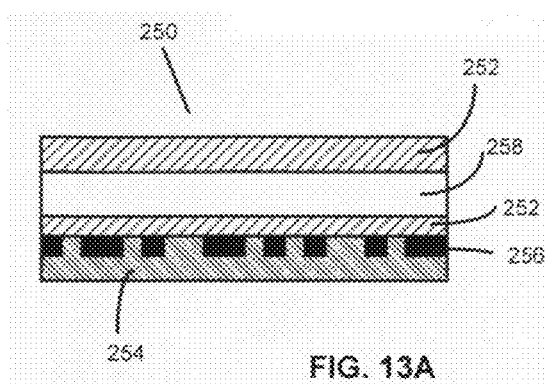
FIGS. 13A and 13B illustrate degradation of a portion of a data storage medium produced by introduction of a fluid.
Figure 13B:
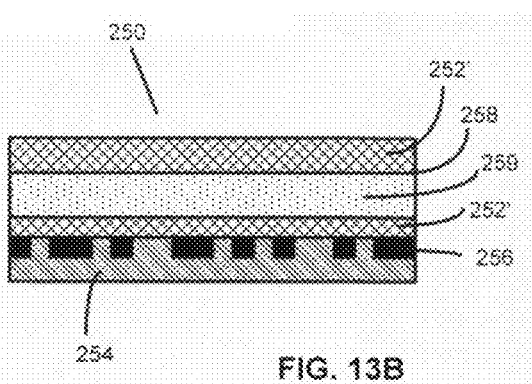

In FIG. 13A, a portion of a data storage device 250 is depicted. Data storage device 250 includes a substrate 252 and a data storage medium 254 storing binary data 256, represented by a pattern of black blocks representing one of two states of data storage medium 254. A channel 258 runs through substrate 252. Channel 258 is empty in FIG. 13A. In FIG. 13B, fluid 259 has filled channel 258. The presence of fluid 259 causes degradation substrate 252 to form degraded substrate 252', through which data 256 cannot be read. Degradation of substrate 252 may include a change in a material property of the substrate or a change in shape or conformation of the substrate material, such as thickness or surface texture. Material properties may include optical properties such as reflectivity, index of refraction, transmissivity, light scattering, electrical properties, magnetic properties, and so forth. Modifications to material properties, shape, or conformation may be caused by a phase change, chemical reaction, melting, etching, corrosion, etc. of the substrate material due to exposure to fluid. Many specific combinations of substrate material and degradation inducing fluid may be used; examples include the combination of water (or other aqueous fluids) with water-absorbing polymers that expand upon exposure to water; the combination of an oxidation-inducing fluid in combination with a substrate containing colorless compounds that may be oxidized to form colored compounds, such as indigo carmine, methylene blue, thionin, gallocyanine, among others, as discussed in U.S. Pat. No. 6,011,772, which is incorporated herein by reference.

Figure 14A:
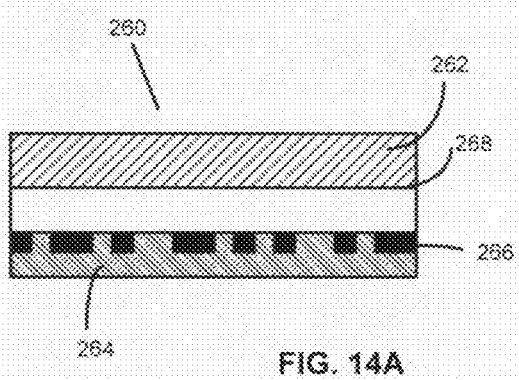
FIGS. 14A and 14B illustrate degradation of data produced by introduction of a fluid.
Figure 14B:
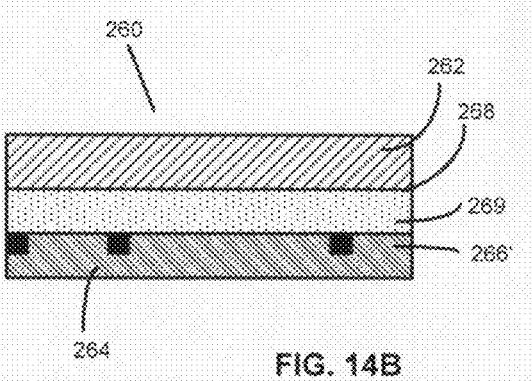

FIGS. 14A and 14B illustrate a portion of a data storage device 260. Data storage device 260 includes a substrate 262 and a data storage medium 264 storing binary data 266, again represented by a pattern of black blocks representing one of two states of data storage medium 264. A channel 268 runs between substrate 262 and data storage medium 264. Channel 268 is empty in FIG. 14A. In FIG. 14B, fluid 269 has filled channel 268. The presence of fluid 269 causes degradation of data 266 stored in data storage medium 264. Degraded data 266' is readable but does not contain the correct information. Modification or destruction of data may be caused by a phase change or chemical produced in the data storage medium due to exposure to the degradation inducing fluid. For example, in optical disks, a reflective layer of metallic aluminum may be used as a data storage medium. Exposure of metallic aluminum to an aqueous salt solution, for example, may result in oxidation of the aluminum to form non-reflective hydroxy salts.

Figure 15A:
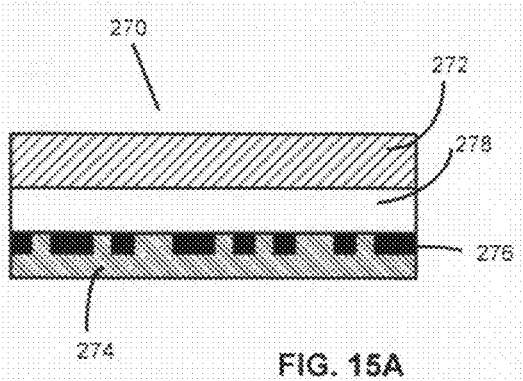
FIGS. 15A and 15B depict blocking of reading of data by a fluid.
Figure 15B:
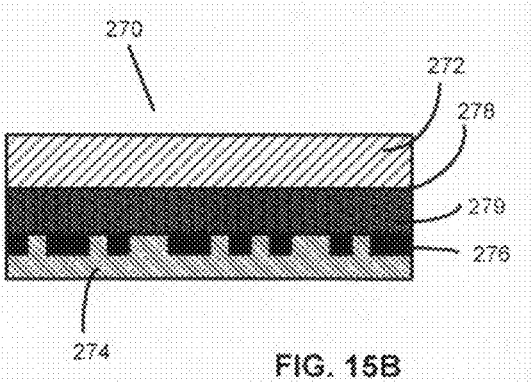

FIGS. 15A and 15B illustrate a portion of a data storage device 270, which includes a substrate 272, data storage medium 274 containing data 276, and fluid channel 278. Data is read through substrate 272 and channel 278 when channel 278 is empty. Reading could be by various means, for example, optically, magnetically, electrically, and so forth. As shown in FIG. 15B, when fluid 279, which is opaque or non-transmissive to the read signal, fills channel 278, reading of data through substrate 272 is blocked. Fluid 279 may absorb, reflect, scatter, or otherwise interfere with a signal used to read data 276. Fluids may absorb, reflect, scatter, or otherwise be non-transmissive to electrical signals, optical signals, magnetic signals, or various other signals used to read data 176 from data storage medium 274. Fluids that may be used to block optical reading of data include various dye solutions. Fluids containing ferric and/or ferrous materials may be used to block magnetic reading of data include.

FIGS. 16A and 16B illustrate degradation of a region of a data storage device 280 produced by release of a fluid from the region. Data storage device 280 includes substrate 282, data storage medium 284 containing data 286, and channel 288 containing fluid 289. Data 286 may be read through substrate 282 and fluid 289. In FIG. 16B, fluid 289 has been release from channel 288 so that it is empty (i.e., it fills with air that enters via an air channel when fluid 289 is released). In the absence of fluid 289, the substrate degrades to degraded substrate 282', which is non-transmissive to the read signal and thus prevents reading of data 286. Substrate 282 may degrade when exposed to one or more components of air, or it may be an unstable material that is preserved by the presence of the fluid but degrades with the release of fluid from channel 288. Possible combinations of substrate and fluid that exhibit these properties include substrates that include a colorless compound that is oxidized upon exposure to air to form a colored compound (e.g. methylene blue, thionin, indigo carmine, or gallocyanine) used in combination with an oxidation-protective fluid such as a buffer.

Similarly, FIGS. 17A and 17B illustrate degradation of data produced by release of a fluid from a region 290 of a data storage device. Fluid channel 298 is formed between substrate 292 and data storage medium 294, which contains data 296. Fluid 299 is contained in fluid channel 298. In FIG. 17B, fluid 299 has been released, leaving channel 298 empty. In the absence of fluid 299, data 296 stored in data storage medium 294 is modified or degraded to degraded data 296', which may be readable but does not contain usable information. Possible combinations of data storage medium and fluid that result in such a degradation pattern include metallic data storage media used in combination with an oxidation-protective fluid.

FIGS. 18A and 18B illustrate optical interference with data reading produced by release of a fluid. In FIG. 18A, portion 300 of a data storage device includes a substrate 302, data storage medium 304 containing data 306, and channel 308 containing fluid 309. Fluid 309 may have an index of refraction that matches that of substrate 302, to permit optical reading of data 306. When fluid 309 is released from channel 308, as depicted in FIG. 18B, a mismatch between the index of refraction of substrate 302 and air contained in channel 308 may hinder reading of data 306.

Figure 19A:
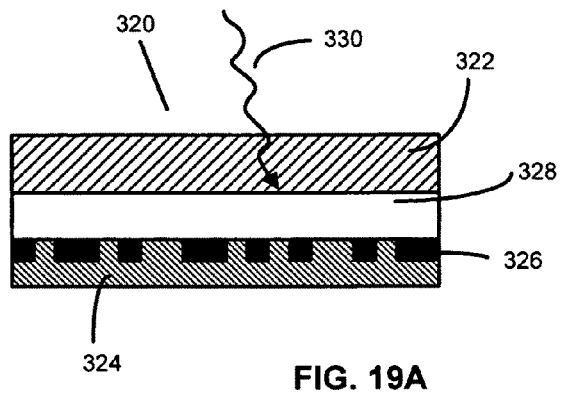
FIGS. 19A and 19B depict degradation of a portion of a data storage medium produced by a fluid acting in combination with an additional degradation inducing factor.
Figure 19B:
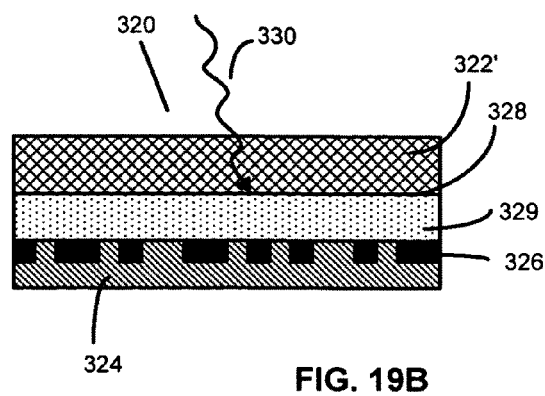

In FIGS. 19A and 19B, a portion of data storage device 320 is depicted which includes substrate 322, data storage medium 324, and channel 328 between substrate 322 and data storage medium 324. Data storage medium 324 contains data 326. Data storage device 320 is exposed to an additional degradation inducing factor or influence 330, which may be, for example, heat, light, other forms of electromagnetic radiation, pressure, a magnetic field, or an electrical field. Additional degradation inducing factor 330 has no effect by itself, but, as depicted in FIG. 19B, when fluid 329 is introduced into channel 328, fluid 329 and additional degradation inducing factor 330 act synergistically or in cooperation to produce degradation of substrate 322 to degraded form 322', to block reading of data 326. Additional degradation inducing factor 330 may function to provide activation energy for a reaction involving fluid 329 and substrate 322.

Figure 20A:
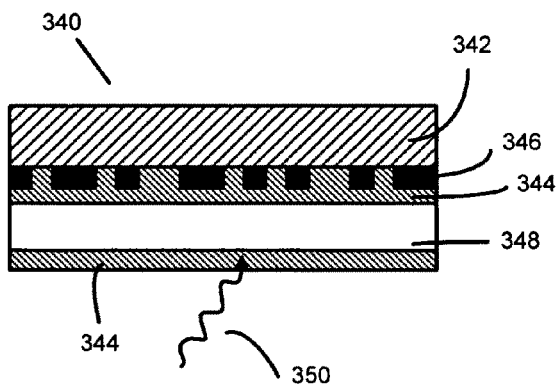
FIGS. 20A and 20B depict degradation of data produced by a fluid acting in combination with an additional degradation inducing factor.
Figure 20B:
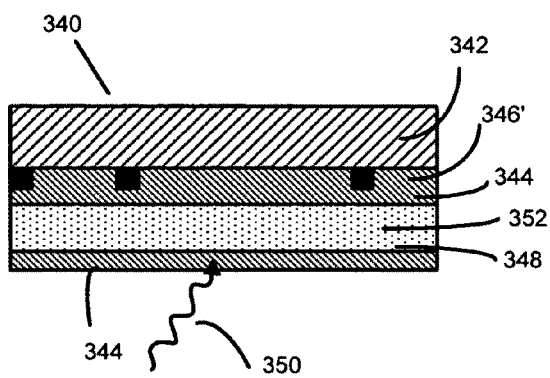

For example, fluid 329 may contain a reactant that will participate in a reaction (e.g., a reduction or oxidation reaction) upon exposure to an additional degradation inducing factor as listed above to produce a change in color or dimension of substrate 322. FIGS. 20A and 20B depict a portion of data storage device 340, which includes substrate 342 and data storage medium 344, which contains stored data 346 and has a channel 348 running through it. Data storage medium 344 is exposed to additional degradation inducing factor 350.

Additional degradation inducing factor 350 has no effect until, as in FIG. 20B, fluid 352 is introduced into channel 348. Additional degradation inducing factor 350 may be, for example, heat, light, other forms of electromagnetic radiation, pressure, a magnetic field, or an electrical field. Fluid 352 and additional degradation inducing factor 350 act in combination to produce degradation of data 346 to degraded form 346'. As discussed above, additional degradation inducing factor may provide activation energy to a chemical reaction between fluid 352 and data 346 sotred in data storage medium 344.

Figure 21A:
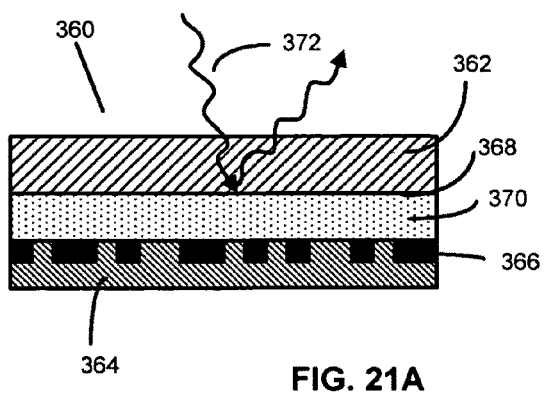
FIGS. 21A and 21B depict a fluid blocking degradation of data by an additional degradation inducing factor.
Figure 21B:
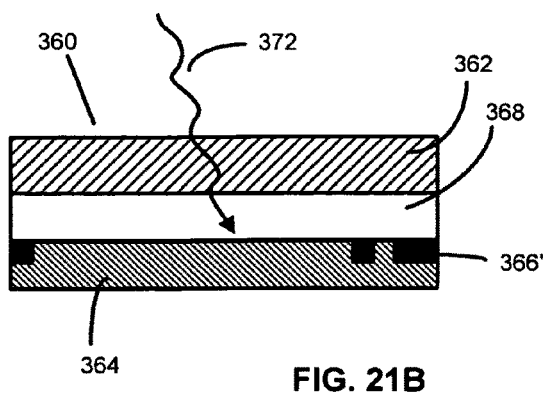

In another embodiment, a fluid may be released from a region of a data storage device to permit exposure of a degradation sensitive region to degradation by an additional degradation inducing factor. In FIG. 21A, a portion of data storage device 360 includes substrate 362 and data storage medium 264 containing data 366. Fluid 370 contained within channel 368 may block exposure of data storage medium 364 to degradation inducing factor 372. As shown in FIG. 21B, when fluid is released from channel 368, data storage medium 364 is exposed to degradation inducing factor 372, which converts data stored therein to a degraded form 366'. For example, degradation inducing factor 372 may be light, and fluid 370 may be a fluid that blocks transmission of light, examples of which are provided above. As an alternative, degradation inducing factor 372 may be a magnetic field, and fluid 370 may be a fluid that blocks or otherwise modifies transmission of the magnetic field, for example, a fluid containing ferrous and/or ferric materials. Various combinations of degradation inducing factors and blocking fluids may be designed for use in various embodiments, by a practitioner of skill in the relevant arts.

The specific type of fluid that may produce degradation of substrate, data storage medium, or data, as illustrated in the forgoing examples, will depend upon the materials used as substrate and data storage medium, and the method by which data is read. Fluids may have various chemical, optical, electrical, physical, thermal, and/or other properties selected to work in combination with data storage device materials, and, in some embodiments, with additional degradation inducing influences, to produce a desired effect. Similarly, the additional degradation inducing influence may be selected based upon choice of substrate, data storage medium, and fluid type. Exemplary combinations have been presented. Additional combinations will be apparent to the practitioner of skill in the art, and the foregoing examples are not intended to be limiting. As used herein, the term 'fluid' may include a variety of materials having fluid-like properties, including but not limited to liquids, gases, powders, and various combinations thereof. The term fluid encompasses both homogeneous and inhomogeneous materials or mixtures. Combinations may include emulsions, suspensions, and slurries. In some cases, the fluid may be a combination made up of a fluid or fluid-like carrier material and an active component carried in the carrier material. The carrier material may confer upon the mixture its fluid properties, while the active component may confer upon the fluid its degradation-inducing or degradation-preventing properties.

As noted previously, release of fluid may cause degradation or other modification of a disk immediately upon its release, or it may initiate a process which may take place over some period of time following initiation (by selecting the process appropriately, the process may take place over seconds, minutes, hours, days or weeks, depending upon the particular chemical processes involved). If degradation is not immediate, it may be satisfactory to initiate the degradation process before any data has been read from the disk, and any fluid release mechanism that is activated at some point during a read of data from the data storage medium may be sufficient. If, however, fluid release produces immediate data degradation when it enters the fluid sensitive or fluid responsive region of the data storage medium, then fluid release must be controlled in such a manner that it occurs only after data has been read from the data storage device. If the fluid causes degradation of only key or index data, then it may be acceptable or desirable to release fluid after key or index data has been read from the disk, but possibly prior to reading of data from other areas of the disk. In various embodiments, it may be desirable to control the timing of the release of fluid.

Figure 22:
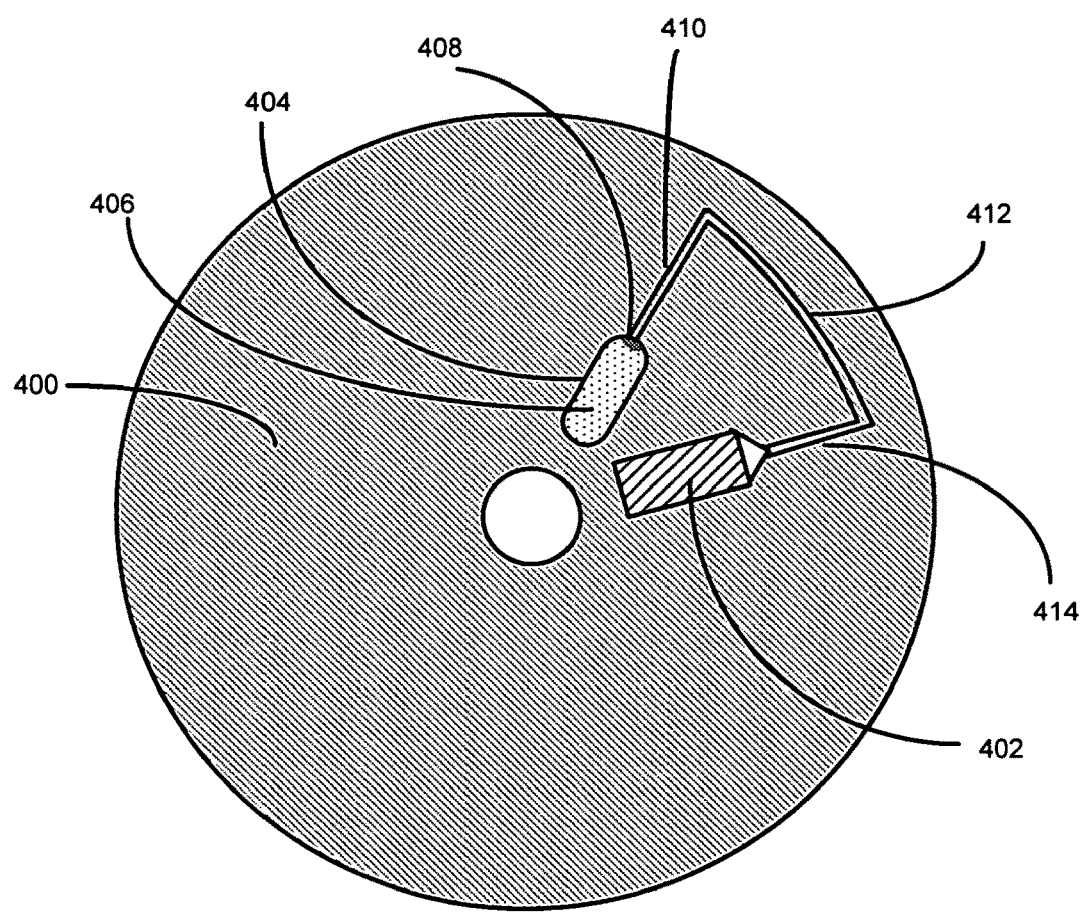
FIG. 22 depicts a disk having a rotation activated fluid release mechanism.

FIG. 22 is an exemplary embodiment of a data storage device configured such that fluid released in such a way that it enters a fluid responsive region following a single read of data from the device. FIG. 22 depicts a data storage device 400 that includes a disk-shaped substrate configured for rotating access. Machine-readable data may be stored in a data storage medium carried by the substrate. The data storage device also includes a fluid release device and associated fluid circuit configured to deliver fluid to a portion of the data stored on the data storage device following a single use of the device. Data storage device 400 includes reservoir 404, which is adapted to contain fluid 406. Data storage device 400 also includes fluid responsive or fluid sensitive region 402, which is configured to receive fluid from reservoir 404 and upon receipt of fluid to undergo a change, which may include any of various types of changes or modifications as depicted in the previous examples. A pressure sensitive barrier 408 between reservoir 404 and fluid responsive region 402 is adapted to prevent flow of fluid from reservoir 404 to fluid responsive regions 402 if the pressure drop across pressure sensitive barrier 408 is below a first pressure difference, and to permit flow of fluid from reservoir 404 to fluid responsive region 402 if the pressure drop exceeds the first pressure difference. First radial channel segment 410 extends radially outward from pressure sensitive barrier 408 and is adapted to receive fluid from reservoir 404. Connecting channel segment 412 is adapted to receive fluid from first radial channel segment 410. Second radial channel segment 414 extends radially inward from connecting channel segment 412 to fluid responsive region 402, and is adapted to deliver fluid from connecting channel segment 412 to fluid responsive region 402.

In use, fluid 406 moves from reservoir 404 when the centrifugal force is sufficient to cause barrier 408 to fail, and moves down first radial channel segment 410 to connecting channel segment 412, driven by centrifugal forces. Fluid 406 may move into connecting channel segment 412 driven by angular acceleration forces, or may be drawn in by capillary forces. Fluid may move through second radial channel segment 414 to fluid responsive region 402 when centrifugal forces decrease to a level where they are surpassed by capillary forces in second radial channel segment 414 and fluid responsive region 402. Centrifugal forces will initially reach the level needed to cause fluid to flow through pressure sensitive barrier 408 when the disk rotates as reading of the disk is initiated, and centrifugal forces may decrease sufficiently to allow fluid to flow into second radial channel segment 414 and to fluid responsive region 402 when the disk decelerates at the end of reading.

Figure 23A:
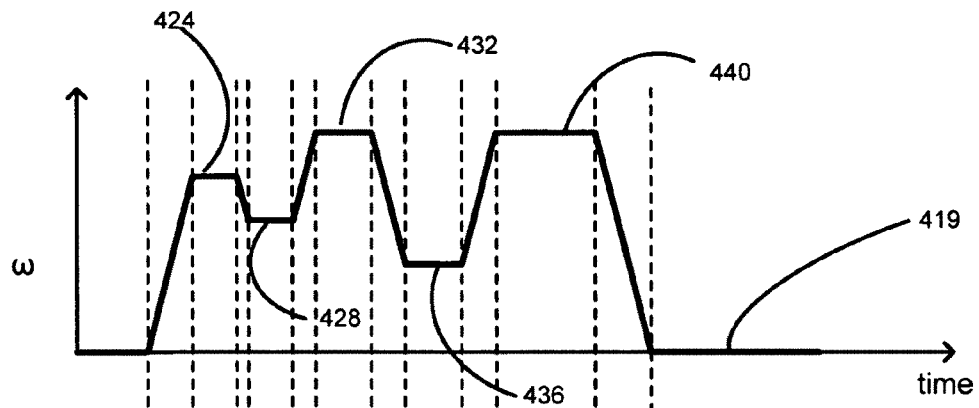
FIG. 23A-23C illustrate exemplary patterns of angular velocity, its derivative, and its square, respectively.
Figure 23B:
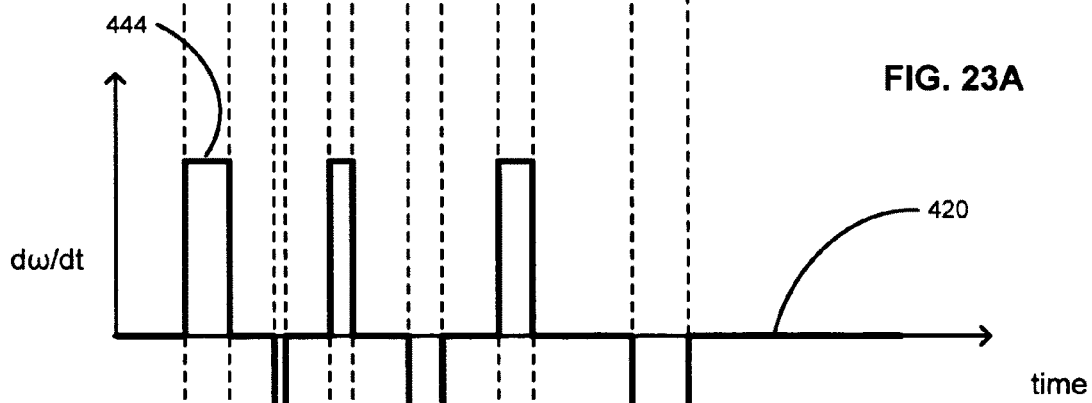
Figure 23C:
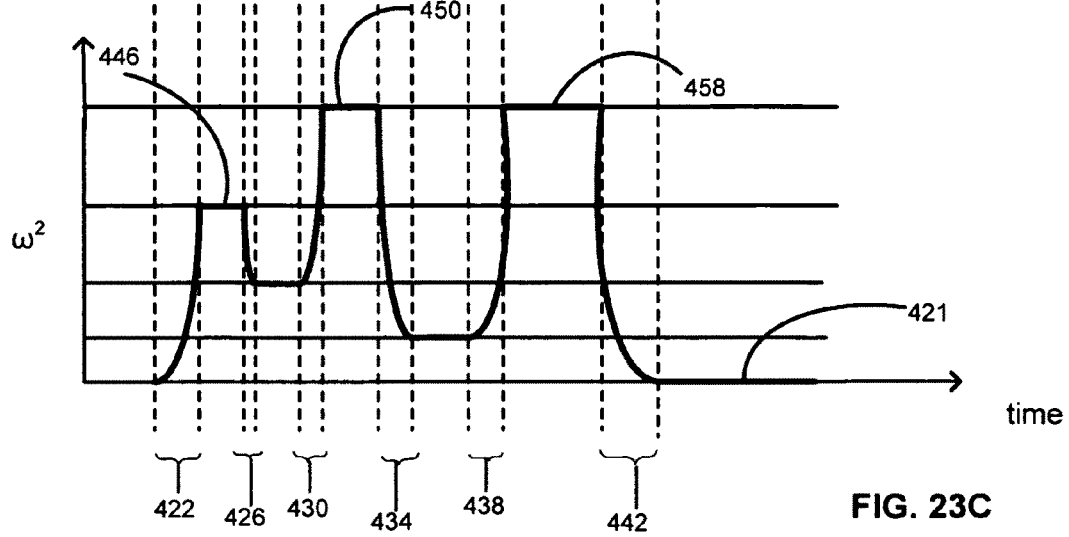

In some embodiments, the pattern of disk rotation that occurs during a single use or reading of a disk may not match the simple acceleration pattern depicted in FIGS. 4A-4C, in which acceleration to a constant velocity is eventually followed by deceleration back to rest. If the disk is read in sequence, in some cases the angular velocity may be varied as a function of distance of the read head from the center of the disk, in order to provide a constant linear velocity at the position of the read head. Moreover, depending on how the data is distributed on the disk, reading may involve multiple accelerations and decelerations. For example, the angular velocity, $\omega$, and corresponding $d\omega/dt$ and $\omega^2$, may be as depicted in FIGS. 23A-23C. In order to control the timing of fluid release with respect to reading of some or all of the data from the disk, the expected pattern of disk rotation during reading of the disk may be taken into account, the inertial forces due to angular and centripetal acceleration determined, and pressure sensitive barrier and fluid channels on the disk must be configured appropriately. The orientation and break pressure of each pressure sensitive barrier may be selected according to the anticipated rotation pattern, and capillary forces produced by fluid channels such as second radial channel segment 414 in FIG. 22, which may depend upon channel dimensions and combination of channel material and fluid properties, may be selected to operate in cooperation with inertial forces.

FIGS. 23A-23C illustrate $\omega$, and corresponding $d\omega/dt$ and $\omega^2$, in a case where the data storage medium is driven by a motor that produces a constant torque, and hence constant acceleration or deceleration. As shown in FIG. 23A, angular velocity $\omega$, represented by trace 419, increases linearly over time interval 422 to a first constant velocity at peak 424. $\omega$ decreases linearly over time interval 426 to a second constant velocity 428, increases again over time interval 430 to a third constant velocity, 432, decreases over time interval 434 to fourth constant velocity 436, and increases again over time interval 438 to reach fifth constant velocity 440, which is the same as third constant velocity 432. Finally, $\omega$ decreases over time interval 442 until the substrate is at rest. Corresponding values of $d\omega/dt$ and $\omega^2$ are indicated by traces 420 and 421 in FIGS. 23B and 23C, respectively. It can be seen from FIG. 23B that over time intervals 422, 430, and 438, the angular acceleration $d\omega/dt$ is of constant amplitude, but the duration of the acceleration pulses varies depending on the corresponding change in angular velocity.

Similarly, over time intervals 426, 434, and 442, $d\omega/dt$ is of constant negative amplitude, but the duration of the deceleration pulses varies depending on the corresponding change in angular velocity. The start of disk use could be detected, for example, by providing a fluid release mechanism that was sensitive to long-duration angular acceleration pulse 444. Similarly, the end of disk use could be detected by providing a mechanism sensitive to long-duration angular deceleration pulse 446. Centrifugal forces, proportional to $\omega^2$, may show peaks, e.g., 446, 450, and 458 as depicted in FIG. 23C, that may be differentiated by duration-sensitive mechanisms, offering further possibility for controlling the timing of disk activation or deactivation.

Figure 24A:
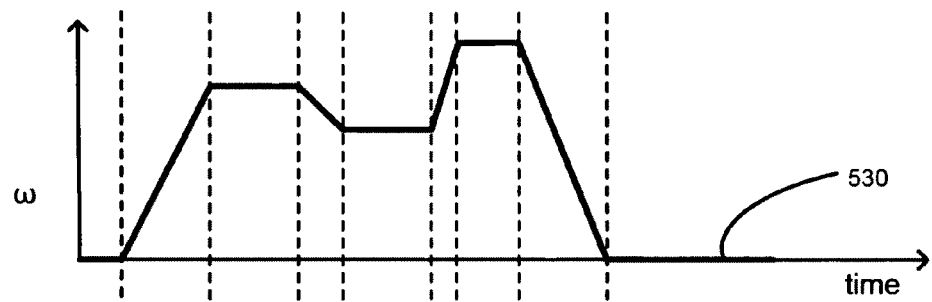
FIG. 24A-24C illustrate exemplary patterns of angular velocity, its derivative, and its square, respectively.
Figure 24B:
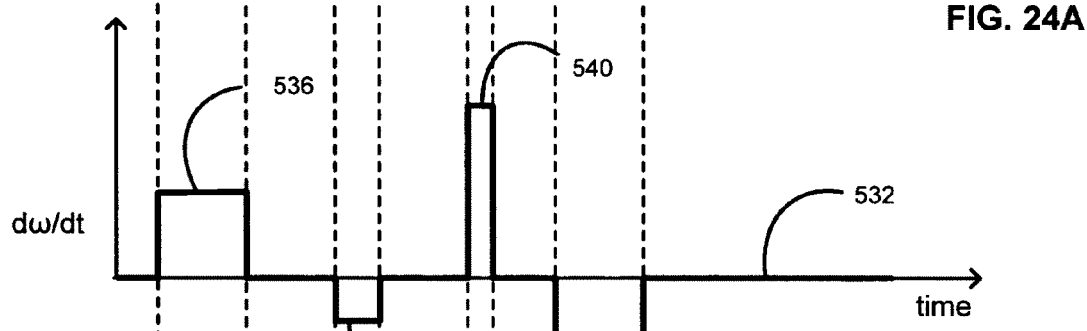
Figure 24C:
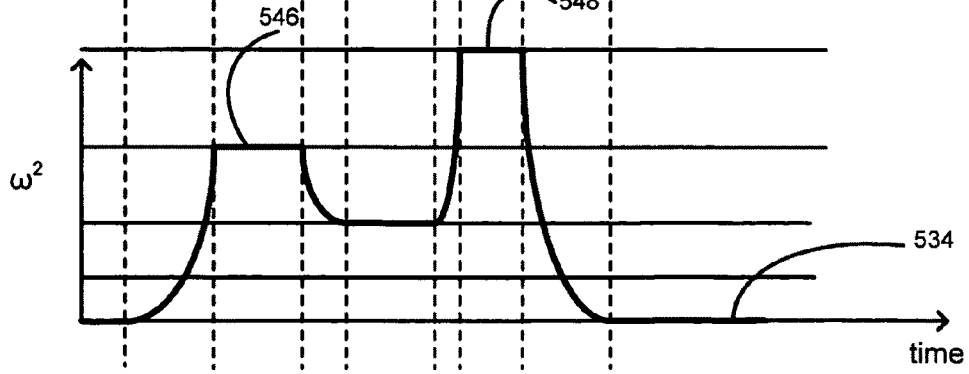

FIGS. 24A-24C depict a further pattern of angular velocity $\omega$, indicated by trace 530 in FIG. 24A. The corresponding pattern of angular acceleration $d\omega/dt$ is indicated by trace 532 in FIG. 24B, and the corresponding value of $\omega^2$, proportional to the associated "centrifugal force" is represented by trace 534 in FIG. 24C. In the example of FIGS. 24A-24C, the magnitude of angular acceleration $d\omega/dt$ (and the associated inertial forces) is variable, so different segments of disk use may be characterized by differences in amplitude as well of duration in angular acceleration forces. Note that angular acceleration peaks 536 and 540 differ in both amplitude and duration; similarly, angular deceleration peaks 538 and 544 differ in amplitude and duration. Centrifugal forces, proportional to $\omega^2$, as indicated by trace 534 in FIG. 24C, similarly show differences in amplitude and duration (e.g., peaks 546 and 548) that may be detected by appropriately configured fluid release devices.

In some embodiments, it may be desirable to produce activation of a fluid release mechanism at a particular time during during a use of a data storage device. This can be accomplished easily in the case that angular acceleration only occurs at the beginning of each use, and angular deceleration occurs only at the end of each use (as depicted in FIGS. 4A-4C) by orienting fluid release devices so that they are sensitive to angular acceleration or deceleration, as desired. If multiple angular accelerations and decelerations occur during a single use, as depicted in FIGS. 23A-23C and 24A-24C, then it may be possible to set a threshold value for response of a fluid release device to angular acceleration, so that fluid may be released during the highest acceleration condition that occurs during use of the data storage device. Similarly, a threshold value may be set for angular deceleration, so that fluid may be released during the highest deceleration condition that occurs during use of the data storage device. In some embodiments, amplitude of disk acceleration may not provide a sufficient basis for controlling timing of fluid release during use of the disk, but duration of acceleration may be used for identifying a time when fluid should be released. For example, if a constant torque motor is used, a long acceleration period will be necessary to bring the disk up to speed initially, and a long deceleration period will be necessary to bring the disk back to rest at the end of a use, but changes in speed during a single use may involve shorter periods of acceleration or deceleration. Therefore, the beginning and end of a single use may be identified through the use of a mechanism that is responsive to acceleration or deceleration, respectively, of a specified duration. Fluid valves that are sensitive to the duration of exposure to rotational forces may be used.

Another method for controlling timing of fluid release during use of a data storage device is to combine fluid release with exposure of a fluid-sensitive portion of the data storage device to an additional degradation inducing influence. Degradation inducing influence may include heat, light, other forms of electromagnetic radiation, pressure, a magnetic field, or an electrical field. The use of fluid release in combination with an additional degradation inducing factor is shown in FIGS. 20A and 20B or FIGS. 21A and 21B. In these examples, degradation is produced by combining release of a fluid, which may occur at some point during a use of a device, with an additional factor. For example, if the additional factor is a beam of light from a read head, the disk may be configured so that the degradation sensitive region is located on a portion of the disk that is exposed to light from the read head only once during use of the device, e.g. at the end of use when the read head passes over the edge of the disk as it returns to its 'parked' position. Providing fluid is release at some time during use of the device, the degradation sensitive portion of the disk will respond when it is exposed to light, which occurs at a well-defined time during use of the disk. Accordingly, the degradation is produced or initiated at a well-defined time even if the timing of fluid release is not precisely controlled, but is known to happen at some point during use of the disk.

The previous exemplary embodiments are suitable for producing or initiating disk activation or deactivation by modifying a feature of a data storage device at some point during a single use of the device. However, in many cases it may be desirable to produce disk deactivation (or modify the availability of certain data on the disk) after multiple uses of the data storage device. For example, a demo disk may be useable for a fixed number of uses before it becomes unuseable, or a rental DVD containing a movie may be useable for a limited number of viewings.

Figure 25:
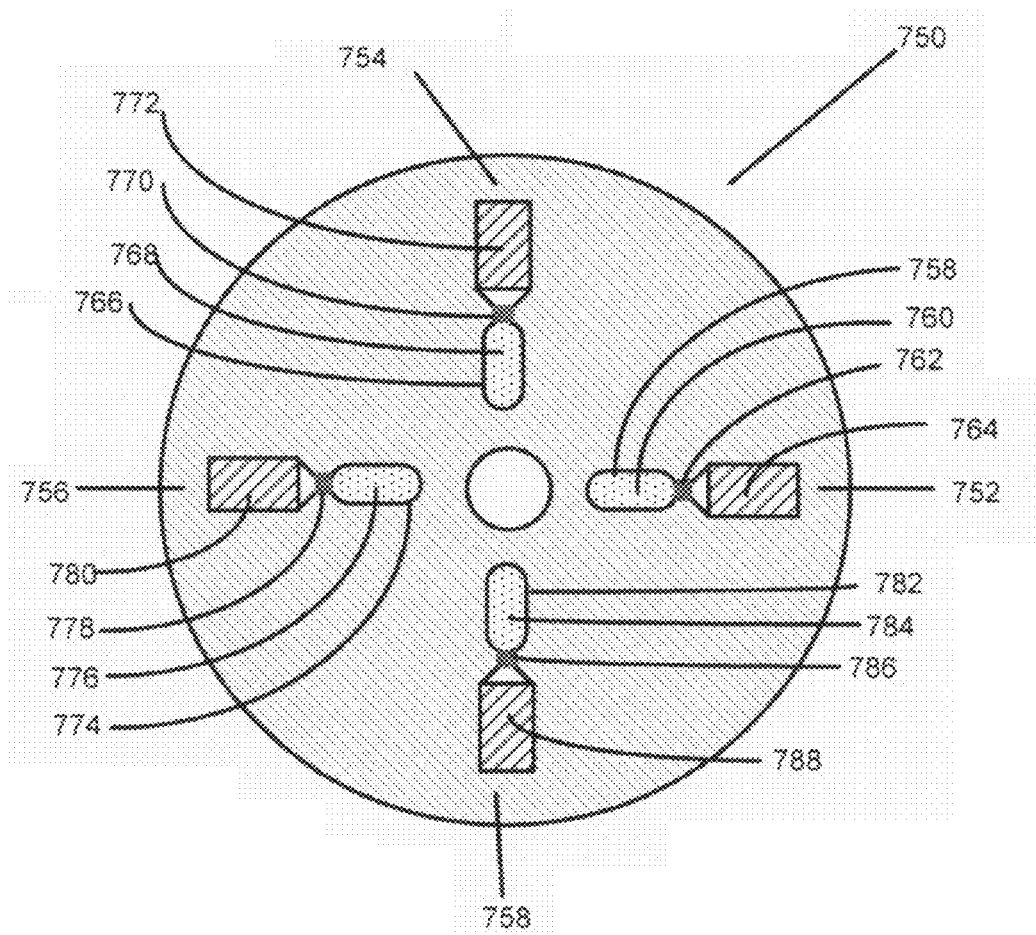
FIG. 25 illustrates a data storage device having a plurality of centrifugally activated fluid release mechanisms.

FIG. 25 depicts an exemplary data storage device that is configured for producing disk deactivation after a selected number of uses of the disk. One approach for detecting multiple uses of a data storage device (e.g., for the purpose of limiting access to the data storage device after a certain number of uses) is to provide methods for modifying the disk during normal use in such a way that structures on the disk that are modified by use are modified in sequence over multiple uses, rather than all being modified by a single use. This may be accomplished by setting different thresholds for the different structures, and driving the disk differently (e.g. at a higher speed) on each subsequent use. FIG. 25 illustrates a data storage device 750 with a plurality of centrifugally activated fluid release devices 752, 754, 756, and 758, of the type depicted in FIGS. 5, 6A and 6B. Fluid release device 752 includes fluid chamber 758 containing fluid 760, fluid barrier 762, and degradation sensitive region 764. Similarly, fluid release device 754 includes fluid chamber 766 containing fluid 768, fluid barrier 770, and degradation sensitive region 772, fluid release device 756 includes fluid chamber 774 containing fluid 776, fluid barrier 778, and degradation sensitive region 780, and fluid release device 758 includes fluid chamber 782 containing fluid 784, fluid barrier 786, and degradation sensitive region 788. Fluid release devices 752, 754, 756, and 758 may be configured to be activated in sequence over a number of uses of data storage device 750. This may be accomplished by various methods. In one embodiment, fluid barriers 762, 770, 778, and 786 may be configured to break at different pressures. For example, the first fluid barrier may break at a rotation speed obtained during normal use of the device. On a subsequent use of the device, activation of the first fluid release device may be detected, and the drive may produce rotation a first above-normal speed of rotation for a period sufficient to activate a second fluid release device. Similarly, on each subsequent use of the device, activation of at least the most recently activated fluid release device may be detected, and following detection, the disk may be rotated at a speed of rotation sufficient to activate the next fluid release device. Thus, a selected number of uses of the device may be detected, until the maximum allowable number of uses has been reached, and the disk is deactivated. The device and methodology associated with FIG. 25 may be carried out with the use of a modified disk drive or drive controller, in order to obtain higher rotations with each used of the disk. However, by appropriately configuring the rotation sensitive structures on the disk, the sensitivity of each structure to rotation may be modified by release of fluid by the preceding fluid release mechanism. Accordingly, modification of each structure other than the first is dependent upon prior modification of at least one other structure. Modification of a first structure may modify the sensitivity of another structure by various methods, for example, by releasing a fluid that dissolves a barrier to air or fluid movement, by opening or closing an electrical circuit to produce modification of an electrically sensitive fluid barrier (e.g., formed by an electroactive polymer, piezoelectric material, or MEMS structure).

Figure 26B:
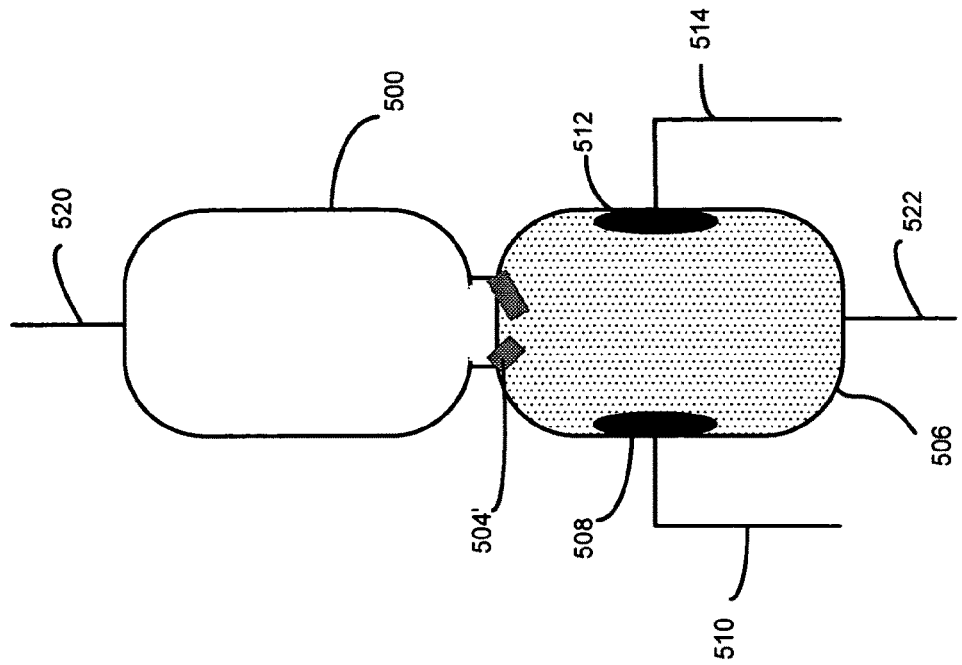
FIGS. 26A and 26B depict an embodiment of a fluid switch.
Figure 26A:
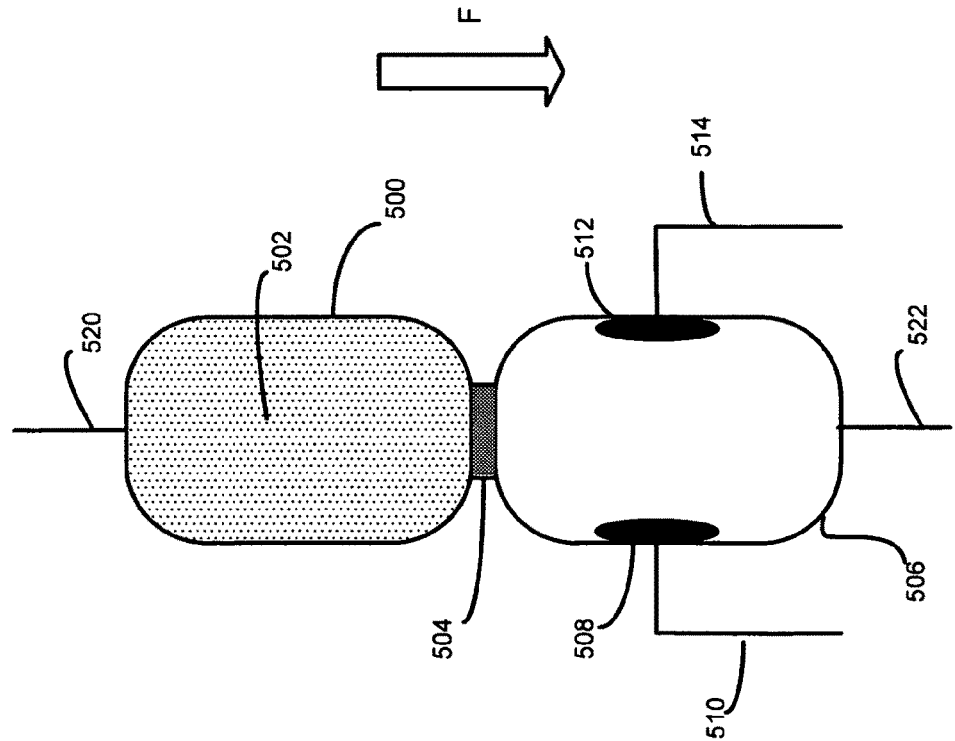

A rotation activated fluid switch capable of opening or closing an electrical circuit can be constructed as depicted in FIGS. 26A and 26B and 27A and 27B. The fluid switch of FIGS. 26A and 26B is closed by release of fluid from a fluid chamber. FIG. 26A shows first chamber 500 containing an electrically conductive fluid 502, which is retained in chamber 500 by barrier 504. Also shown is second chamber 506, which includes electrical contact 508 connected to lead 510, and electrical contact 512 is connected to lead 514. Second chamber 506 may initially be filled with air or with a non-conductive fluid. When fluid 502 is subjected to a force (e.g., a centrifugal force), it may break through barrier 504 (to form a ruptured barrier 504') and enter second chamber 506. Air vents 520 and 522 may be required to permit fluid 502 to move from first chamber 500 to second chamber 506. When fluid 502 fills second chamber 506, fluid 502 forms an electrical connection between contact 508 and 512, thus permitting the structure of FIGS. 26A and 26B to function as a switch. Leads 510 and 514 may be connected to various types of electronic circuitry.

Figure 27B:
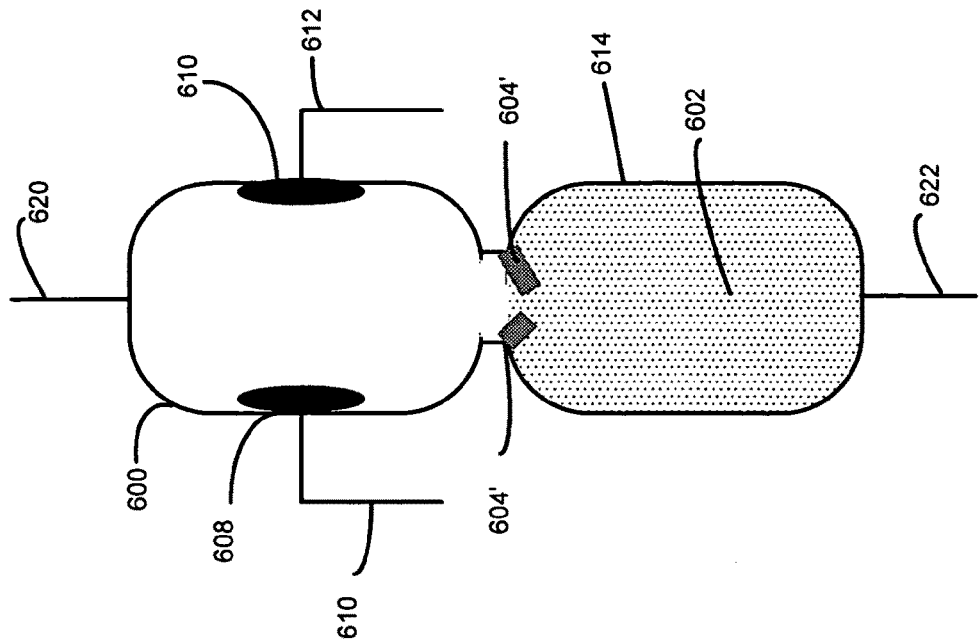
FIGS. 27A and 27B depict another embodiment of a fluid switch.
Figure 27A:
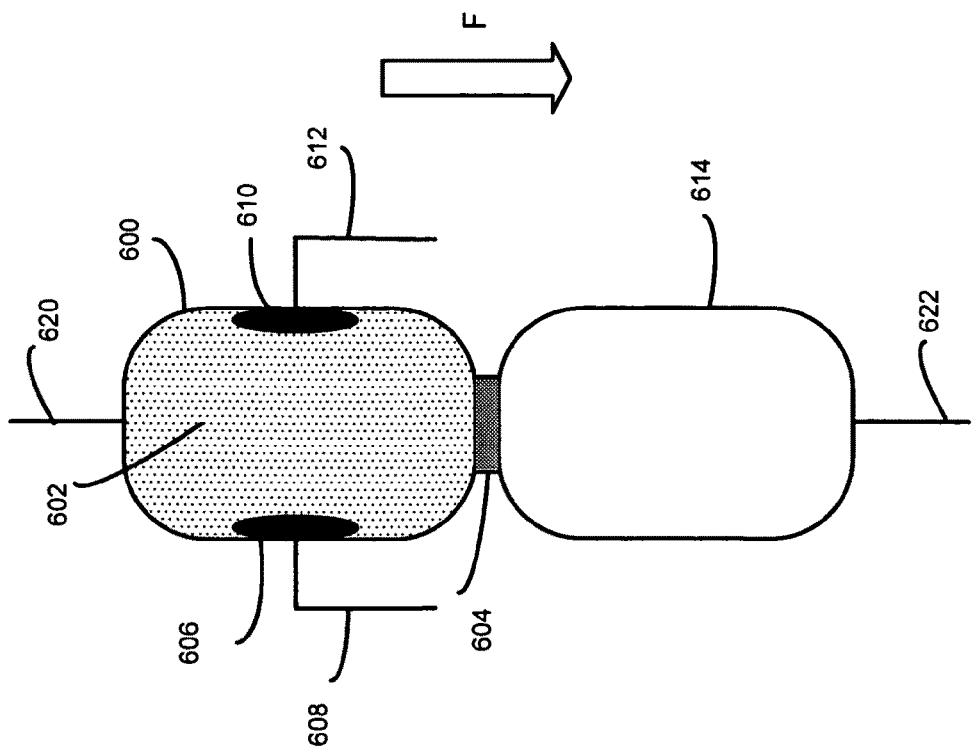

FIGS. 27A and 27B depict another embodiment of a fluid activated switch, similar to that depicted in FIGS. 26A and 26B except that release of fluid from the first chamber causes the switch to open rather than to close. In FIG. 27A, a structure is provided which includes a first chamber 600 filled with conductive fluid 602, and a barrier 604 that prevents the flow of fluid 602 into second chamber 614. In this embodiment, electrical contact 606, connected to lead 608, and electrical contact 610, connected to lead 612, are located in first chamber 600. Again, air channels 620 and 622 are provided to permit the flow of fluid from first chamber 602 to second chamber 614 when barrier 604' is broken or ruptured, as depicted in FIG. 26B. If fluid 602 is a conductive fluid, the electrical circuit (switch) between leads 608 and 612 is closed when fluid 602 is contained in first chamber 600, and is opened when fluid 602 breaks through barrier 604 and moves into second chamber 614.

Opening or closing of a switch (which may be a fluid switch or other type of switch) may be utilized in various ways to produce modification or degradation of data, or render data unreadable or otherwise inaccessible. Several methods are illustrated in FIGS. 28A-28B, which are exemplary of a larger number of methods that may be used.

Figure 28A:
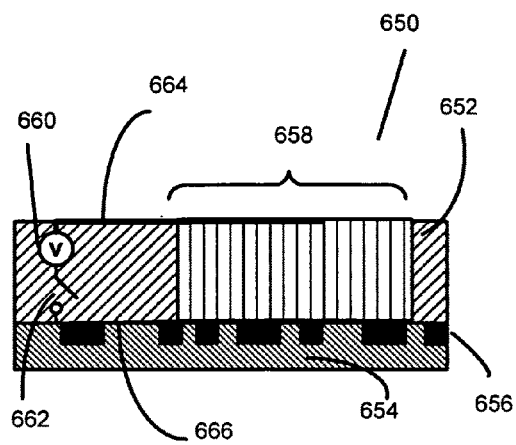
FIGS. 28A and 28B illustrate blocking of reading of data by closing a switch.
Figure 28B:
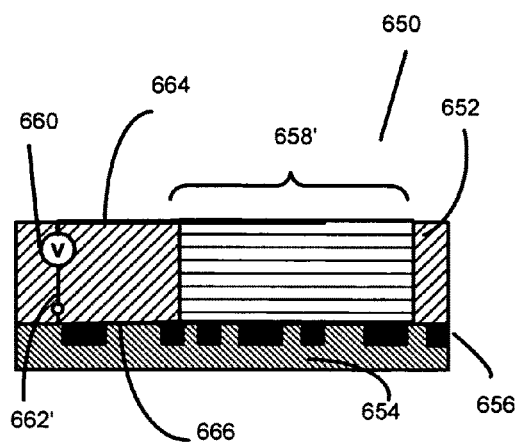

FIGS. 28A and 28B illustrate blocking of reading of data by closing a switch. A system 650, which is a portion of a data storage device such as an optically readable disk, is shown. The data storage device includes substrate layer 562 and data storage medium 654, in which is stored binary data 656. Data 656 may be read through substrate layer 652, e.g., via light delivered and sensed by an optical read head. Region 658 of substrate layer 652 includes a voltage sensitive material. Lead 664 and lead 666 are connected to opposite sides regions of voltage sensitive region 658. Voltage source 660 and switch 662 are connected in series between leads 664 and 666. When switch 662 is open, region 658 of substrate 652 is in a state that permits optical reading of data 656. When switch 662 is closed (with closed configuration indicated by 662'), however, as depicted in FIG. 28B, voltage sensitive region 658 transforms to a different state, indicated by reference number 658', through which data 656 cannot be read. Voltage sensitive region 658 may be formed, for example, from a liquid crystal or various other materials that are responsive to an applied voltage. Voltage source 660 may include any of a number of devices or structures that are capable of storing or generating electrical potentials. For example, piezoelectric structures on the disk may convert vibration or other motion in the disk to voltages. Alternatively, electrostatic charges may be accumulated on the rotating disk. Switch 662 may be a fluid switch as depicted in FIGS. 24A-25B, or may be some other type of switch.

Figure 29A:
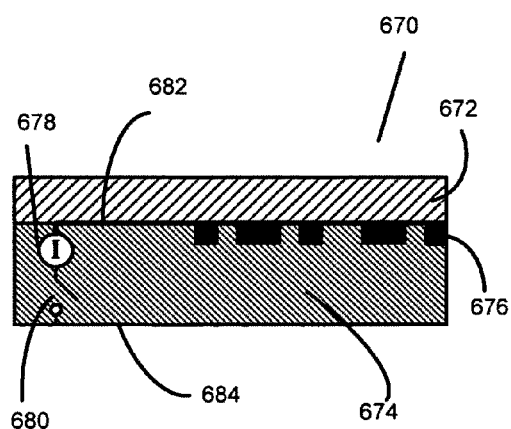
FIGS. 29A and 29B illustrate producing destruction of data by closing a switch.
Figure 29B:
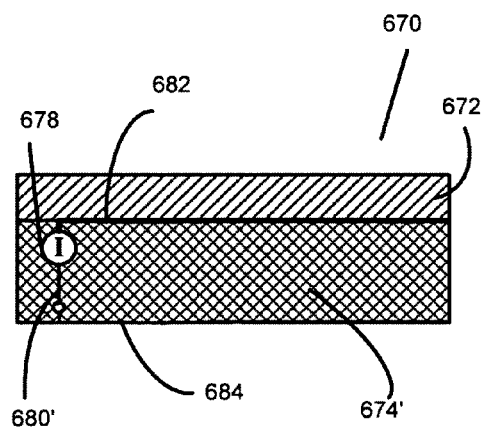

FIGS. 29A and 29B illustrate degradation of data by closing a switch. In this example, a portion 670 of a data storage device is shown, which includes substrate layer 672 and data storage medium 674, which contains data 676. Leads 682 and 684 are connected to opposite sides of data storage medium 674. Current source 678 and switch 680 are connected in series. Current source 678 may be any structure capable of generating an electric current or capable of having an electric current induced within it. For example, the disk may include circuitry (e.g., a conductive loop) for generating current on the disk by induction from magnetic fields produced by nearby structures, such as the drive servo motor. When the switch is in a closed state 680', as shown in FIG. 29B, current passes through data storage medium 674 to convert it to degraded state 674', so that data 676 is lost. In this example, data storage medium 674' has been converted to a state in which no data values are stored.

Figure 30A:
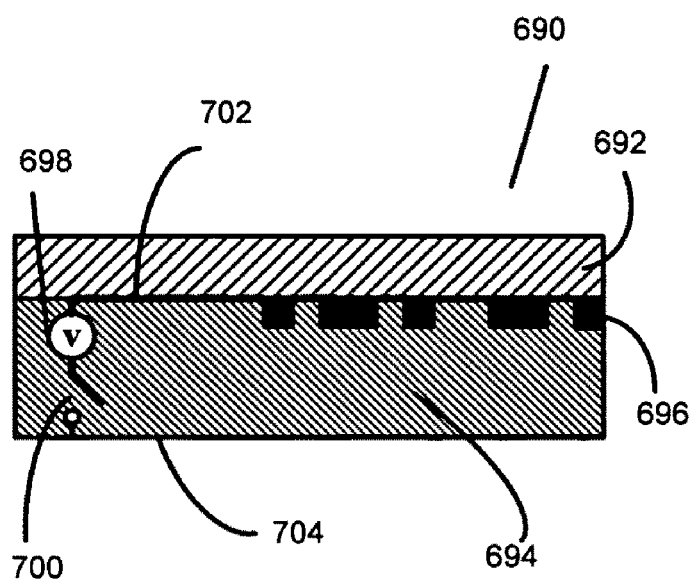
FIGS. 30A and 30B illustrate producing modification of data by closing a switch.
Figure 30B:
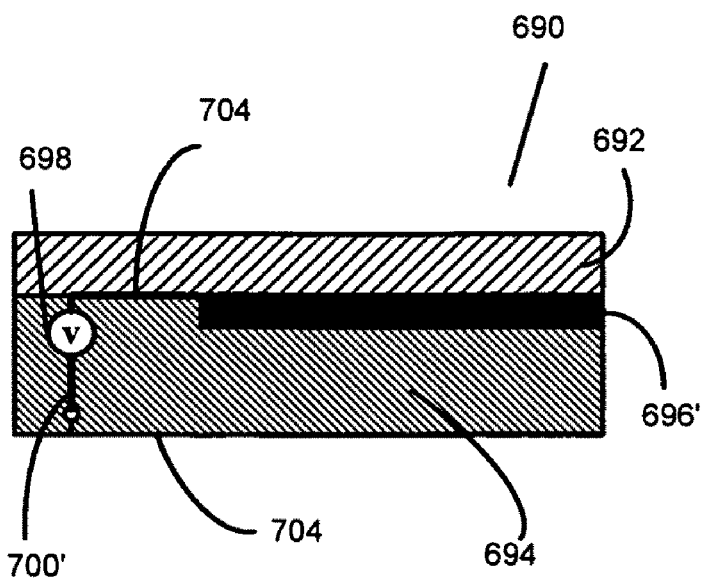

In other cases, data stored in a data storage medium may be modified, so that the data stored therein is readable, but does not contain meaningful or useful information. For example in FIG. 30A, a portion 690 of a data storage medium is shown which includes substrate 692 and data storage medium 694 containing data 696. Voltage source 698 and switch 700 are connected in series across data storage medium 694, by means of leads 702 and 704. When switch 700 is opened, as indicated in FIG. 30B by reference number 700', data stored in data storage medium 694 is converted to modified data 696'. For example, data 696, which included a pattern of logical '1's and '0's, may be converted to a pattern of all '1's or all '0's, as represented by the modified data 696'.

Fluid switches as depicted in FIGS. 26A, 26B, 27A and 27B utilize fluid to open or close an electrical circuit. By replacing electrical contacts with light conductors, an optical fluid switch could be constructed, which might be used to control the exposure of a light sensitive data storage medium to light or control additional optical circuitry on the disk.

As discussed above, in some embodiments, it may be desirable to produce or initiate data degradation of substrate, data, or data storage medium only after a selected number of uses or reads of the disk have been performed. Various methods may be devised to track the number of times a disk or other data storage device has been used based on the state of the disk. In some embodiments, the disk drive may be controlled appropriately to activate a different fluid release device upon each use of the device. In other embodiments, the disk may include multiple structures that are activated in sequence over multiple uses of the device, where activation of each structure facilitates activation of the next structure.

Figure 31:
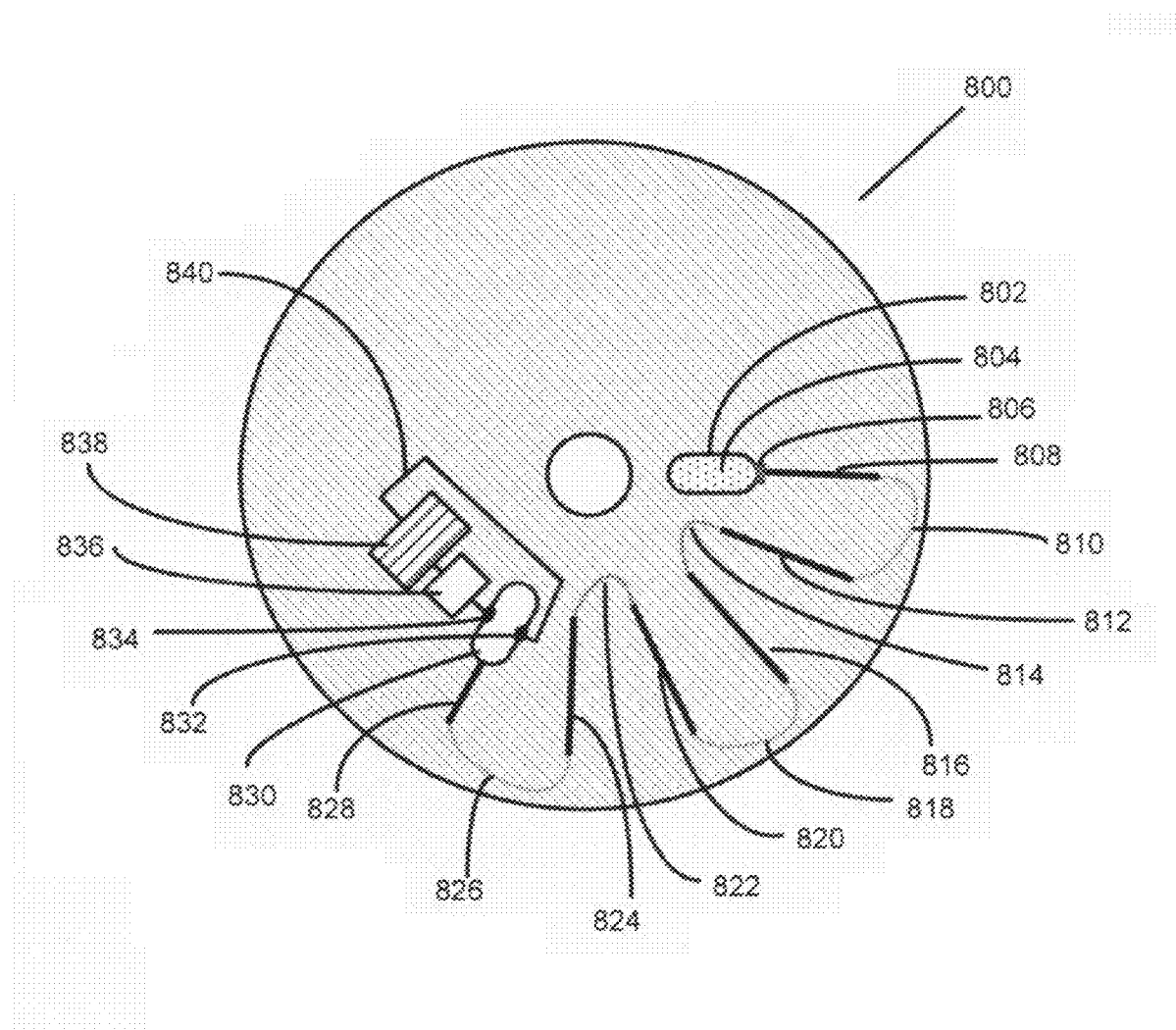
FIG. 31 illustrates a data storage device with a fluid release mechanism activatable over multiple uses.

FIG. 31 illustrates a data storage device 800 with a fluid switch that is activatable by multiple uses. In FIG. 31, fluid chamber 802 contains a conductive fluid 804 retained by barrier 806. First outward channel segment 808 extends radially outward from fluid chamber 802 and leads to first distal channel segment 810. First distal channel segment 810 connects to first inward channel segment 812, which lead to first proximal channel segment 814. During a first use of data storage device 800, data storage device 800 is rotated at a velocity that produces a centrifugal force in fluid 804 sufficient to break barrier 806, following which fluid 804 moves down first outward channel segment 808 to first distal channel segment 810. Fluid 804 is retained in first distal channel segment 810 until rotation of data storage device 800 decreases sufficiently, at the end of the first use. Fluid 804 then moves through first inward channel segment 812 to first proximal channel segment 814, where it resides until the next use of the device. Note that sizes and surface characteristics (hydrophilicity, hydrophobicity, etc.) of the various channel segments can be selected to promote desired movement of fluid in the channel segments, and that appropriate selection of channel dimensions and surface characteristics may generate capillary forces that act in cooperation with forces generated by rotation of data storage device 800. During a second use of data storage device 800, fluid moves from first proximal channel segment 814, through second outward channel segment 816 to second distal channel segment 818. At the end of the second use, fluid moves through second inward channel segment 820 to second proximal channel segment 822, where it resides until the next use of the device. Finally, upon the third use of the device, fluid moves from second proximal channel segment 822, through third outward channel segment 824, and to third distal channel segment 826. At the end of the third use, fluid moves through third inward channel segment 828 and into fluid chamber 830. Fluid chamber 830 may include contacts 832 and 834, to form a fluid switch as described previously in connection with FIGS. 26A-26B and 27A-27B. It should be noted that the dimensions of the fluid chambers and channels depicted in FIG. 31 are not exact, and that the actual dimensions of the fluid containing structures may be selected so that the entire fluid volume from fluid chamber 802 may be contained by each distal or proximal channel segment, and, eventually, fluid chamber 830. When fluid fills fluid chamber 830 to close the fluid switch and form a closed circuit by connecting line 840 between electronic circuit components 836 and data storage region 838), electronic components 836 cause a modification of data storage region 838. The modification may be any modification of data, data storage medium, or substrate, for example as described in connection with any of FIGS. 28A-30B. In related embodiments, fluid chamber 830 may contain a degradation sensitive data storage medium that is degradable upon exposure to a degradation inducing fluid.

As an alternative to using rotationally activated, fluid-mediated mechanisms to produce modification to a data storage medium to render data unreadable or otherwise inaccessible, or to modify, destroy, or erase data, it may also be possible to use other types of rotationally activated mechanisms to produce modifications to a data storage device. FIGS. 32A and 32B depict a rotation activatable mechanical switch, including a cantilever made up of a beam 902 having at its end a mass 904, within a chamber 906 formed in a substrate 908. Electrical contact 910 is located in the wall of chamber 906 and connected to a lead 912. Electrical contact 914 is formed on mass 904 and connected to lead 916, which passes through beam 902. When mass 904 is subjected to sufficient force, in the direction indicated by the arrow F in FIG. 32B, beam 902 may flex, until contacts 910 and 914 touch to form an electrical connection between leads 912 and 916. Leads 912 and 916 may be connected to various electronic circuit components, to produce modification of at least a portion of a data storage device, e.g., as described in connection with FIGS. 28A-30B. The sensitivity of the mechanical switch, i.e., the amount of force required to close the switch, may be controlled by selecting the mass of mass 904 and stiffness of beam 902 appropriately.

Figure 33:
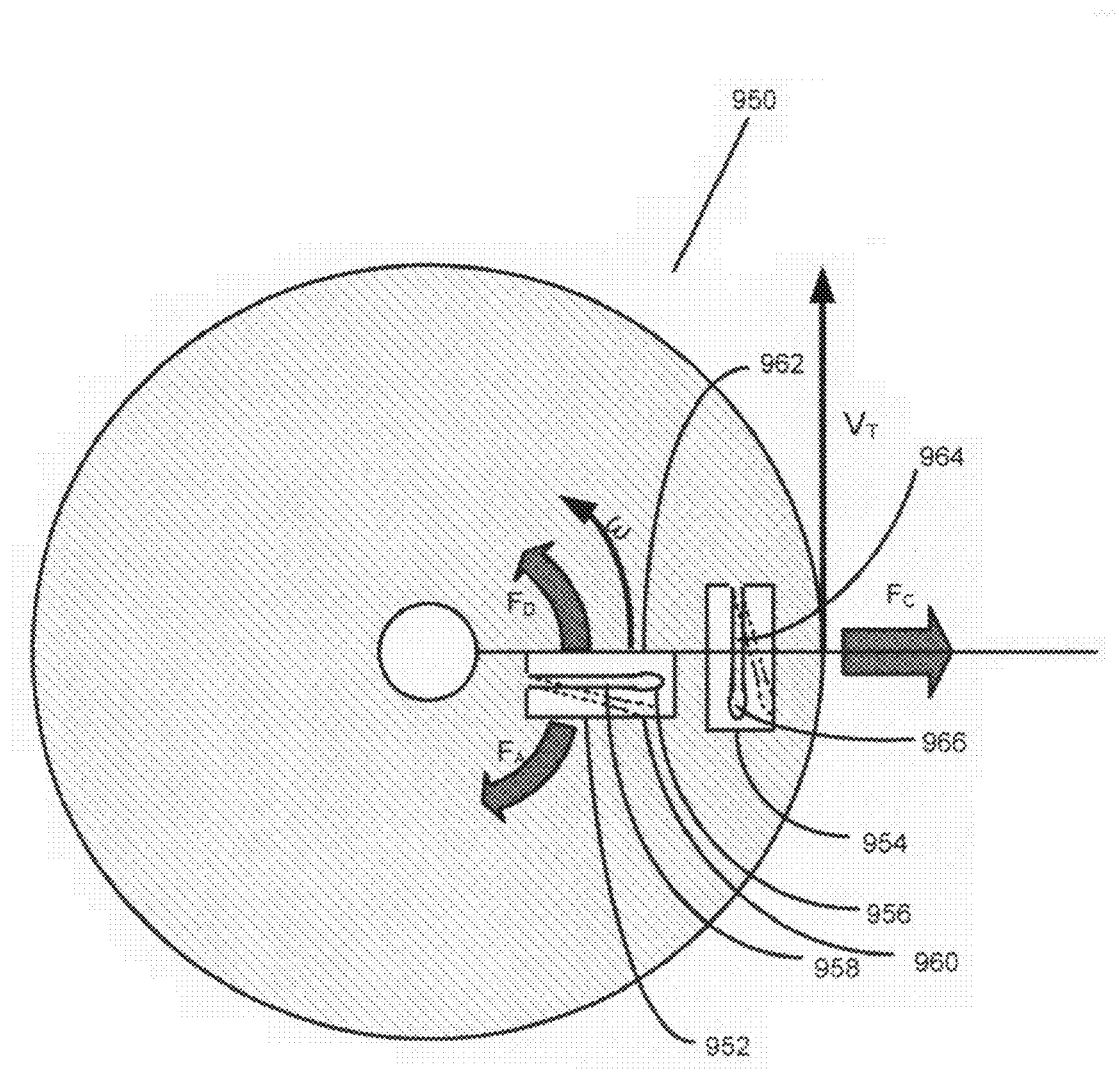
FIG. 33 illustrates different orientations of rotation activatable switches.

FIG. 33 depicts different orientations of rotation activatable mechanical switches of the type depicted in FIGS. 32A and 32B, illustrating how different rotational forces may be used to activate such switches. In FIG. 33, a data storage device 950 includes a first rotation activatable mechanical switch 952 and a second rotation activatable mechanical switch 954. First rotation activatable mechanical switch 952 is oriented with mass 956 at the radial outward end of beam 958, which runs in a radial direction. Beam 958 may be moved toward contact 960 by inertial force $F_A$ during angular acceleration in the direction indicated by the arrow ω, which indicates angular velocity. $F_A$ is proportional to the change in the angular velocity ω with respect to time, dω/dt, and has a positive value when the data storage device is accelerating. $F_A$ will be zero when the data storage device is rotating at a constant angular velocity, or when it is still. During angular deceleration, beam 958 may be moved toward contact 962, in the opposite direction of arrow ω, by inertial force $F_D$. $F_D$ is proportional to the change in the angular velocity ω with respect to time, dω/dt, and has a positive value when the data storage device is decelerating. $F_D$ will be zero when the data storage device is rotating at a constant angular velocity, or when it is still. Second rotation activatable mechanical switch 954 is oriented with beam 964 parallel to $V_T$, the tangential velocity, and perpendicular to the radial direction. Switch 954 includes mass 966 at the end of beam 964. Second rotation activatable mechanical switch 954 may be activated when by centrifugal force $F_C$, which is proportional to the square of the angular velocity, $ω^2$. Accordingly, $F_C$, will have a positive value for all non-zero values of angular velocity. By selecting the positioning of a rotation activatable mechanical switch appropriately, the switch may be made responsive to various combinations of forces associated with angular acceleration and centripetal acceleration (centrifugal forces).

Data storage devices according to embodiments as described above may include a substrate configured for rotating access, a data storage medium capable of storing machine-readable data carried by the substrate, and a rotation activatable switch configured to undergo a change in state in response to rotation to render unusable at least a portion of machine-readable data stored on the substrate. A change in state may include changing from an open configuration to a closed configuration, or changing from a closed to an open configuration. In some embodiments, the rotation activatable switch may be a centrifugally activatable switch. In other embodiments, the rotation activatable switch may be activatable by angular acceleration of said substrate, or by angular deceleration of said substrate. Various rotation activatable switches designs may be used. The rotation activatable switch may be a micromechanical switch or a fluid switch. In some embodiments, the rotation activatable switch may be a maintained contact switch, while in others it may be a momentary contact switch. The rotation activatable switch may include a cantilever. As depicted in FIGS. 32A and 32B, a cantilever may include a beam having a mass at its end.

Figure 44:
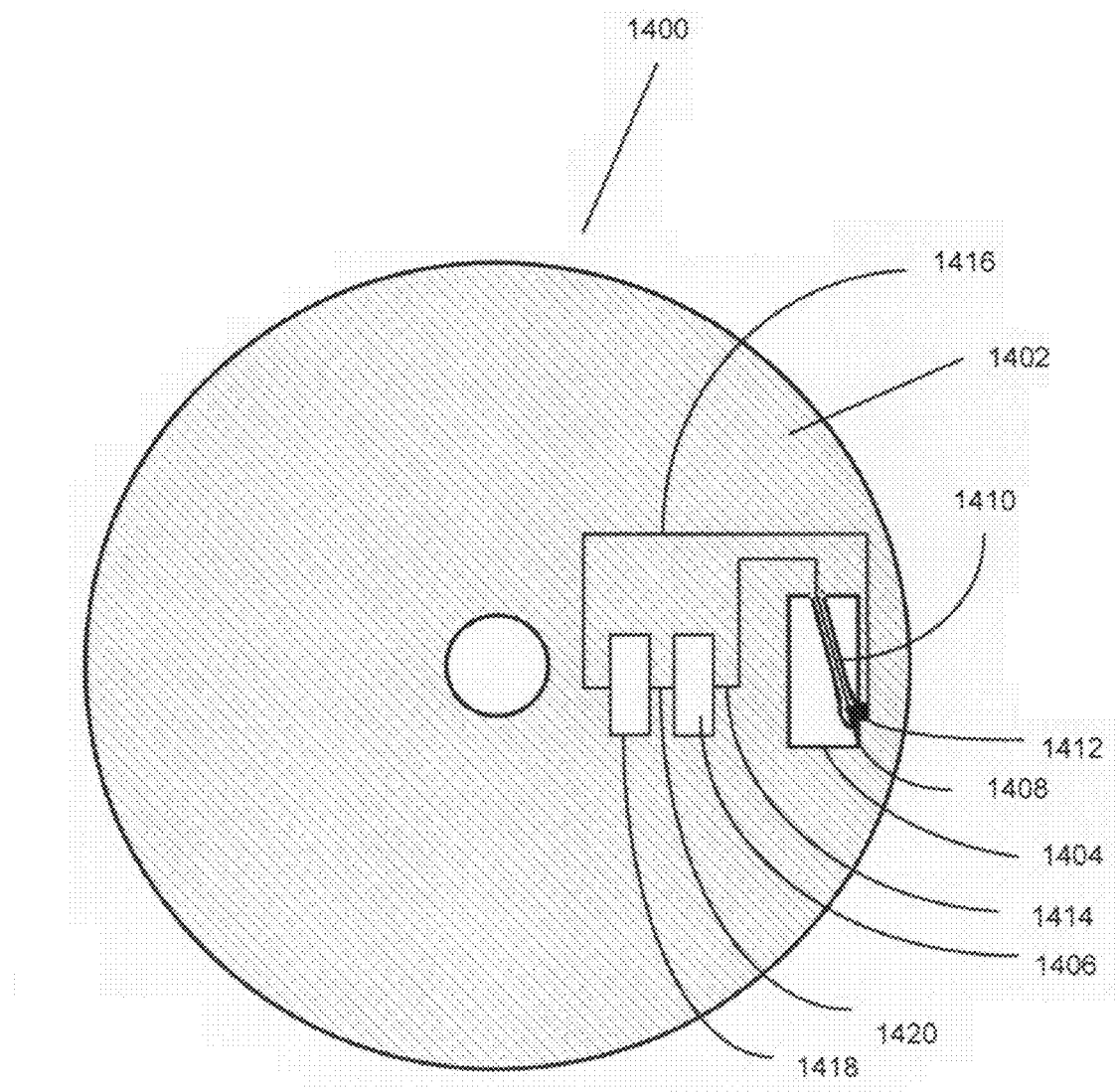
FIG. 44 depicts a data storage device with a rotation activatable switch mechanism.

In some embodiments, e.g., as depicted in FIGS. 44 the data storage device 1400 may include electronic circuitry 1402, and the rotation activatable switch 1404 may be configured to control an electrical connection between at least two portions of said electronic circuitry. Either opening or closing of a switch may be used to produce degradation or modification of data, data storage medium, or substrate in region 1406. When rotation activatable switch 1404 is closed, contact 1408 in cantilever 1410 touches contact 1412, connecting lines 1414 and 1416. The data storage device may include a power source 1418, and the rotation activatable switch may be configured to control delivery of power from the power source to at least a portion of the data storage device. Line 1420 connects power source 1418 to region 1406 in electronic circuit 1402. Various methods of producing degradation or modification of data, data storage medium, or substrate with electronic circuitry are shown in FIGS. 28A and B, FIGS. 29A and B and FIGS. 30 A and B. The data storage device may include a power receiver coil, with the rotation activatable switch configured to control the receipt of power by or distribution of power from the power receiver coil.

According to various embodiments, a limited use memory device may include a substrate, machine-readable data stored on the substrate, and at least one centrifugally activatable switching mechanism on the substrate, with the switching mechanism configured to produce modification of a feature of the memory device. The feature may include, but is not limited to, an optical feature, an electrical feature, or a magnetic feature. The feature may be a feature of the substrate, the machine-readable data, the data storage medium in which the machine-readable data is stored, electronic circuitry on the substrate, or any of various other features that influence presence or readability of data. Modification of the feature may render at least a portion of said machine-readable data inaccessible. In some embodiments, modification of the feature may disable reading of at least a portion of the machine-readable data from the data storage device. The portion of machine readable data comprises information necessary for reading additional data from said data storage device. The information may be, for example, decryption key or index information. In some embodiments, modification of the feature may enable reading of at least a portion of the machine-readable data from the data storage device. Modification of the feature may cause destruction or modification of at least a portion of the machine-readable data, or it may include modification of readability of at least a portion of the machine-readable data. In some embodiments, prior to modification of the feature a first portion of data on the disk may be readable, and following modification of the feature a second portion of data on the disk may be readable.

Figure 45:
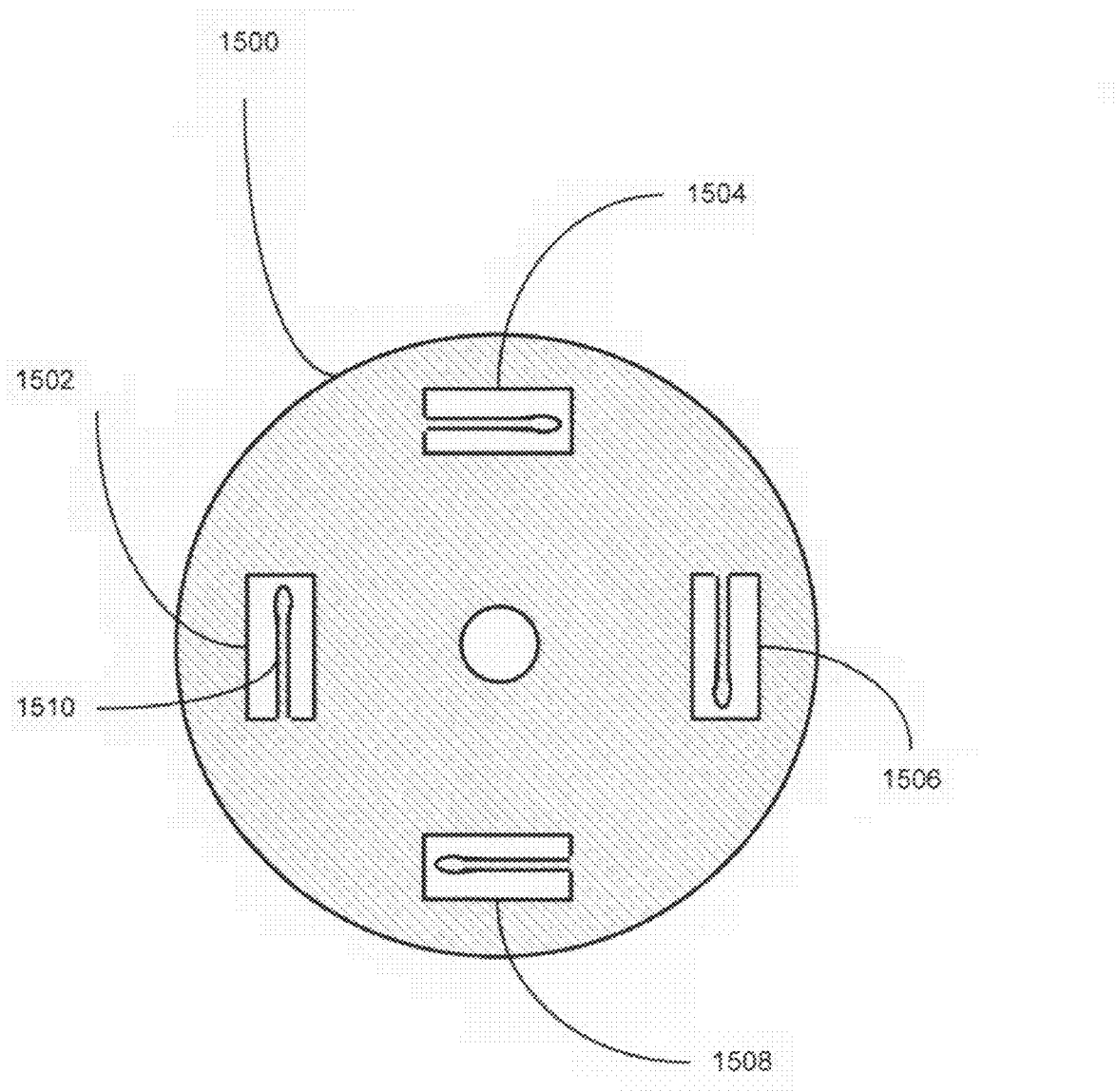
FIG. 45 depicts a data storage device including four rotation activatable switch mechanisms.

The limited use memory device may include a plurality of centrifugally activatable switching mechanisms that are activatable in sequence over a plurality of uses of the memory device and configured such that activation of the plurality of switching mechanisms renders at least a portion of the machine-readable data inaccessible. A use of the memory device may include subjecting the memory device to at least one of angular acceleration or deceleration, for example. A disk 1500 with a plurality of rotation activatable mechanisms 1502, 1504, 1506, and 1508 is depicted in FIG. 45. Operation of disk 1500 is substantially the same as for the device depicted in FIG. 25, with mechanical switching mechanisms in place of fluid switching mechanisms. As described in connection with FIG. 25, rotation activatable mechanisms may be configured to be activated at different levels of centrifugal force, e.g., by adjusting the stiffness of the beam portion of each cantilever appropriately. Beam portion 1510 is indicated in rotation activatable mechanism 1502.

In some embodiments, the data storage device may be an optically readable disk. In some embodiments, the centrifugally activatable switching mechanism may be activatable by spinning the substrate in an optical disk drive at normal read speeds, while in other embodiments, the centrifugally activatable switching mechanism may be activatable by spinning the substrate in an optical disk drive at speeds above normal read speeds. In some embodiments, the data storage device may be a magnetically readable disk, and the centrifugally activatable switching mechanism may be activatable by spinning the substrate in a magnetic disk drive at normal read speeds, while in some embodiments, the centrifugally activatable switching mechanism may be activatable by spinning the substrate in a magnetic disk drive at speeds above normal read speeds.

According to certain embodiments, the data storage device may include a substrate, a data storage medium on the substrate that is degradable upon exposure to a degradation-inducing influence, and a rotation activatable switching mechanism for controlling exposure of the data storage medium to the degradation-inducing influence. Activation of the rotation activatable switching mechanism may produce direct exposure of the data storage medium to the degradation-inducing influence, or it may facilitate degradation of the data storage medium by a secondary degradation-inducing influence. Secondary degradation inducing influences may include, for example, light, electromagnetic fields, and heat. The rotation activatable switching mechanism may be a microswitch that is closable upon exposure to sufficient centrifugal force, such that closure of the microswitch permits electrical current to flow into a selected portion of the data storage device. A microswitch may include a microfabricated cantilever, for example, as depicted in FIGS. 32A and 32B.

Figure 46A:
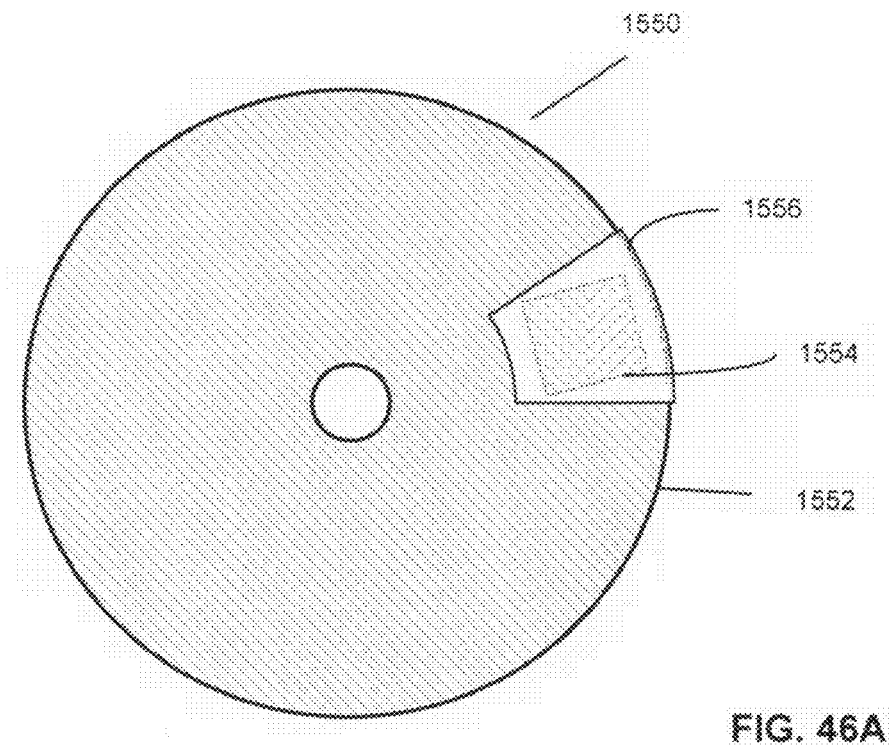
FIGS. 46A and 46B illustrate a data storage device with a rotation-responsive barrier portion.
Figure 46B:
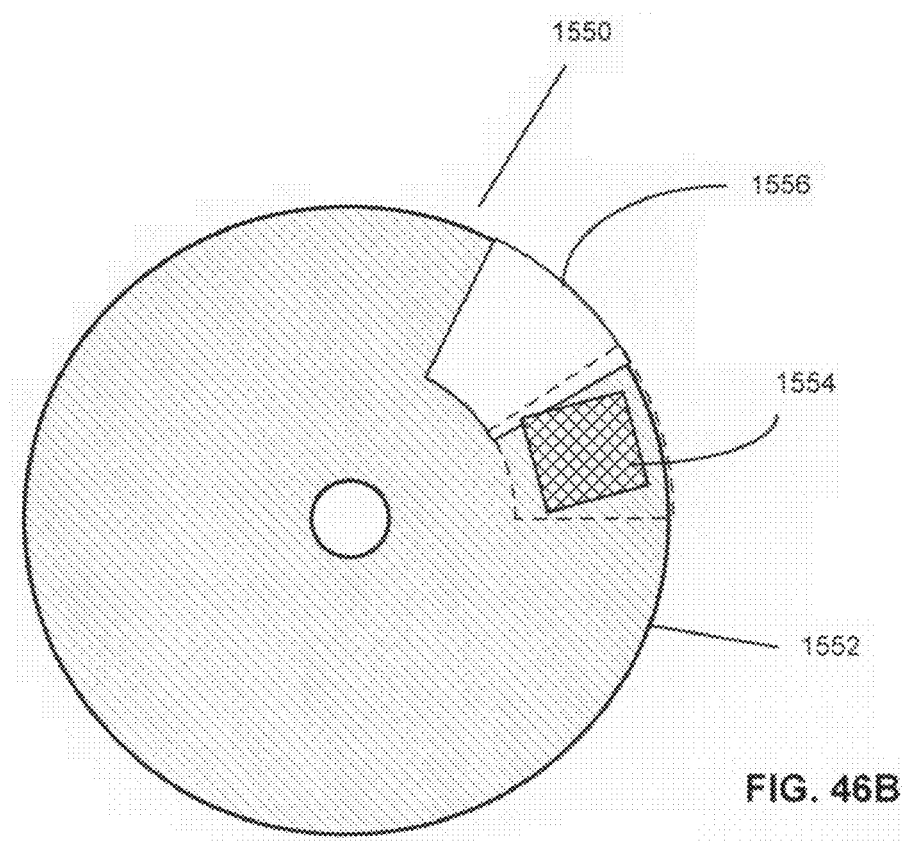
Figure 47A:
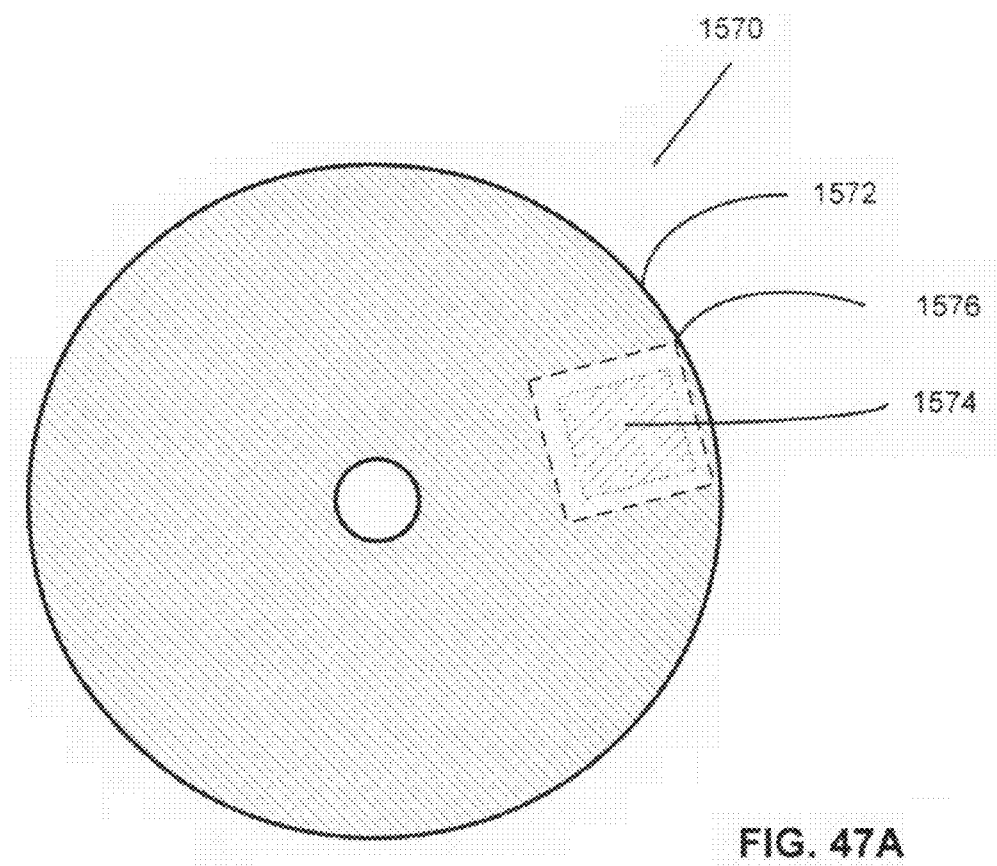
FIGS. 47A and 47B illustrate a data storage device with a rotation-responsive evaporating degradation barrier.
Figure 47B:
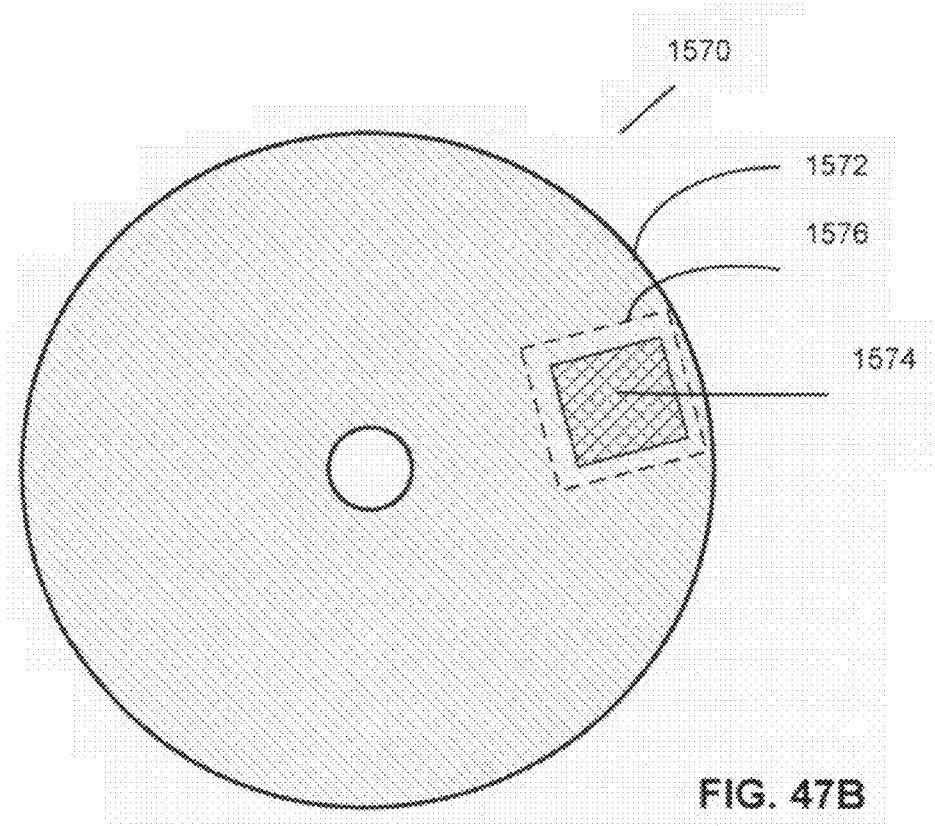
Figure 48A:
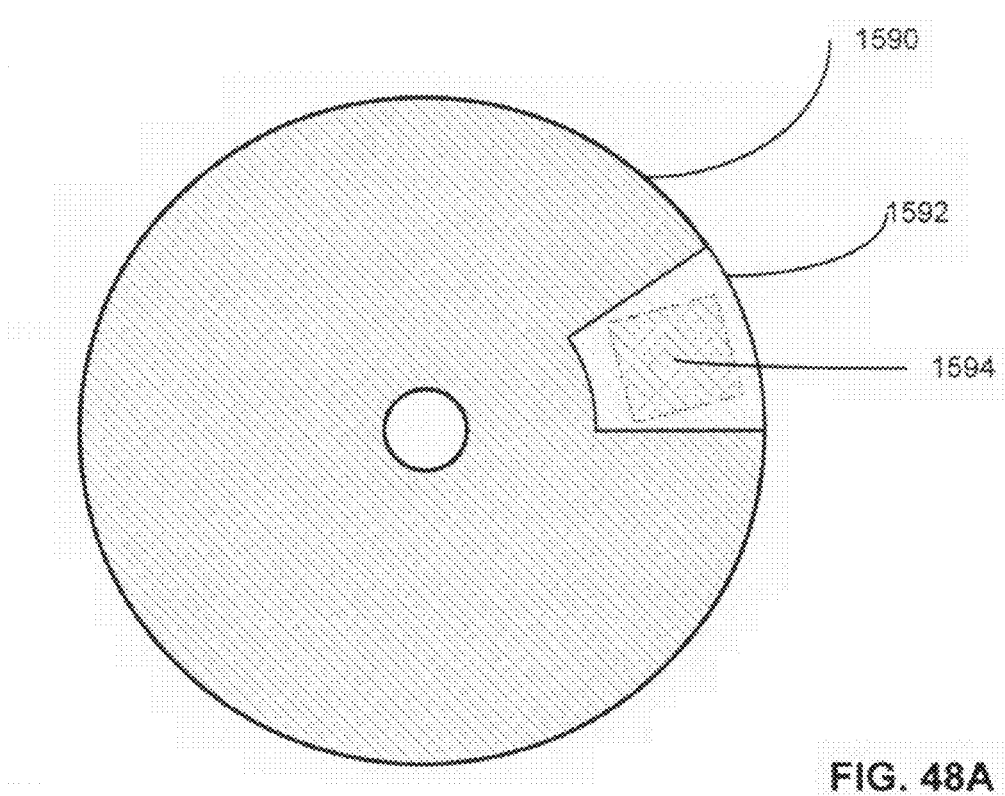
FIGS. 48A and 48B illustrate a data storage device with a rotation-modifiable barrier portion.
Figure 48B:
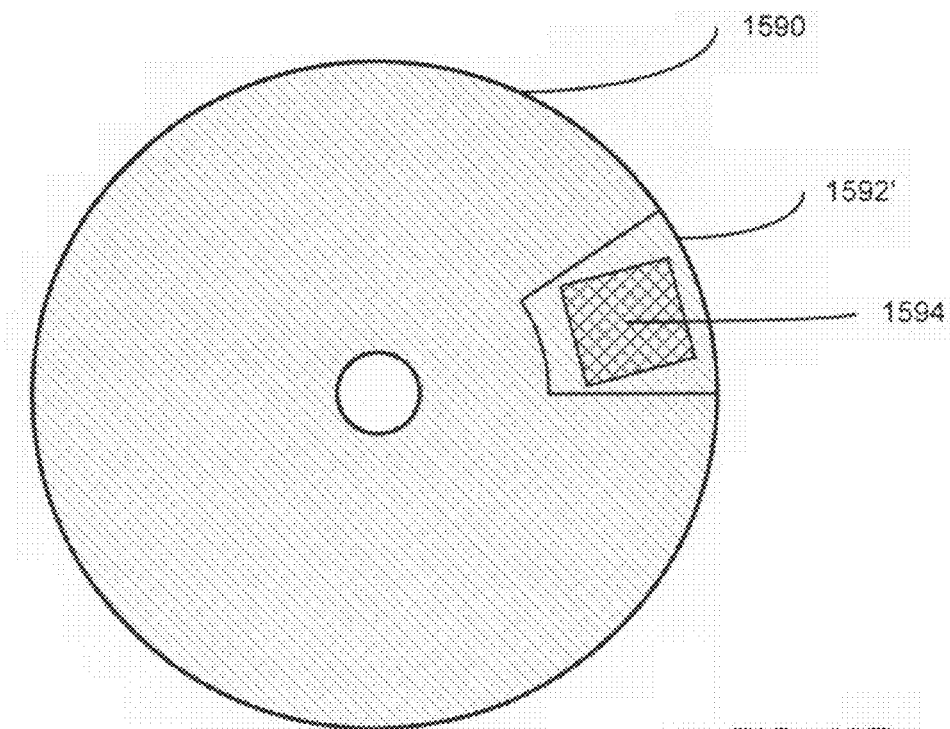

As shown in FIGS. 46A and 46B, a data storage device 1550 may include a substrate 1552, a degradation sensitive data storage medium 1554 on substrate 1552, with the data storage medium being degradable upon exposure to a degradation-inducing influence, and a rotation-responsive barrier portion 1556 configured to shield data storage medium 1554 from the degradation-inducing influence. The degradation inducing influence may be, for example, light. The rotation-responsive barrier portion 1556 may include a removable barrier portion that, upon subjection to sufficient centrifugal force, is removable to permit exposure of the data storage medium to the degradation-inducing influence. The barrier portion may be removed as at least one structural unit, as depicted in FIGS. 46A and 46B. Alternatively, the barrier portion may be removed by evaporation, as depicted in FIGS. 47A and 47B. Data storage device 1570 includes substrate 1572, degradation sensitive data storage medium 1574, and evaporation sensitive barrier 1576. Following rotation of data storage device 1570, evaporation sensitive barrier 1576 may becomes sufficiently permeable or porous that a degradation inducing influence may produce degradation of degradation sensitive data storage medium 1574. Suitable materials for evaporation sensitive barrier 1576 may include moisture permeable coatings, such as those having relatively high water vapor transmission rates (WVTRs) that allow moisture or other materials to pass. In one approach, moisture passing through the evaporation sensitive barrier can degrade an underlying material. In another approach, moisture exiting through the evaporation sensitive barrier 1576 permits drying of a material beneath the evaporation sensitive barrier 1576 and the dried material can block or diffuse light or otherwise degrade data. In another embodiment, as depicted in FIGS. 48A and 48B, a data storage device 1590 may include a rotation-responsive barrier portion that may be a modifiable barrier portion 1592 that, upon being subjected to sufficient centrifugal force is converted to a modified state 1592' to permit exposure of the data storage medium 1594 to the degradation-inducing influence. This may occur in a number of ways. For example, exposure of the barrier portion 1592 to sufficient centrifugal force may modify an optical transmissivity, an electrical conductivity, or a permittivity of the barrier portion. Suitable rotation sensitive materials for modifiable barrier 1592 may include a liquid crystal or a MEMS structure, such as the moving droplet structure described in *Electrostatic Actuation of Microscale Liquid-Metal Droplets* Laurent Latorre, Joonwon Kim, Junghoon Lee, Associate Member, IEEE, Peter-Patrick de Guzman, Hyesog J. Lee, Pascal Nouet JOURNAL OF MICROELECTROMECHANICAL SYSTEMS, VOL. 11, NO. 4, AUGUST 2002, for example.

Figure 35:
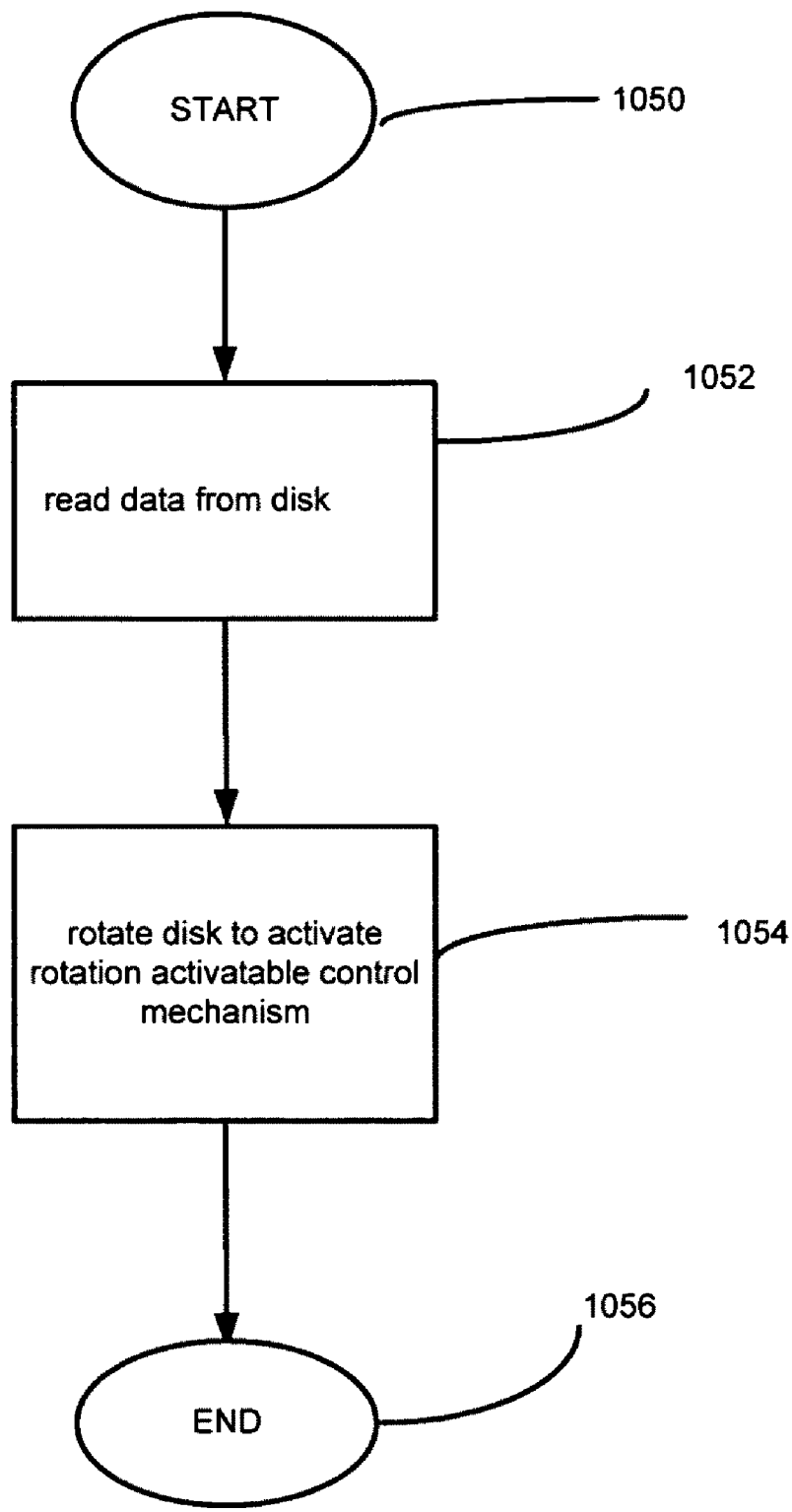
FIG. 35 is a flow diagram of a method of activating a rotation activatable control mechanism in association with reading data.
Figure 36:
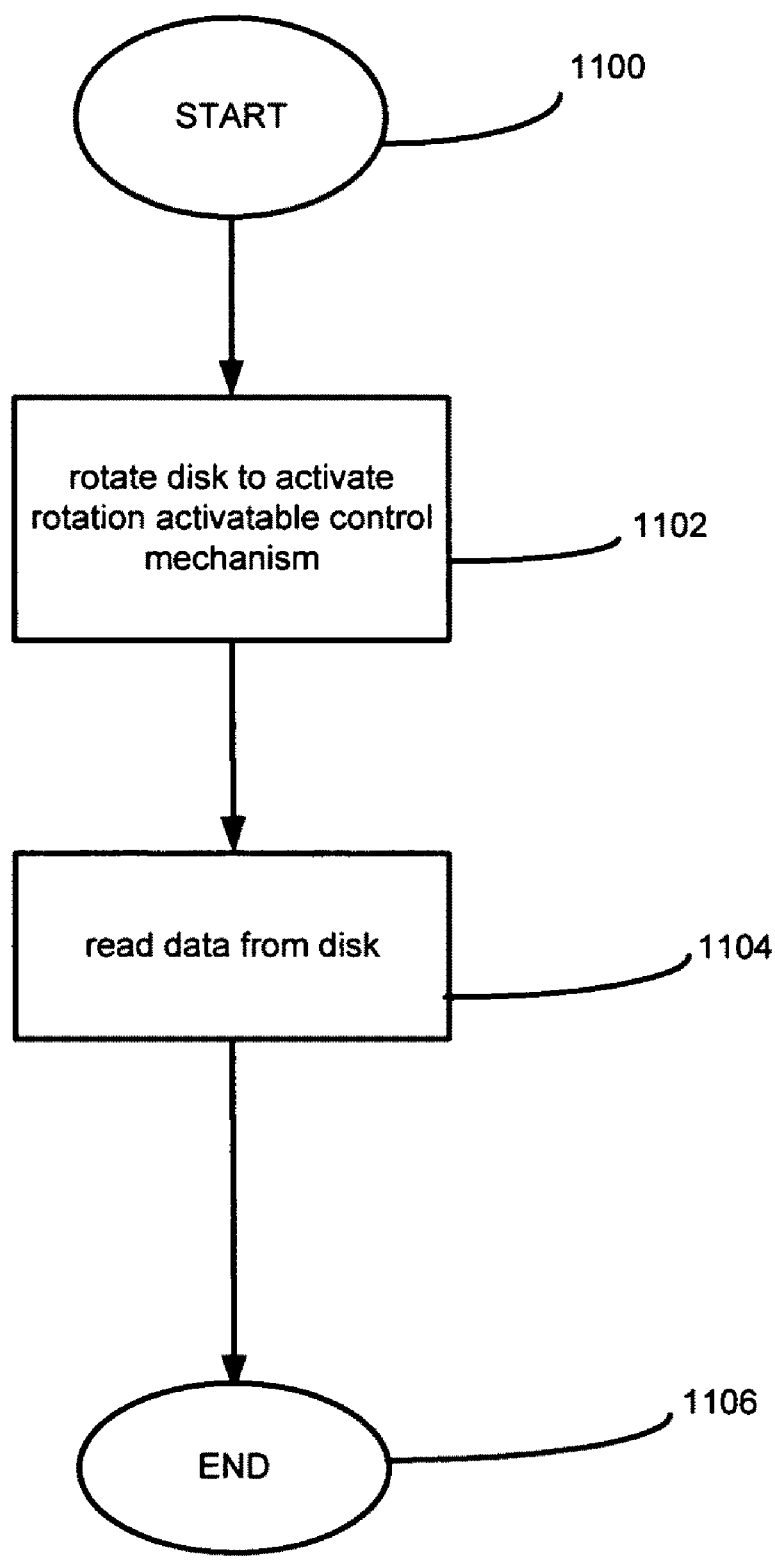
FIG. 36 is a flow diagram of a method of activating a rotation activatable control mechanism in association with reading data.
Figure 37:
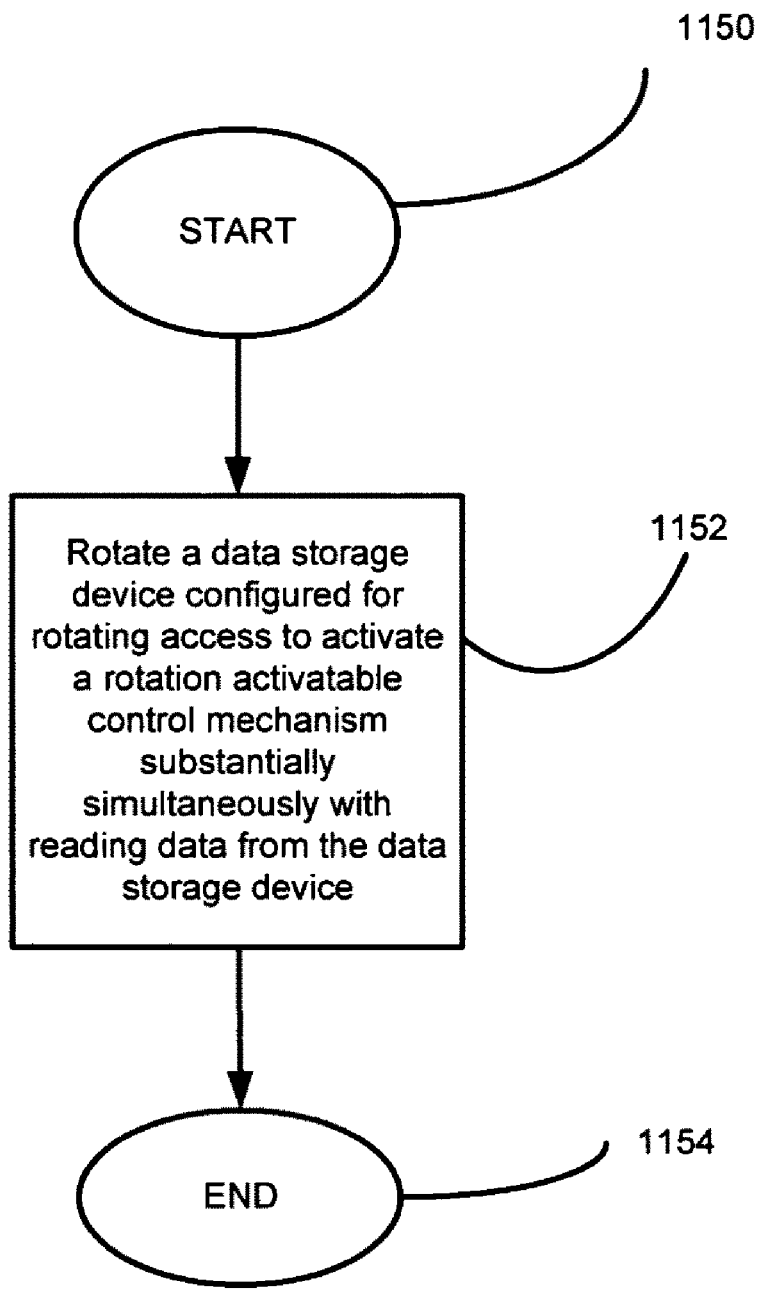
FIG. 37 is a flow diagram of a method of activating a rotation activatable control mechanism in association with reading data.

According to various embodiments as disclosed herein, use of a disk may be controlled by a method that includes reading data from the disk and rotating the disk to activate a rotation activatable mechanical switch on the disk. Rotating the disk to activate the rotation activatable mechanical switch may be performed prior to reading data from said disk, as illustrated in FIG. 36, subsequent to reading data from said disk, as illustrated in FIG. 35 or simultaneous with reading data from said disk, as illustrated in FIG. 37. The method may also include checking for previous activation of the rotation activatable mechanical switch prior to reading data from said disk. In particular, reading data from the disk may be performed if no previous activation of the rotation activatable mechanical switch is detected, as exemplified by the method of FIG. 39. Alternatively, reading data from the disk may be performed if no more than a selected number of previous activations of the rotation activatable mechanical switch are detected, as shown in FIG. 40. According to various methods disclosed herein, activation of the rotation activatable mechanical switch causes degradation of a data storage medium on the disk or modification of data stored on the disk. Activation of the rotation activatable mechanical switch may prevent reading of at least a portion of data from the disk. In some embodiments, activation of the rotation activatable mechanical switch may initiate a process wherein at least a portion of the data stored on the disk is rendered unusable, modified, or destroyed.

A disk drive system suitable for use with various embodiments of data storage devices as disclosed herein may include a receptacle for receiving a substrate configured for rotating access having stored data and a rotation activatable switching mechanism thereon, a read head for reading data from the substrate, a motor capable of spinning the substrate in a controlled pattern in response to a control signal, and a drive controller including one or more of control hardware, software, or firmware configured to generate a control signal for causing the motor to spin said substrate in a controlled pattern sufficient to produce activation of the rotation activatable switching mechanism. An exemplary embodiment is depicted in FIG. 2. The drive may include a detector capable of sensing an outcome of activation of the rotation activatable switching mechanism. In some embodiments of the disk drive system, the read head may be configured to function as the detector. The read head may be, for example, and optical read head or a magnetic read head. The motor may be capable of spinning the substrate at a speed higher than the normal read speed for the drive in order to produce activation of the rotation activatable switching mechanism.

Drive control software for controlling a disk drive for use with a disk having a rotation sensitive mechanism may include read head position instructions, including commands for controlling the position of a read head with respect to a disk received in a disk drive, disk read position instructions including commands for controlling rotational movement of a disk received in the disk drive during reading, read instructions for managing reading of data from the disk with a sensor; and data degradation instructions for controlling duration and intensity of rotation of the disk at levels sufficient to induce degradation in the disk. In some embodiments, data degradation instructions may control disk rotation to induce degradation of a data storage medium on the disk. In some embodiments, data degradation instructions may control disk rotation to induce degradation of a disk substrate.

Figure 34:
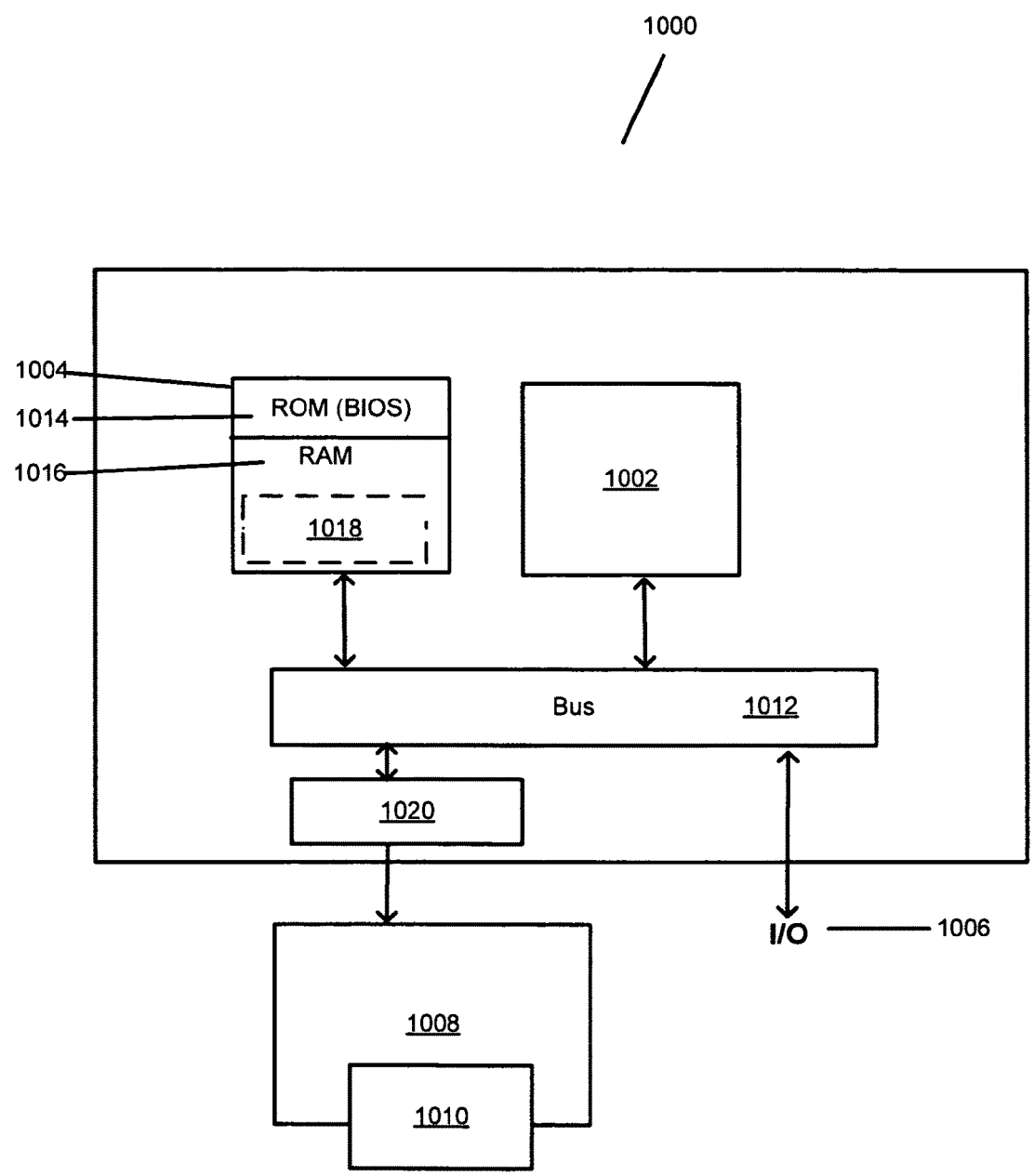
FIG. 34 is a schematic diagram of a system including a data storage device.

A drive as described herein may be incorporated into a computer system, as shown in FIGS. 1 and 34, which may include various components such as a processor, a system bus, an input device, an output device, a drive capable of reading data from a substrate configured for rotating access, and data storage media containing software instructions capable of controlling said drive to produce rotation of the substrate of intensity and duration capable of activating a rotation activatable mechanism to render at least a portion of machine readable data stored on the substrate inaccessible.

Figure 49:
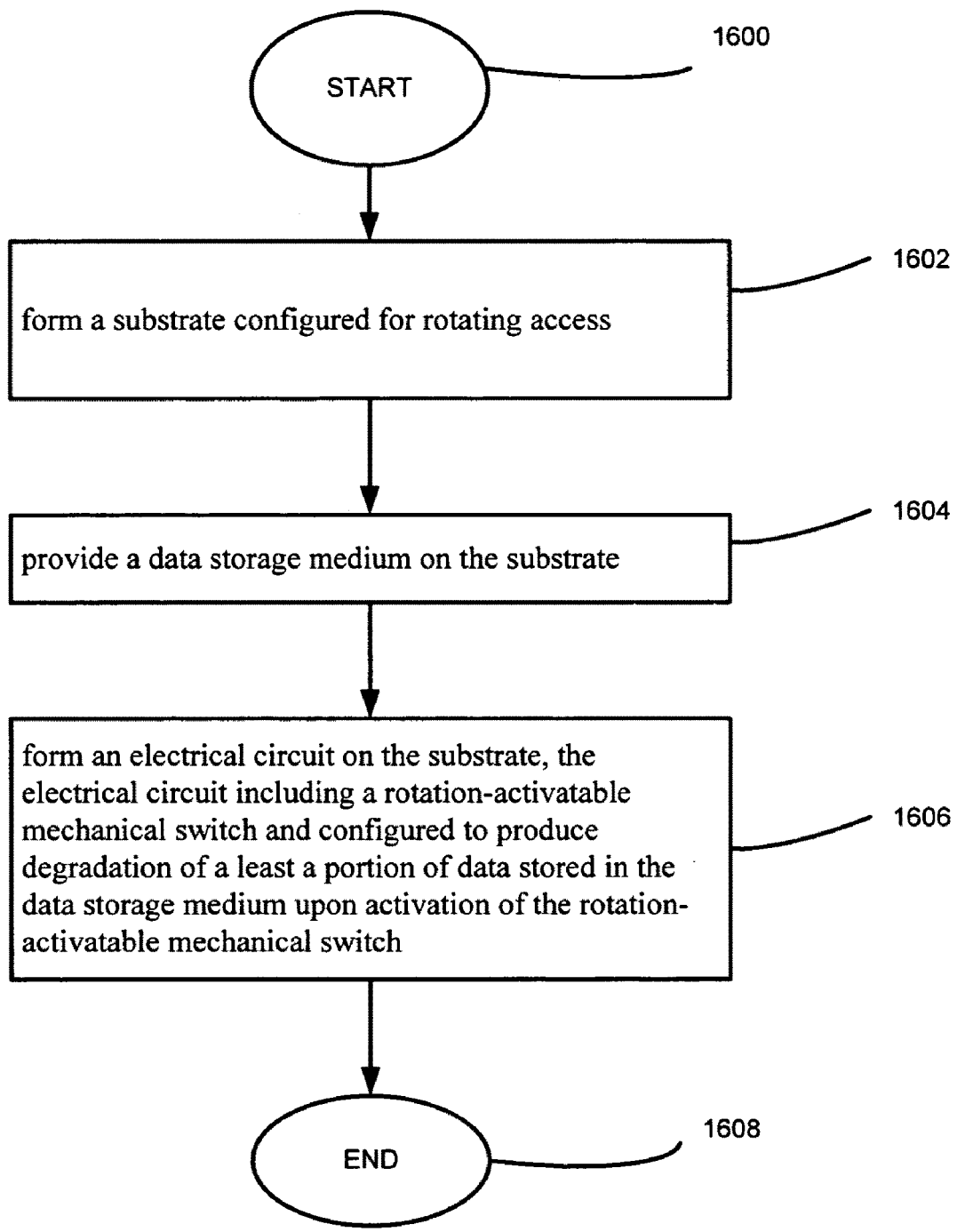
FIG. 49 is a flow diagram of a method of manufacturing a data storage device.

Certain data storage devices as described herein may be manufactured according to a method as shown in FIG. 49, which includes forming a substrate configured for rotating access at step 1602, providing a data storage medium on said substrate at step 1604, and forming an electrical circuit on the substrate at step 1606. The electrical circuit may include a rotation-activatable mechanical switch and be configured to produce degradation of a least a portion of data stored in the data storage medium upon activation of the rotation-activatable mechanical switch. The manufacturing method may also include a step of storing machine readable data in the data storage medium. By combining appropriately oriented rotation activatable fluid release and/or switching mechanisms, which may include fluid and/or mechanical switches, with suitable fluid or electrical circuitry, it is possible to produce a modification (e.g., activation or deactivation) of a data storage device in following a selected number of uses of the device. Data storage devices configured in this manner may be used in various systems that utilize data storage devices. FIG. 34 illustrates a system 1000 configured to make use of a data storage device 1010. The system may be a computer system, a CD or DVD player, or various other systems which may make use of data storage device configured for rotating access. System 1000 includes CPU (central processing unit) 1002, system memory 1004, one or more I/O (input/output) devices 1006, and data storage device drive 1008. Data storage device drive 1008 may be adapted to receive a data storage device 1010. Data, power, and control signals may be transmitted between the various system components via bus 1012. System memory 1004 may include ROM 1014 and RAM 1016. Data storage device drive 1008 may be controlled by device driver software 1018 resident in RAM 1016. Drive interface 1020, which may include hardware, software, or firmware, may assist the transfer of signals between data storage device drive 1008 and the rest of system 1000. The operation of data storage device drive 1008 may be modified or controlled at the level of device driver software 1018, or drive interface 1020, as well as by modifications to data storage device drive 1008. In some embodiments, data storage device 1010 may be configured so that it will be modified or inactivated following a selected number of uses. In some embodiments, components of system 1000 other than data storage device 1010 may operate in a conventional manner. In other embodiments, selected components of system 1000 may include features that are specialized for use with a data storage device 1010 having rotation activatable features. System 1000 may be modified at the level of drive 1008, drive interface 1020, or program code 1018 residing in RAM 1016. Drive 1008 or drive interface 1020 may be modified at the hardware, firmware, or software level. Program code 1018 may be system software or application program software. As discussed previously in connection with FIG. 25, system 1000 may be modified to control the speed of rotation of data storage device 1010 within drive 1008 to activate fluid release devices (or other rotation activatable mechanisms) in sequence based upon different thresholds for activation. System 1000 may be configured to detect prior activation of a rotation activatable mechanism on data storage device 1010. Modifications to data storage device 1010 associated with prior activation may be detected by various means. If the modification includes modification of data or modification of accessibility of a particular portion of data, the modification may be detected when an attempt is made to read data from data storage device 1010, e.g. by failure of reading. In some embodiments, a rotation activatable mechanism may produce modification of a mechanical, optical, electrical, magnetic, chemical, or other property of the data storage device. Such modifications may be manifested as modifications of data or accessibility of data, but are not limited to modification of data or data accessibility. In some embodiments, modifications may be detectable by optical, electrical, magnetic, or other means, and the presence of the modification may serve as an instruction to the system to discontinue reading of the disk, or to operate in a specified manner (e.g., by increasing the speed of rotation of the disk, delivering light to a selected region of the disk, etc.).

The following flow diagrams are illustrative of various approaches that may be taken for controlling operation of a system as depicted in FIG. 33. Some approaches make use of conventional drive operation, while others may make use of modifications to conventional drive operation.

FIG. 35 is a flow diagram of a method of activating a rotation activatable control mechanism. According to various embodiments, described previously, various rotation activatable mechanisms may be used to control access to data on a data storage device, by modifying or degrading data, or by modifying access to the data by modifying all or a portion of the data storage device. Rotation activatable mechanisms may be rotation activatable control mechanisms. At step 1052, data is read from a disk (or other data storage device configured for rotating access). At step 1054, the disk is rotated to activate a rotation activatable control mechanism. A rotation activatable control mechanism may include, for example, a rotation activatable switch or fluid release device, as described previously. Because the rotation activatable control mechanism is activated after data is read from the device in this example, the use of a rotation activated control mechanism that produces immediate (or substantially immediate) destruction of data, or otherwise rapidly renders data unusable or inaccessible may be used. Rotation activated control mechanisms that initiate a gradual process by which data is destroyed or rendered inaccessible may also be used.

FIG. 36 is a flow diagram of a further exemplary method of activating a rotation activatable control mechanism. At step 1102, a disk is rotated to activate a rotation activatable control mechanism. Subsequently, at step 1104, data is read from the disk. In this example, the rotation activatable control mechanism may initiate a process that causes data to be destroyed or rendered unusable or inaccessible over time. Immediate destruction of data may be incompatible with the subsequent step of reading data from the disk.

FIG. 37 is a flow diagram of a further exemplary method including activation of a rotation activatable control mechanism. At step 1152, a data storage device configured for rotating access is rotated to activate a rotation activatable control mechanism substantially simultaneously with reading of data from the data storage device.

Figure 38:
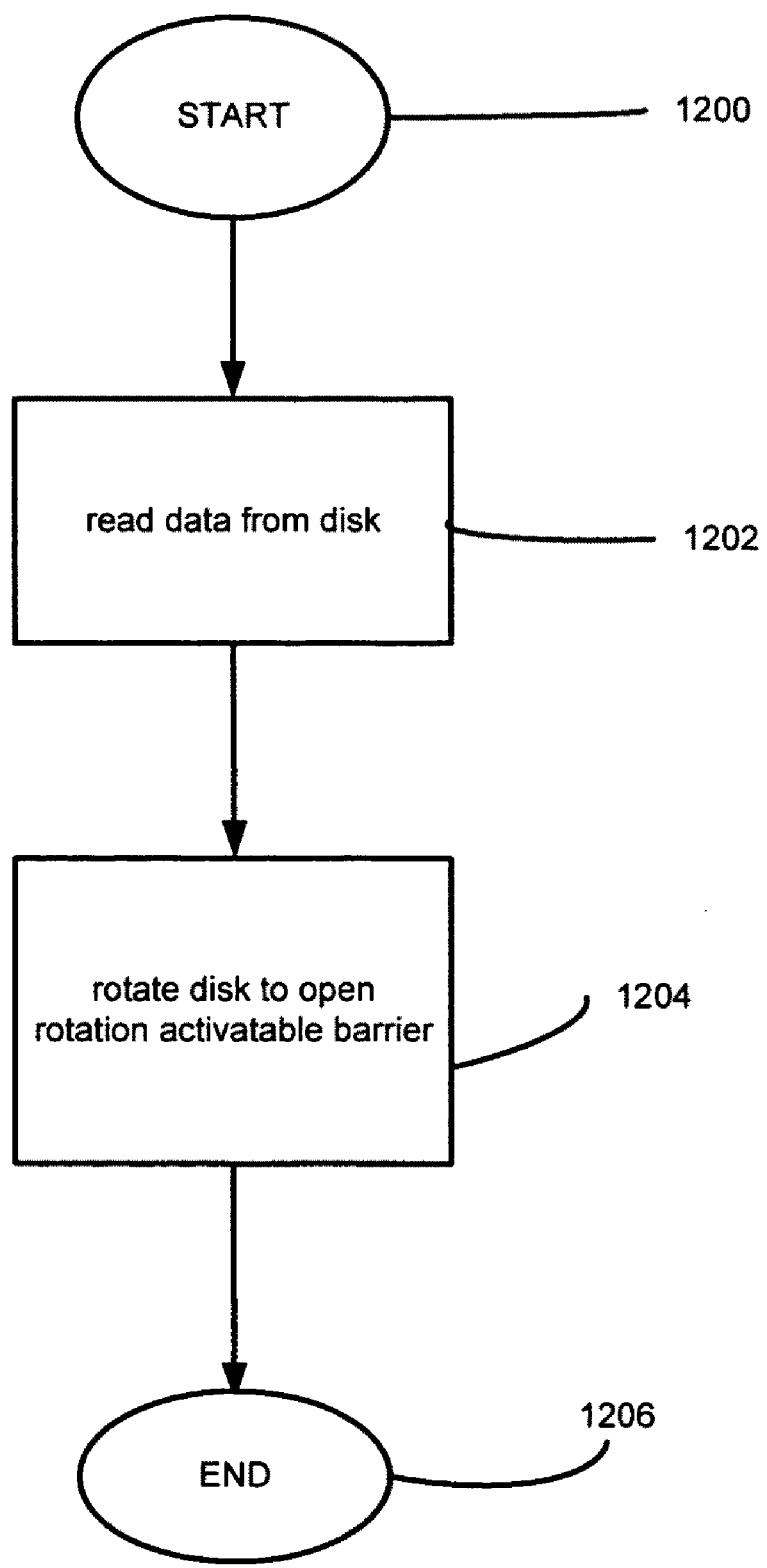
FIG. 38 is a flow diagram of a method of activating a rotation activatable barrier in association with reading data.

FIG. 38 is a flow diagram providing further detail of method such as that depicted in FIG. 34. At step 1202 of FIG. 38, data is read from a disk. Reading data from the disk may including rotating the disk to select a location on the disk from which data is to be read. At step 1204, the disk is rotated to open a rotation activatable barrier. Opening a rotation activatable barrier may include rotating a disk at substantially the same velocity as used during reading data from the disk, or it may include rotating the disk at a different velocity, in a different direction, or in some other pattern differing from the rotation pattern used during reading of data from the disk. Fluid may be released by opening of the rotation activatable barrier, to produce modification of all or a portion of the data storage device by any of various methods as described herein.

Figure 39:
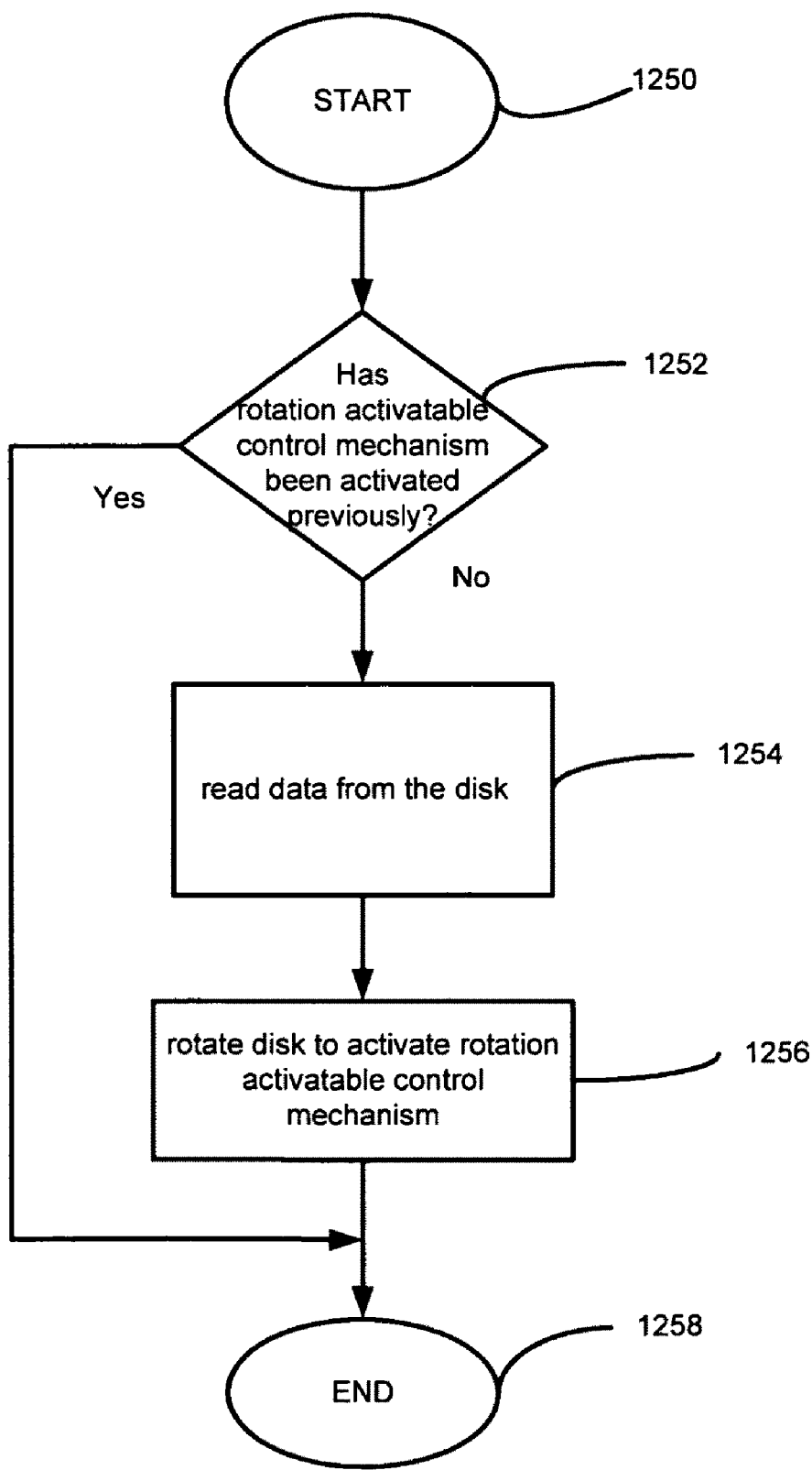
FIG. 39 is a flow diagram of a method of controlling access to data on a disk.
Figure 40:
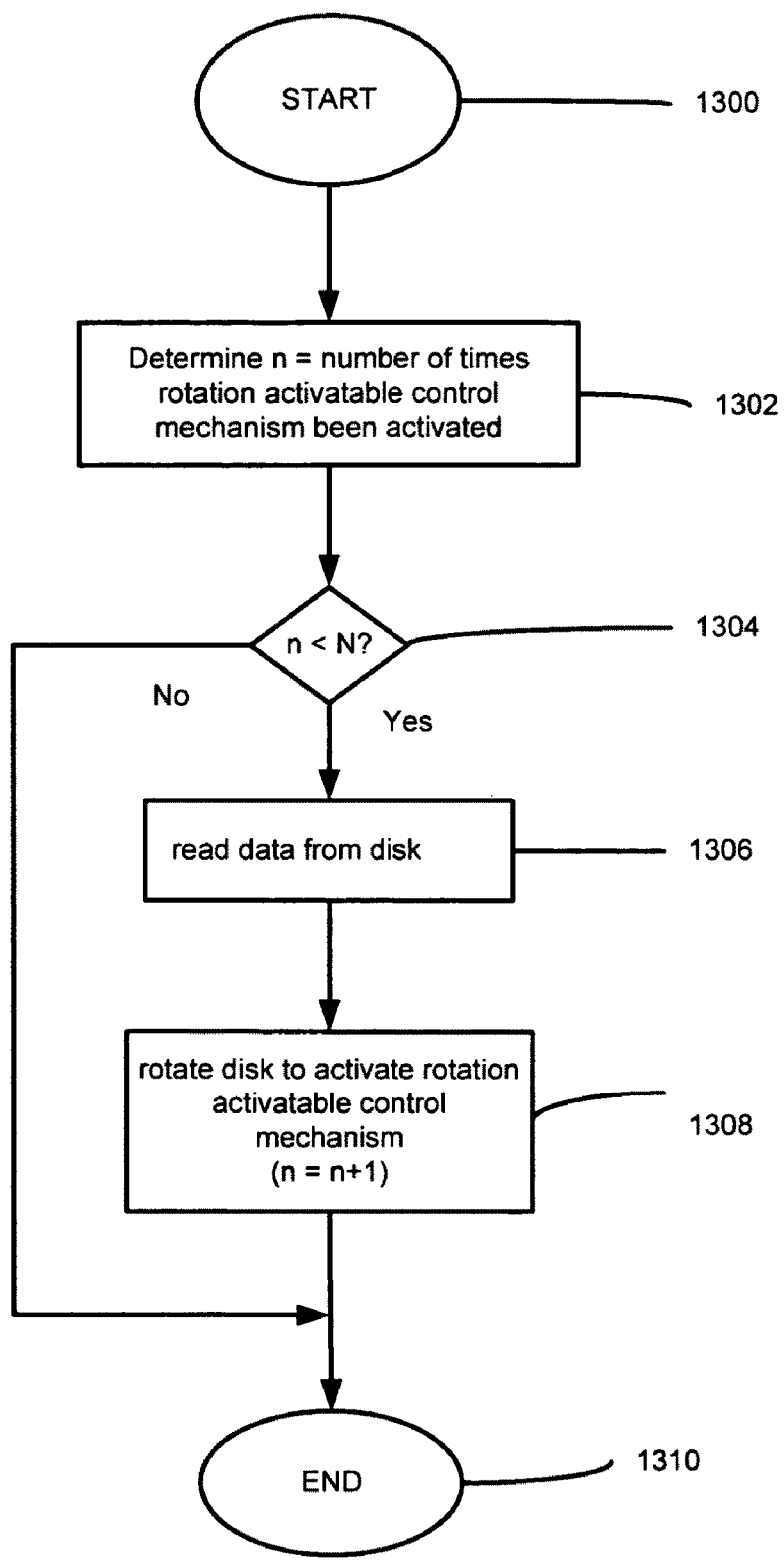
FIG. 40 is a flow diagram of a method of controlling access to data on a disk.

FIG. 39 is a flow diagram of a method in which a rotation activatable control mechanism is used to control access to data on a disk. A process of reading data from a disk is initiated at step 1250. At decision point 1252, a check is performed to determine whether a rotation activatable control mechanism has been activated previously. Determination of previous activation of a rotation activatable control mechanism may be by various methods, as described previously, either through detecting the inability to read data from the disk, the reading of 'bad' data from the disk, or the detecting of a modified feature of the disk. If previous activation of a rotation activatable control mechanism is not detected, process control moves to step 1254, and data is read from the disk. After data is read from the disk, the disk is rotated to activate a rotation activatable control mechanism at step 1256. If subsequent attempts are made to read data from the disk, process control will begin again at step 1250. When it is determined at step 1252 that the rotation activatable control mechanism has been activated previously, the result will be affirmative, and the process will end (step 1258), and no data will be read from the disk.

FIG. 40 is a flow diagram of a further embodiment of a method of controlling access to data on a disk. In this exemplary embodiment, access to data on the disk is denied after a total of N accesses to the data. After initiation of the method at step 1300, n, the number of times that a rotation activatable control mechanism on the disk has been activated, is determined at step 1302. If the disk has never been activated previously, zero activations will be detected. Activation of a rotation activatable control mechanism may produce various types of detectable changes on a data storage device, including but not limited to optically detectable changes, magnetically detectable changes, electrically detectable changes, among others. At decision point 1304, if n<N, process control moves to step 1306, where data is read from the disk. At step 1308, the disk is rotated to activate a rotation activatable control mechanism, increasing the number of detectable changes on the disk by one. This is equivalent to increasing the value of n to n+1. Reading of data accomplished, the process ends at step 1310. If it is desired to read data from the disk again, the process may be repeated again, starting at step 1300. When data has been read from the disk N times, on the (N+1)th attempt to read data from the disk, at step 1302, a value of n=N will be obtained. At step 1304, the response to the query n<N, will be 'No' and process control will jump to endpoint 1310. Thus, no further reads of data from the disk will be permitted. The method presented in FIG. 39 may be used, for example, in connection with a disk as shown in FIG. 25. Degradation of degradation sensitive regions 764, 772, 780, 788 may be detected as an indicator of previous activation of the disk; when all four regions have been degraded, indicating that four reads of the disk have been performed, then no further reading of data may be permitted. Further reading may be prevented in by configuring the software controlling reading of the disk so that it will not attempt a read when all degradation sensitive regions have been degraded (even if the data on the disk is present and readable). Alternatively, if the degradation sensitive regions contain information necessary for reading data from other portions of the disk (possibly redundant copies of the same information, or possibly different information in different degradation sensitive regions) when all four degradation sensitive regions have been degraded, the information necessary for reading data from the disk is no longer available on the disk.

Figure 41:
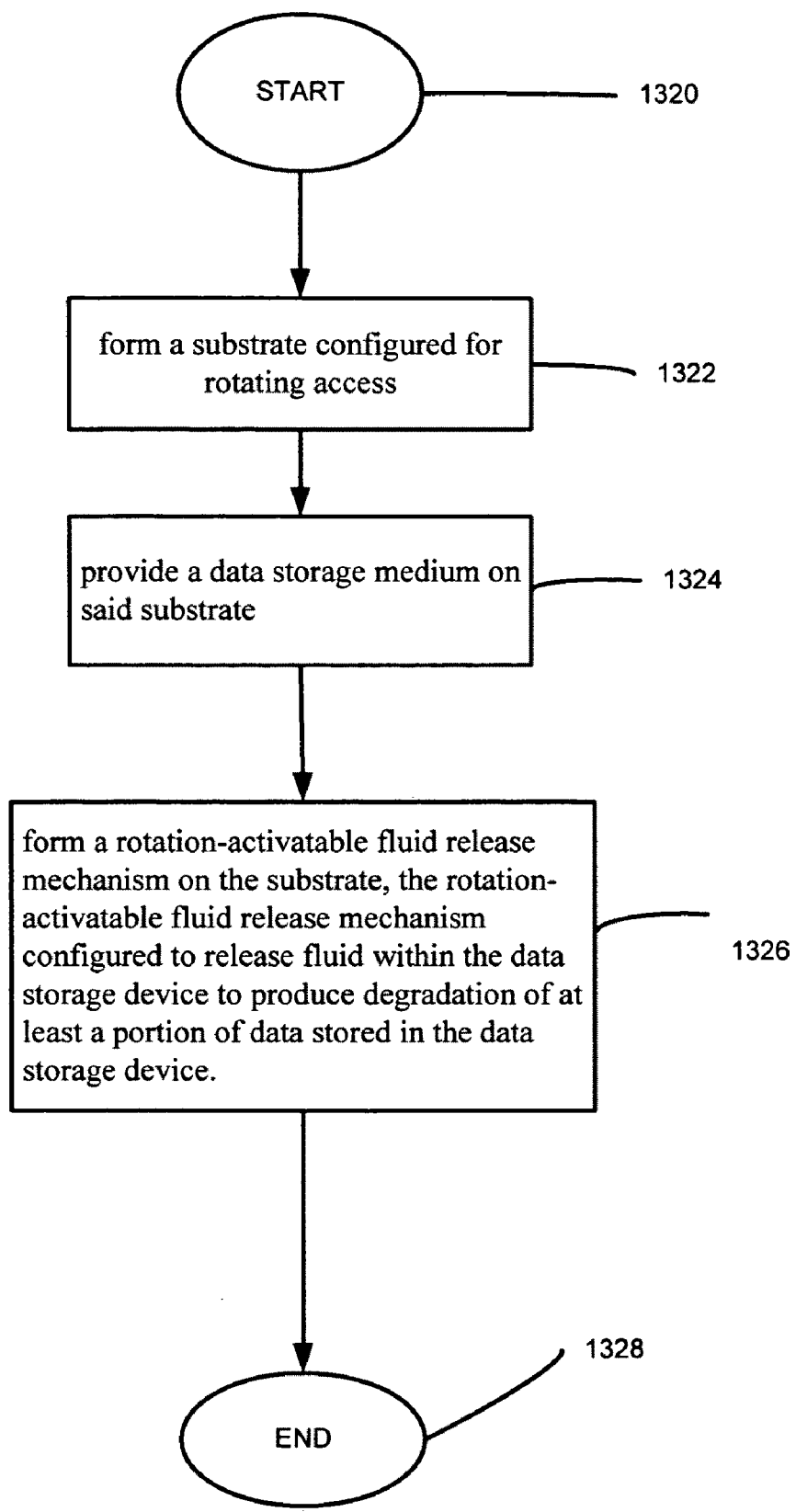
FIG. 41 is a flow diagram of a method of manufacturing a data storage device.

FIG. 41 is a flow diagram of a method of manufacturing a data storage device according to various embodiments as disclosed herein. The method includes the steps of: forming a substrate configured for rotating access at step 1322, providing a data storage medium on said substrate at step 1324, and forming a rotation-activatable fluid release mechanism on said substrate at step 1326. The rotation-activatable fluid release mechanism may be configured to release fluid within said data storage device to produce degradation of at least a portion of data stored in said data storage device. In related embodiments, the method may also include the steps of storing machine readable data in the data storage medium, and loading the fluid release mechanism with a fluid.

Figure 42:
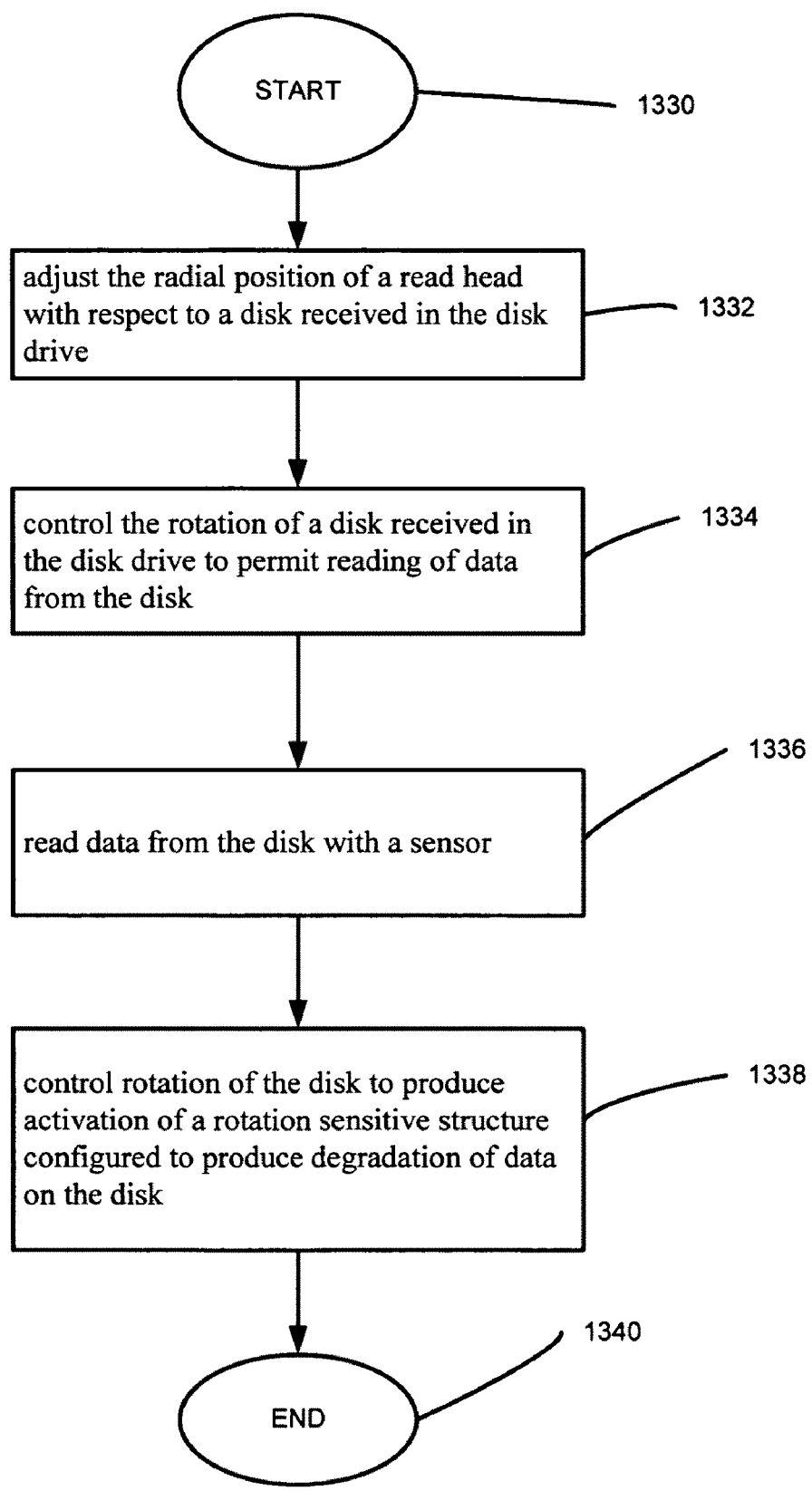
FIG. 42 is a flow diagram of a method of operating a disk drive.

FIG. 42 is a flow diagram of a method of operating a disk drive, which includes the steps of adjusting the radial position of a read head with respect to a disk received in the disk drive, as shown at step 1332; controlling the rotation of a disk received in the disk drive to permit reading of data from the disk, as shown at step 1334; reading data from the disk with a sensor (step 1336); and, at step 1338, controlling rotation of the disk to produce activation of a rotation sensitive structure configured to produce degradation of data on the disk.

Figure 43:
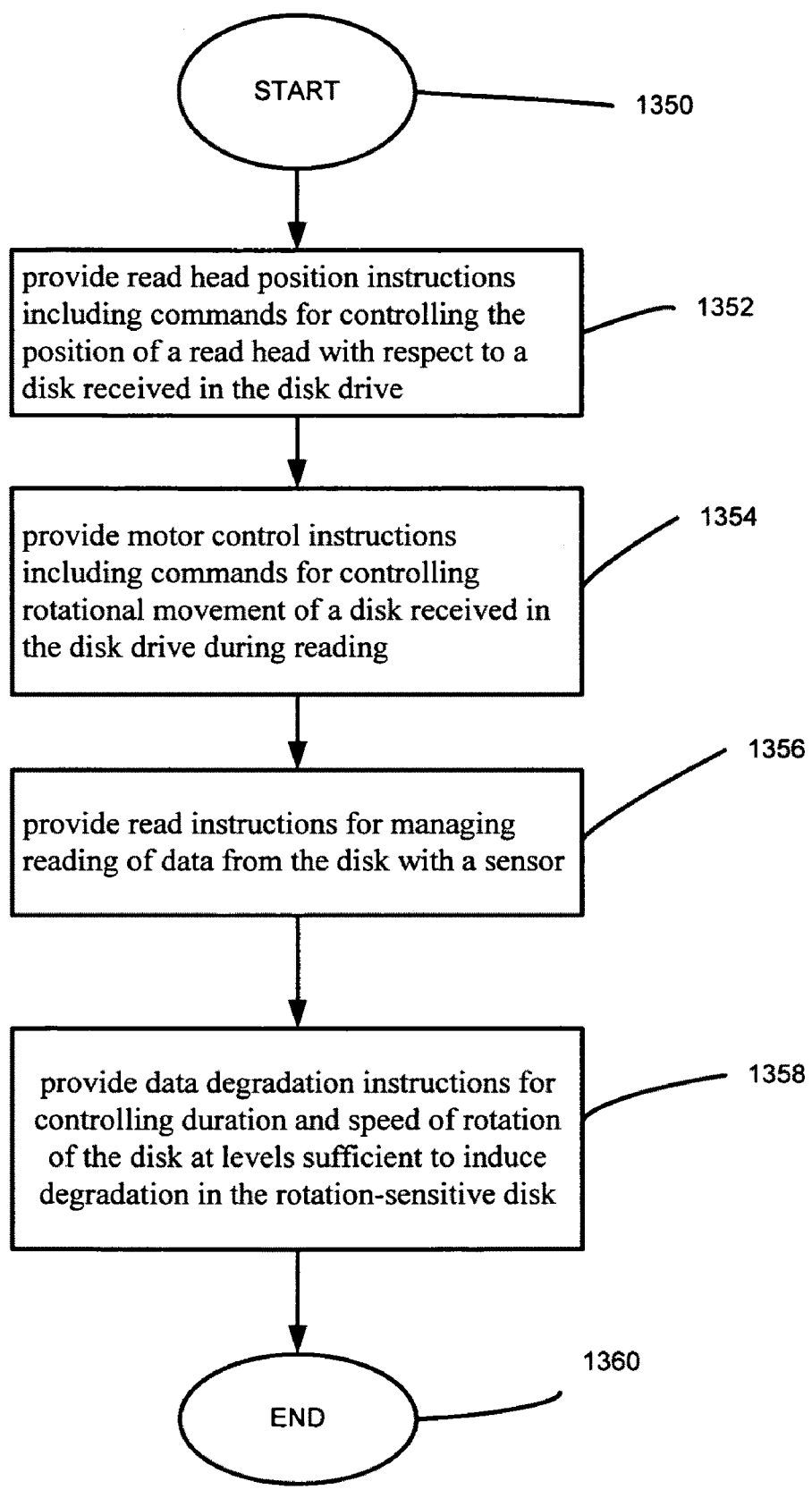
FIG. 43 is a flow diagram of a method of configuring a disk drive for use with a rotation-sensitive disk.

In some embodiments, as described above, the disk drive may be configured for use with rotation-sensitive disks. FIG. 43 is a flow diagram of a method of configuring a disk drive for use with a rotation-sensitive disk. The method includes a first step 1352 of providing read head position instructions, including commands for controlling the position of a read head with respect to a disk received in the disk drive. Next, at step 1354, motor control instructions including commands for controlling rotational movement of a disk received in the disk drive during reading are provided. At step 1356, read instructions for managing reading of data from the disk with a sensor are provided. Finally, at step 1358, data degradation instructions are provided for controlling duration and speed of rotation of the disk at levels sufficient to induce degradation in the rotation-sensitive disk. One or more of the read head position instructions, motor control instructions, read instructions and data degradation instructions may be provided in the form of software, hardware or firmware. For example, instructions may be provided on a disk that is provided to a purchaser of the disk drive, stored in static or dynamic memory, or configured in an ASIC (application specific integrated circuit) or other electronic circuitry. Memory or data storage devices containing the instructions, or electronic circuitry embodying such instructions may be a part of the disk drive or part of a computer or other device in which the disk drive may be installed.

With regard to the hardware and/or software used in the control of drives for data storage device according to the present embodiments, and particularly to the control of data reading and disk rotation, those having skill in the art will recognize that the state of the art has progressed to the point where there is little distinction left between hardware and software implementations of aspects of such systems; the use of hardware or software is generally (but not always, in that in certain contexts the choice between hardware and software can become significant) a design choice representing cost vs. efficiency or implementation convenience tradeoffs. Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

In some embodiments, portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the capabilities of one of skill in the art in light of this disclosure. In addition, those skilled in the art will appreciate that certain mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., links carrying packetized data).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory or an optical or ferromagnetic memory structure), and/or electrical circuitry forming a communications device (e.g., a modem, communications switch, or optical-electrical equipment).

The foregoing detailed description has set forth various embodiments of the devices and/or processes via the use of block diagrams, flowcharts, and/or examples. Insofar as such block diagrams, flowcharts, and/or examples contain one or more functions and/or operations, it will be implicitly understood by those with skill in the art that each function and/or operation within such block diagrams, flowcharts, or examples can be implemented, individually and/or collectively, by a wide range of hardware, software, firmware, or virtually any combination thereof.

Those skilled in the art will recognize that it is common within the art to describe devices for data storage and reading in the fashion set forth herein, and thereafter use standard engineering practices to integrate such described devices and/or processes into systems including data storage devices as exemplified herein. That is, at least a portion of the devices and/or processes described herein can be integrated into a system including a data storage device via a reasonable amount of experimentation. Those having skill in the art will recognize that such systems generally include one or more of a memory such as volatile and non-volatile memory, processors such as microprocessors and digital signal processors, computational-supporting or associated entities such as operating systems, user interfaces, drivers, sensors, actuators, applications programs, one or more interaction devices, such as data ports, control systems including feedback loops and control implementing actuators (e.g., devices for sensing position and/or velocity and/or acceleration or time-rate-of-change thereof; control motors for moving and/or adjusting components and/or quantities). A typical system may be implemented utilizing any suitable available components, such as those typically found in appropriate computing/communication systems and/or data storage and reading systems, combined with standard engineering practices.

The foregoing-described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

While particular aspects of the present subject matter described herein have been shown and described, it will be obvious to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should NOT be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" and/or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense of one having skill in the art would understand the convention (e.g., "a system having at least one of A, B, and C" would include but not be limited to systems that have A alone, B alone, C alone, A and B together, A and C together, B and C together, and/or A, B, and C together). In those instances where a convention analogous to "at least one of A, B, or C, etc." is used, in general such a construction is intended in the sense of one having skill in the art would understand the convention (e.g., "a system having at least one of A, B, or C" would include but not be limited to systems that have A alone, B alone, C alone, A and B together, A and C together, B and C together, and/or A, B, and C together).

Although the methods, devices, systems and approaches herein have been described with reference to certain preferred embodiments, other embodiments are possible. As illustrated by the foregoing examples, various choices of system configuration may be within the scope of the invention. As has been discussed, the choice of system configuration may depend on the intended application of the system, the environment in which the system is used, cost, personal preference or other factors. Data storage device design, manufacture, and control processes may be modified to take into account choices of system components and configuration, and such modifications, as known to those of skill in the arts of data storage and retrieval structures and systems, fluid control structures, and electronics design and construction, may fall within the scope of the invention. Therefore, the full spirit or scope of the invention is defined by the appended claims and is not to be limited to the specific embodiments described herein.

The invention claimed is:

1. A data storage device comprising:
a substrate;
a data storage medium on said substrate, said data storage medium degradable upon exposure to a degradation-inducing influence; and
a rotation-responsive barrier portion configured to shield said data storage medium from said degradation-inducing influence, said rotation-responsive barrier portion responsive to sufficient centrifugal force to permit exposure of said data storage medium to said degradation-inducing influence.

2. The data storage device of claim 1, wherein said rotation-responsive barrier portion comprises a removable barrier portion that, upon subjection to sufficient centrifugal force, is removable to permit exposure of said data storage medium to said degradation-inducing influence.

3. The data storage device of claim 2, wherein said barrier portion is removed as at least one structural unit.

4. The data storage device of claim 2, wherein said barrier portion is removed by evaporation.

5. The data storage device of claim 1, wherein said rotation-responsive barrier portion comprises a modifiable barrier portion that is modifiable by subjection to sufficient centrifugal force to permit exposure of said data storage medium to said degradation-inducing influence.

6. The data storage device of claim 5, wherein exposure of said barrier portion to sufficient centrifugal force modifies an optical transmissivity by said barrier portion.

7. The data storage device of claim 5, wherein exposure of said barrier portion to sufficient centrifugal force modifies an electrical conductivity of said barrier portion.

8. The data storage device of claim 5, wherein exposure of said barrier portion to sufficient centrifugal force modifies a permittivity of said barrier portion.

9. The data storage device of claim 5, wherein said modifiable barrier portion includes a liquid crystal.

10. The data storage device of claim 5, wherein said modifiable barrier portion includes a MEMS structure.

11. The data storage device of claim 1, wherein said rotation-responsive barrier portion is configured to shield said data storage medium from a degradation-inducing influence that includes light.

12. The data storage device of claim 1, wherein said rotation-responsive barrier portion includes an evaporation-sensitive barrier.

13. The data storage device of claim 12, wherein said evaporation sensitive barrier includes a moisture permeable coating.

14. The data storage device of claim 12, wherein said evaporation sensitive barrier is responsive to evaporation by change in permeability of said barrier by said degradation-inducing influence.

15. The data storage device of claim 12, wherein said evaporation sensitive barrier is responsive to evaporation by change in porosity of said barrier.

* * * * *